US008111426B2

(12) United States Patent
Koyama et al.

(10) Patent No.: US 8,111,426 B2
(45) Date of Patent: Feb. 7, 2012

(54) HEAD UNIT, DROPLET DISCHARGING APPARATUS, DROPLET DISCHARGING SYSTEM, INFORMATION PROCESSING APPARATUS, INFORMATION PROCESSING METHOD, STATUS INFORMATION NOTIFYING METHOD, STATUS INFORMATION UPDATING METHOD, FAULTY POSITION DETECTING METHOD, AND PROGRAMS

(75) Inventors: Masayoshi Koyama, Kanagawa (JP); Masato Nakamura, Tokyo (JP); Takumi Namekawa, Kanagawa (JP); Shota Nishi, Kanagawa (JP); Shinichi Horii, Kanagawa (JP)

(73) Assignee: Sony Corporation, Tokyo (JP)

( * ) Notice: Subject to any disclaimer, the term of this patent is extended or adjusted under 35 U.S.C. 154(b) by 531 days.

(21) Appl. No.: 11/940,774

(22) Filed: Nov. 15, 2007

(65) Prior Publication Data

US 2008/0186340 A1 Aug. 7, 2008

Related U.S. Application Data

(62) Division of application No. 10/982,596, filed on Nov. 4, 2004, now abandoned.

(30) Foreign Application Priority Data

Nov. 11, 2003 (JP) ................................ 2003-381392
Jan. 6, 2004 (JP) ................................ 2004-001228

(51) Int. Cl.
*H04N 1/40* (2006.01)

(52) U.S. Cl. .......... 358/2.1; 358/500; 358/504; 358/468

(58) Field of Classification Search .................. 358/1.9, 358/2.1, 500–504, 468; 347/9, 12, 14, 19–20, 347/23

See application file for complete search history.

(56) References Cited

U.S. PATENT DOCUMENTS 5,495,561 A * 2/1996 Holt ............................ 358/1.15
5,579,449 A * 11/1996 Strobel ....................... 358/1.11
6,779,865 B2 8/2004 Shibata et al.

FOREIGN PATENT DOCUMENTS

| | | |
|---|---|---|
| JP | 05-177843 | 7/1993 |
| JP | 06-051922 | 2/1994 |
| JP | 06-226982 | 8/1994 |
| JP | 09-094984 | 4/1997 |
| JP | 09-118023 | 5/1997 |
| JP | 10-106488 | 4/1998 |
| JP | 2000-246921 | 9/2000 |
| JP | 2000-272134 | 10/2000 |

(Continued)

OTHER PUBLICATIONS

Japanese Office Action issued on Aug. 28, 2007.

(Continued)

*Primary Examiner* — Thomas D Lee
*Assistant Examiner* — Stephen M Brinich
(74) *Attorney, Agent, or Firm* — SNR Denton US LLP

(57) ABSTRACT

The present invention provides a droplet discharging apparatus including a discharge head for deflectively discharging droplets through one discharge port at a plurality of pixel areas in adaptive fashion. The discharge head is controlled to discharge droplets at an object. A storage unit stores status information about the discharge head. A communication unit communicates with an information processing apparatus located outside so as to transmit the status information to the information processing apparatus.

3 Claims, 41 Drawing Sheets

EXAMPLE OF DEFECTIVE DISCHARGE

FOREIGN PATENT DOCUMENTS

| | | |
|---|---|---|
| JP | 2001-034447 | 2/2001 |
| JP | 2001-105625 | 4/2001 |
| JP | 2001-150763 | 6/2001 |
| JP | 2001-191504 | 7/2001 |
| JP | 2001-347729 | 12/2001 |
| JP | 2002-192715 | 7/2002 |
| JP | 2002-192727 | 7/2002 |
| JP | 2002-200753 | 7/2002 |
| JP | 2003-162399 | 6/2003 |
| JP | 2003-237064 | 8/2003 |
| JP | 2003-256290 | 9/2003 |

OTHER PUBLICATIONS

Japanese Office Action issued on Oct. 23, 2007.

Japanese Patent Office Action corresponding to Japanese Serial No. 2003-381392 dated Jul. 6, 2010.

* cited by examiner

ENLARGED DISCHARGE PATTERN

EXAMPLE OF DEFECTIVE DISCHARGE

GRADATION DATA "1"
(PNM1)

GRADATION DATA "2"
(PNM2)

FIG. 15

RAM ADDRESS

| | ---- | n−4 | n−3 | n−2 | n−1 | n | n+1 | n+2 | n+3 | ---- | | ADDRESS | DEFLECTION |
|---|---|---|---|---|---|---|---|---|---|---|---|---|---|
| 0bit | | 0 | 1 | 1 | 1 | 0 | 1 | 1 | 1 | | PNM1 | +0 | → |
| 1bit | | 0 | 1 | 1 | 1 | 0 | 0 | 1 | 1 | | PNM2 | +1 | ↗ |
| 2bit | | 0 | 0 | 1 | 1 | 0 | 0 | 1 | 0 | | PNM3 | +0 | → |
| 3bit | ••• | 1 | 1 | 1 | 1 | 0 | 1 | 0 | 0 | ••• | PNM4 | +1 | ↗ |
| 4bit | | 1 | 1 | 0 | 0 | 1 | 0 | 0 | 1 | | PNM5 | +0 | → |
| 5bit | | 1 | 0 | 0 | 0 | 0 | 1 | 0 | 0 | | PNM6 | +1 | ↗ |
| 6bit | | 1 | 0 | 0 | 0 | 1 | 1 | 0 | 1 | | PNM7 | +0 | → |
| 7bit | | 1 | 0 | 0 | 1 | 0 | 0 | 0 | 1 | | PNM8 | +1 | ↗ |

(hatched cells) ⇨ DISCHARGE PORT n n-PIXEL PATTERN (n+1)-PIXEL PATTERN

FIG. 40

| | REPLACE CLEANING ROLLER | REPLACE INK ABSORBING SPONGE | LITTLE INK LEFT | NO INK LEFT | INK CARTRIDGE ABSENT | HEAD CARTRIDGE DEFECTIVE | INK LEAKAGE | CLEANING UNIT LEFT OPEN |
|---|---|---|---|---|---|---|---|---|
| SENSOR-TO-SENSOR MOVEMENT DISTANCE OUT OF TOLERANCE | | | | | | | | ○ |
| SENSOR IN THE CHIP REACTED | | | | | | | ○ | |
| NO COMMUNICATION WITH HEAD CONTROL UNIT | | | | | | ○ | | |
| REMAINING INK SENSOR (L) OFF | | | | ○ | ○ | | | |
| REMAINING INK SENSOR (M) OFF | | | ○ | | ○ | | | |
| FRAMELESS PRINT COUNTER EXCEEDING LIMIT | | ○ | | | | | | |
| PRINT COUNTER EXCEEDING LIMIT | ○ | | | | | | | |

HEAD UNIT, DROPLET DISCHARGING APPARATUS, DROPLET DISCHARGING SYSTEM, INFORMATION PROCESSING APPARATUS, INFORMATION PROCESSING METHOD, STATUS INFORMATION NOTIFYING METHOD, STATUS INFORMATION UPDATING METHOD, FAULTY POSITION DETECTING METHOD, AND PROGRAMS

RELATED APPLICATION DATA

This application is a divisional of U.S. patent application Ser. No. 10/982,596, filed Nov. 4, 2004, the entirety of which is incorporated herein by reference to the extent permitted by law. The present application claims priority to Japanese Patent Application Nos. P2003-381392 filed Nov. 11, 2003, and P2004-001228 filed Jan. 6, 2004, the entirety all of which are incorporated by reference herein to the extent permitted by law.

BACKGROUND OF THE INVENTION

The present invention relates to a droplet discharging apparatus for discharging droplets at an object. More particularly, the invention relates to: a head unit having a discharge head capable of discharging droplets through a single discharge port at a plurality of pixel areas in deflected fashion; a droplet discharging apparatus equipped with that discharge head; an information processing apparatus capable of communicating adaptively with that droplet discharging apparatus; methods and programs for providing notification and updating status information and for being executed by that droplet discharging apparatus; an information processing apparatus for verifying and updating status information about that droplet discharging apparatus; methods and programs for processing information, detecting faulty positions, and updating status information and for being executed by that information processing apparatus; and a droplet discharging system made up of that droplet discharging apparatus and that information processing apparatus.

Ink discharge type printers have gained widespread use today. Depending on their use status, these printers can sometimes experience cases of degradation in performance. Notable cases of such degradation include faulty discharges due to clogged discharge ports (i.e., nozzles) or nozzles that have become defective.

Depending on its cause, a faulty function could be repaired theoretically by printer designers modifying relevant settings on the head unit of the affected printer. The hypothetical dispatch of a printer designer to the locale of the printer in question, however, is obviously unrealistic from a cost effectiveness point of view. In practice, service personnel having received technical information from manufacturers or venders are dispatched to repair failed equipment.

Repairs of some defects are difficult to accomplish except by those well-versed in the printer design. Manufacturers and venders have been slow to implement arrangements affording service personnel in the field sufficient means and expertise to isolate and deal with problems in diverse degrees of severity with ease, including the difficult cases.

Meanwhile, most printers are furnished with features allowing end users having noticed poor print quality to perform simple maintenance work and to check the remaining amount of ink for replenishment.

The users carry out their maintenance work typically by checking an indicator on the printer body or a display screen of an external computer connected with the printer being serviced. The servicing work illustratively includes head cleaning, gap control, and color correction.

Japanese Patent Laid-open No. 2001-7969 discloses techniques for causing an image reading apparatus (i.e., scanner) mounted on a printer to read the result of print and for diagnosing the operating status of the printer based on the read data.

Japanese Patent Laid-open No. 2001-7969 further discloses techniques for allowing or prompting the user to perform maintenance work based on the result of such diagnosis. The disclosed techniques are intended to eliminate the end user's subjective- and often erroneous-assessment of printer failures with a view to ensuring stable print quality.

However, the information provided within the framework of conventional technical assistance is mostly limited to basic settings (e.g., version information about a driver) of the printer, indications for urging the user to clean the printer head, and some supplementary knowledge about the printer innards that cannot be appraised from the outside.

In other words, end users are offered no detailed status information about the ink discharge section and other key parts of the printer or about their soiled conditions. At present, only service personnel and engineers involved in printer development have access to such information through the use of specialized analytic tools.

It follows that the user, having failed to restore normal printing through head cleaning, typically needs to let service personnel or specialists in printer development take care of the repairs without knowing what is actually wrong with the equipment. Such repairs mostly take place with the users bringing their faulty printers to service centers or having service personnel come over to their place for repair work.

In the meantime, the number of the above-mentioned analytic tools deployed in the field is generally small. Given their limited resources, service personnel are often forced to roughly isolate what appears to be the trouble with the printer, before replacing an entire unit containing the apparently isolated fault. As a result, the repair tends to cost more and take longer than is acceptable to many end users.

SUMMARY OF THE INVENTION

The present invention has been made in view of the above circumstances and has as its principal object the provision of techniques for allowing those engaged in repair work to easily isolate the probable cause of a faulty discharge head.

Another object of the invention is to provide techniques for allowing service personnel easily to change status information about the discharge head.

A further object of the invention is to provide arrangements for allowing the end user to verify the probable cause of a defective function with a high degree of confidence without resorting to specialized analytic tools.

An even further object of the invention is to provide arrangements for presenting the end user with necessary work to do or an appropriate action to take to repair the failed function.

In achieving the foregoing and other objects of the present invention and according to a first aspect thereof, there is provided a head unit including a discharge head for deflectively discharging droplets through one discharge port at a plurality of pixel areas, and a storage unit for rewritably holding status information about the discharge head.

According to a second aspect of the invention, there is provided a droplet discharging apparatus including: a discharge head for deflectively discharging droplets through one discharge port at a plurality of pixel areas in adaptive fashion, the discharge head being controlled to discharge droplets at an object; a storage unit for storing status information about the discharge head; and a communication unit for communicating with an information processing apparatus located outside so as to transmit the status information to the information processing apparatus.

According to a third aspect of the invention, there is provided a droplet discharging apparatus including: a discharge head for deflectively discharging droplets through one discharge port at a plurality of pixel areas in adaptive fashion, the discharge head being controlled to discharge droplets at an object; and a communication unit for communicating with an information processing apparatus located outside in order to write status information about the discharge head to a storage unit of the information processing apparatus.

According to a fourth aspect of the invention, there is provided an information processing apparatus having a computer installed internally. The information processing apparatus includes: a comparison unit for comparing image data derived from optically reading a test pattern discharged by a droplet discharging apparatus for defective position verification, with a threshold value defined for the test pattern with regard to each of a plurality of pixel positions; a detection unit for detecting a pixel position about which the read image data is found smaller than the corresponding threshold value based on results of the comparison by the comparison unit; and a display control unit for causing a display device to display position information about the discharge port corresponding to the detected pixel position as the position information about the discharge port of which a discharge defect is recognized.

According to a fifth aspect of the invention, there is provided an information processing apparatus having a computer installed internally. The information processing apparatus includes: an input admission unit for allowing position information about a discharge port for which a discharge defect is recognized to be input or corrected through a display screen; and a status information notification unit for notifying a droplet discharging apparatus located externally of the discharge port position information established through the discharge screen as the status information about a discharge head, in order to update the discharge head status information held by either the droplet discharging apparatus or by the discharge head.

According to a sixth aspect of the invention, there is provided a status information notifying method for use with a droplet discharging apparatus controlling a discharge head deflectively to discharge droplets through one discharge port at a plurality of pixel areas in adaptive fashion. The status information notifying method is executed to have the droplet discharging apparatus operate in restored function mode. The status information notifying method includes the steps of: reading status information about the discharge head from a storage unit when an information processing apparatus located externally designates restored function mode; and transmitting the read status information to the information processing apparatus.

According to a seventh aspect of the invention, there is provided a status information updating method for use with a droplet discharging apparatus controlling a discharge head deflectively to discharge droplets through one discharge port at a plurality of pixel areas in adaptive fashion. The status information updating method is executed to have the droplet discharging apparatus operate in restored function mode. The status information updating method includes the step of: updating status information held in a storage unit about the discharge head by use of status information received from an information processing apparatus located externally.

According to an eighth aspect of the invention, there is provided a defective position detecting method including the steps of: comparing image data derived from optically reading a test pattern discharged by a droplet discharging apparatus for defective position verification, with a threshold value defined for the test pattern with regard to each of a plurality of pixel positions; detecting a pixel position about which the read image data is found smaller than the corresponding threshold value based on results of the comparison in the comparing step; and causing a display device to display position information about the discharge port corresponding to the detected pixel position as the position information about the discharge port of which a discharge defect is recognized.

According to a ninth aspect of the invention, there is provided a status information updating method including the steps of: allowing position information about a discharge port for which a discharge defect is recognized to be input or corrected through a display screen; and notifying a droplet discharging apparatus located externally of the discharge port position information established through the discharge screen as the status information about a discharge head, in order to update the discharge head status information held by either the droplet discharging apparatus or by the discharge head.

According to a tenth aspect of the invention, there is provided a program for use with a computer incorporated in a droplet discharging apparatus including a discharge head, which deflectively discharges droplets through one discharge port at a plurality of pixel areas in adaptive fashion and which is controlled to discharge droplets at an object. The program causes the computer to carry out the steps of: reading status information about the discharge head from a storage unit when an information processing apparatus located externally designates restored function mode; and transmitting the read status information to the information processing apparatus.

According to an eleventh aspect of the invention, there is provided a program for use with a computer incorporated in a droplet discharging apparatus including a discharge head, which deflectively discharges droplets through one discharge port at a plurality of pixel areas in adaptive fashion and which is controlled to discharge droplets at an object. The program causes the computer to carry out the step of: updating status information held in a storage unit about the discharge head by use of status information received from an information processing apparatus located externally.

According to a twelfth aspect of the invention, there is provided a program for use with a computer incorporated in an information processing apparatus. The program causes the computer to carry out the steps of: comparing image data derived from optically reading a test pattern discharged by a droplet discharging apparatus for defective position verification, with a threshold value defined for the test pattern with regard to each of a plurality of pixel positions; detecting a pixel position about which the read image data is found smaller than the corresponding threshold value based on results of the comparison in the comparing step; and causing a display device to display position information about the discharge port corresponding to the detected pixel position as the position information about the discharge port of which a discharge defect is recognized.

According to a thirteenth aspect of the invention, there is provided a program for use with a computer incorporated in an information processing apparatus. The program causes the computer to carry out the steps of: allowing position information about a discharge port for which a discharge defect is recognized to be input or corrected through a display screen;

and notifying a droplet discharging apparatus located externally of the discharge port position information established through the discharge screen as the status information about a discharge head, in order to update the discharge head status information held by either the droplet discharging apparatus or by the discharge head.

The inventive arrangements outlined above allow service personnel to verify status information about a stand-alone head unit or a head unit incorporated in a droplet discharging apparatus. The service personnel are thus able to grasp the current status of the discharge head and change its status information with little difficulty. This makes it possible to recover easily from a failed function of the discharge head.

Furthermore, according to a fourteenth aspect of the invention, there is provided a droplet discharging system including a droplet discharging apparatus and an information processing apparatus interconnected by a communication channel. The droplet discharging apparatus includes: a detection unit for detecting changes in status of a monitored object; a storage unit for storing either detected values from the detection unit or a use history of the monitored object as status information; and a communication unit for communicating with the information processing apparatus located externally so as to transmit the status information to the information processing apparatus. The information processing apparatus includes: an analysis unit for analyzing the status information acquired from the droplet discharging apparatus through communication; and a presentation unit for presenting an end user with a probable cause of a detected defect in the monitored object in either textual or visual form, the probable cause having been isolated through analysis by the analysis unit.

According to a fifteenth aspect of the invention, there is provided a droplet discharging system including a droplet discharging apparatus and an information processing apparatus interconnected by a communication channel. The droplet discharging apparatus includes: a detection unit for detecting changes in status of a monitored object; a storage unit for storing either detected values from the detection unit or a use history of the monitored object as status information; and a communication unit for communicating with the information processing apparatus located externally so as to transmit the status information to the information processing apparatus. The information processing apparatus includes: an analysis unit for analyzing the status information acquired from the droplet discharging apparatus through communication; and a presentation unit for presenting an end user in either textual or visual form with contents of work to be done to recover from a probable cause of a detected defect in the monitored object, the probable cause having been isolated through analysis by the analysis unit.

According to a sixteenth aspect of the invention, there is provided a droplet discharging apparatus including: a detection unit for detecting changes in status of a monitored object; a storage unit for storing either detected values from the detection unit or a use history of the monitored object as status information; and a communication unit for communicating with an information processing apparatus located externally so as to transmit the status information to the information processing apparatus.

According to a seventeenth aspect of the invention, there is provided an information processing apparatus for carrying out information processing needed to recover from a defective function of a droplet discharging apparatus connected with the information processing apparatus via a communication channel. The information processing apparatus includes: a communication unit for receiving status information from the droplet discharging apparatus; an analysis unit for analyzing either detected values of changes in status of a monitored object or a use history of the monitored object, the detected values or the use history having been acquired as the status information from the droplet discharging apparatus; and a presentation unit for presenting an end user with a probable cause of a detected defect in the monitored object in either textual or visual form, the probable cause having been isolated through analysis by the analysis unit.

According to an eighteenth aspect of the invention, there is provided an information processing apparatus for carrying out information processing needed to recover from a defective function of a droplet discharging apparatus connected with the information processing apparatus via a communication channel. The information processing apparatus includes: a communication unit for receiving status information from the droplet discharging apparatus; an analysis unit for analyzing either detected values of changes in status of a monitored object or a use history of the monitored object, the detected values or the use history having been acquired as the status information from the droplet discharging apparatus; and a presentation unit for presenting an end user in either textual or visual form with contents of work to be done to recover from a probable cause of a detected defect in the monitored object, the probable cause having been isolated through analysis by the analysis unit.

According to a nineteenth aspect of the invention, there is provided an information processing method for use with an information processing apparatus connected to a droplet discharging apparatus via a communication channel. The information processing method includes the steps of: analyzing either detected values of changes in status of a monitored object or a use history of the monitored object, the detected values or the use history having been acquired as status information from the droplet discharging apparatus; and presenting an end user with a probable cause of a detected defect in the monitored object in either textual or visual form, the probable cause having been isolated through analysis in the analyzing step.

According to a twentieth aspect of the invention, there is provided an information processing method for use with an information processing apparatus connected to a droplet discharging apparatus via a communication channel. The information processing method includes the steps of: analyzing either detected values of changes in status of a monitored object or a use history of the monitored object, the detected values or the use history having been acquired as status information from the droplet discharging apparatus; and presenting an end user in either textual or visual form with contents of work to be done to recover from a probable cause of a detected defect in the monitored object, the probable cause having been isolated through analysis in the analyzing step.

According to a twenty-first aspect of the invention, there is provided a program for use with a computer incorporated in an information processing apparatus connected to a droplet discharging apparatus via a communication channel. The program causes the computer to carry out the steps of: analyzing either detected values of changes in status of a monitored object or a use history of the monitored object, the detected values or the use history having been acquired as status information from the droplet discharging apparatus; and presenting an end user with a probable cause of a detected defect in the monitored object in either textual or visual form, the probable cause having been isolated through analysis in the analyzing step.

According to a twenty-second aspect of the invention, there is provided a program for use with a computer incorporated in an information processing apparatus connected to a droplet discharging apparatus via a communication channel. The program causes the computer to carry out the steps of: analyzing either detected values of changes in status of a monitored object or a use history of the monitored object, the detected values or the use history having been acquired as status information from the droplet discharging apparatus; and presenting an end user in either textual or visual form with contents of work to be done to recover from a probable cause of a detected defect in the monitored object, the probable cause having been isolated through analysis in the analyzing step.

If any defect is detected, the inventive arrangements outlined above enable the information processing apparatus to gain direct access to status information about the connected droplet discharging apparatus for analysis and thereby to present the end user with the probable cause of the defect with a high degree of confidence. This makes it possible for the end user to determine early on whether the trouble can be dealt with on the user's side or needs to be taken care of by service personnel.

The early diagnosis is beneficial to both the end user and the specialists who are to take over the repair.

Since results of the diagnosis have already been known in appreciably detailed fashion, it costs less and takes shorter time than usual for the experts to do the repair work, including preparation of necessary parts, on the faulty apparatus that is brought into the service center or similar facilities. Obviously, the end user's subjective assessments of the defect status are minimized so that the trouble is dealt with professionally.

With the inventive arrangements above in use, the end user is presented in an easy-to-understand visual format with contents of work to be done to recover from the defective function. Shortly after the occurrence of a failure, it is thus possible to determine whether or not the end user can take care of it.

The inventive arrangements allow the end user adequately to fix simple troubles on the spot. The practice saves time and money that would otherwise be needed for the repair by experts. Needless to say, the end user is suitably guided to address the defect with no need to rely on subjective assessments.

BRIEF DESCRIPTION OF THE DRAWINGS

These and other objects of the invention will be seen by reference to the description, taken in connection with the accompanying drawing, in which:

FIG. 15 is a schematic view showing relations between written discharge patterns and actually discharged patterns;

FIG. 40 is a tabular view showing relations between detailed errors and their probable causes.

DETAILED DESCRIPTION OF THE PREFERRED EMBODIMENTS

A first embodiment of this invention will now be described.

(1) Head Unit

Figure 1:
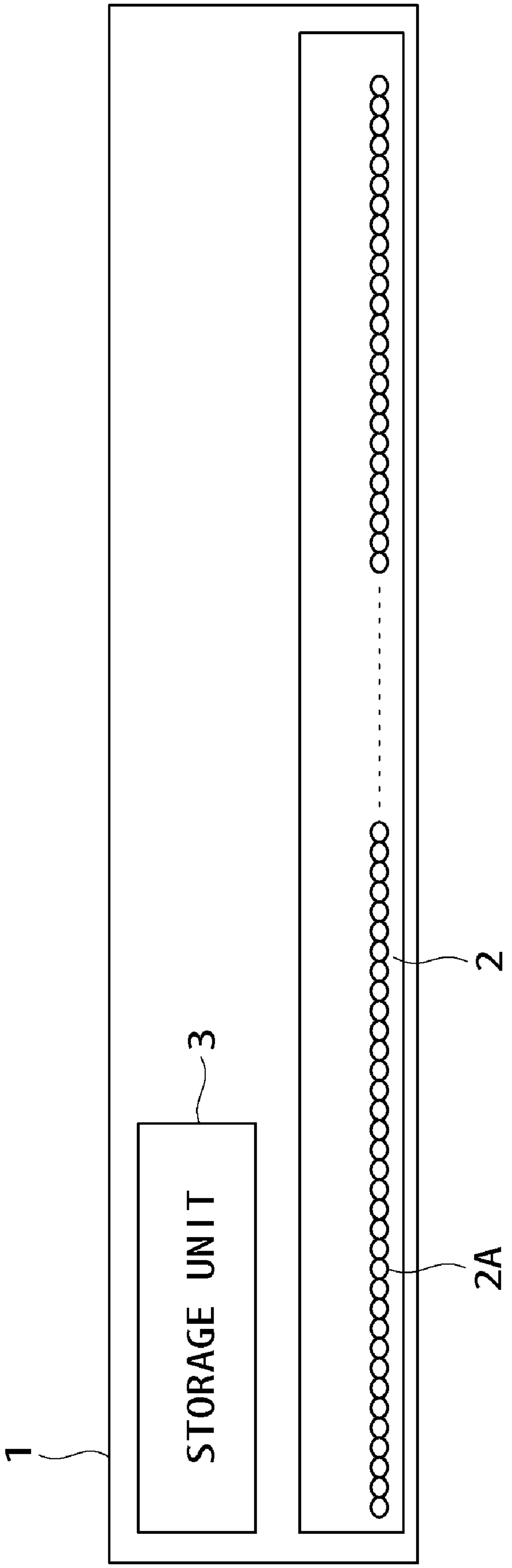
FIG. 1 is a schematic view showing a structure of a head unit.

In order to achieve the foregoing and other objects of this invention, the invention proposes a head unit including the components to be described below. FIG. 1 shows a typical structure of a head unit 1 according to the invention. The head unit 1 includes a discharge head 2 and a storage unit 3. The discharge head 2 has each of its discharge ports 2A discharging droplets at a plurality of pixel areas. The storage unit 3 rewritably retains status information about the discharge head 2.

Figure 2A:
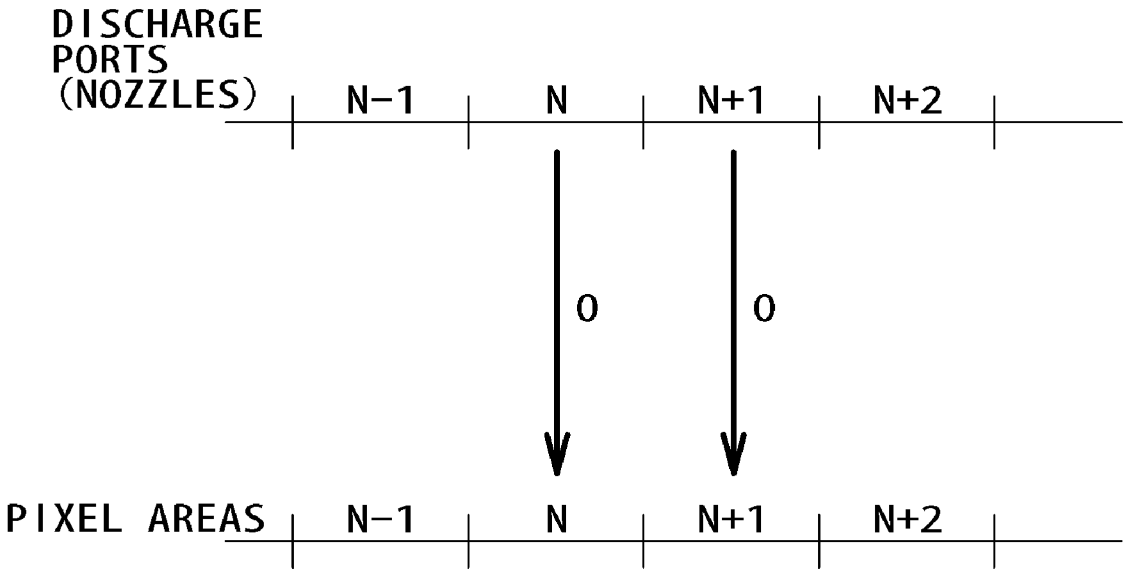
FIGS. 2A and 2B are schematic views explaining how droplets are discharged deflectively.
Figure 2B:
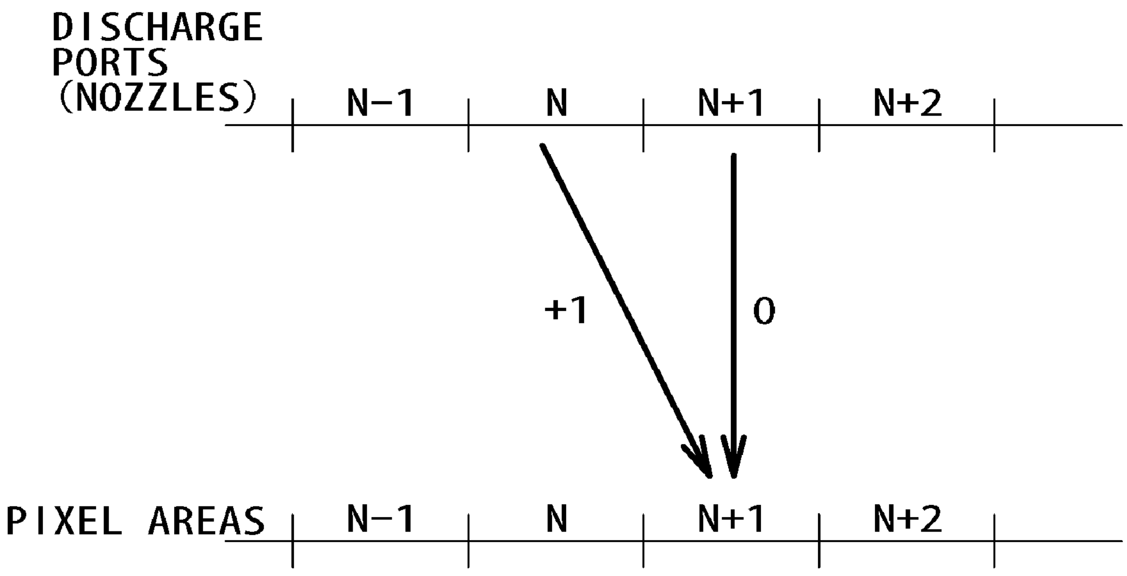

The head unit 1 uses the discharge ports 2A each capable of discharging droplets not only at a single pixel area but also at a plurality of pixel areas. Illustratively, as shown in FIGS. 2A and 2B, each discharge port may discharge droplets deflectively at two pixel areas. FIG. 2A indicates an example in which deflective discharge is not carried out, while FIG. 2B shows an example in which droplets are discharged deflectively. The deflective discharge capability allows each pixel area to be rendered by droplets coming from two discharge ports.

That capability may be used to restore the function of a defective discharge port. Suppose that an (N+1)-th port fails to discharge droplets. In that case, the failed function is restored by getting an N-th discharge port to discharge droplets at the (N+1)-th pixel area. Obviously, the N-th pixel area is rendered by droplets coming from the N-th discharge port. The interpolative discharge feature helps restore normal image quality in case of a discharge port failure.

The defective discharging of droplets from a discharge port may have a number of causes: the port in question is completely clogged; the amount of droplets being discharged is insufficient; or the direction of discharged droplets from the port is skewed.

Where the (N+1)-th discharge port is found to have its discharge direction deviated, normal image quality is restored by causing the N-th discharge port to discharge droplets at the (N+1)-th pixel area. If it is possible electrically to modify the deflection angle of discharged droplets from each discharge port, an offset signal may be applied to the N-th discharge port to compensate for the discharge direction deviation. This is an alternative way to recover individually from the failed (N+1)-th discharge port.

To implement the above-described function recovery requires that the defective port position be recognized by the printer in advance. An item of status information about the discharge head 2, held in the storage unit 3, constitutes position information about the discharge port 2A associated with the discharge failure explained above. The storage unit 3 should preferably be a rewritable memory.

The writable storage unit is preferred because the status information about the discharge head varies over time. In order to recover from a discharge head defect, it is necessary to keep the discharge head status information up to date. It is also preferred that the information in the storage unit be held intact in case of a power failure. The status information about the discharge head 2 has nothing to do with the printer itself.

(2) Droplet Discharging Apparatus

Figure 3:
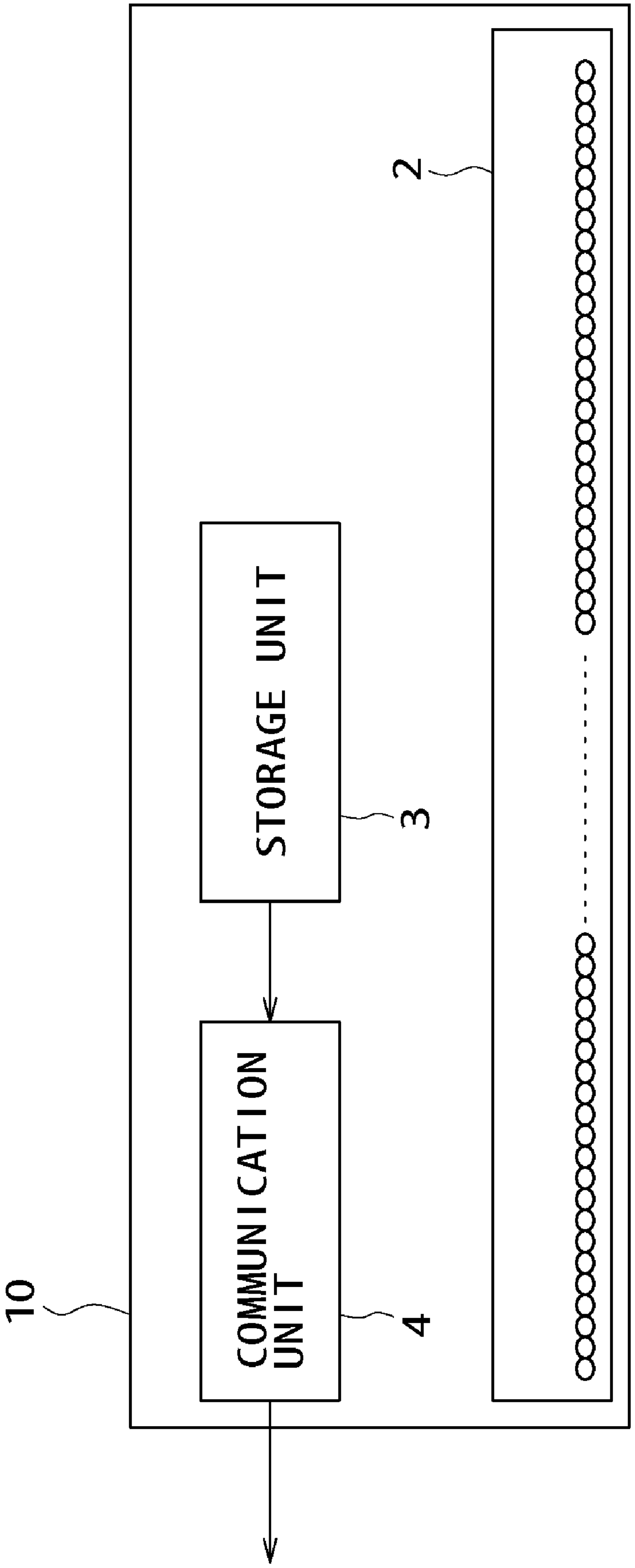
FIG. 3 is a schematic view depicting a structure of a droplet discharging apparatus with its status information transmitted to the outside.

This invention also proposes a droplet discharging apparatus having the components to be described below. FIG. 3 outlines a typical structure of a droplet discharging apparatus 10 according to the invention. The droplet discharging apparatus 10 is capable of controlling the discharge head 2 adaptively to discharge droplets through each of its discharge ports at a plurality of pixel areas on an object.

The discharge head 2 may be formed integrally with the droplet discharging apparatus or may be attached removably to the apparatus. The droplet discharging apparatus 10 includes a storage unit 3 and a communication unit 4. The storage unit 3 retains status information about the discharge head 2. The communication unit 4 communicates with an information processing apparatus located externally and writes status information about the discharge head 2 to the storage unit 3.

Preferably, the storage unit 3 should also be one in which the status information about the discharge head 2 can be retained rewritably. The storage unit 3 may be installed independently of the discharge head 2 if so desired. The storage medium for use by the storage unit 3 is one which is incorporated in, or may be loaded into, the droplet discharging apparatus.

Illustratively, the storage medium may be a semiconductor memory; a magnetic storage medium such as a magnetic disc (flexible disk or hard disk) or a magnetic tape; or an optical storage medium such as an optical disk, an optical tape, or a machine-readable bar code-carrying entity. The storage unit 3 may also be furnished as part of the above-described head unit 1.

The communication unit 4 is an interface device that conducts communications with an information processing apparatus connected externally to the droplet discharging apparatus. The physical connection setup may be implemented in wired or wireless fashion using serial, parallel, or network communication terminals.

Illustratively, communications may be established over the Internet. The communication unit 4 notifies the externally located information processing apparatus of the status information about the discharge head. In other words, the communication unit 4 allows the worker engaged in repair work to readily grasp operation status of the discharge head.

The information processing apparatus may be any electronic appliance incorporating computer capabilities, such as a Personal Computer (PC), Personal Digital Assistant (PDA), a mobile phone, or a video game console.

The droplet discharging apparatus may be any apparatus that has a discharge head, such as a printer or a combination printer-scanner. The droplet discharging apparatus may also be a sample discharging apparatus for discharging droplets of diverse samples.

Preferably, the droplet discharging apparatus should include an information conversion unit that converts status information into text-format data. When the droplet discharging apparatus using its information conversion capability notifies an external information processing apparatus of the converted data, there is no need for an externally installed information conversion unit with specialized software to report the operation status of the discharge head to the outside apparatus.

Figure 4:
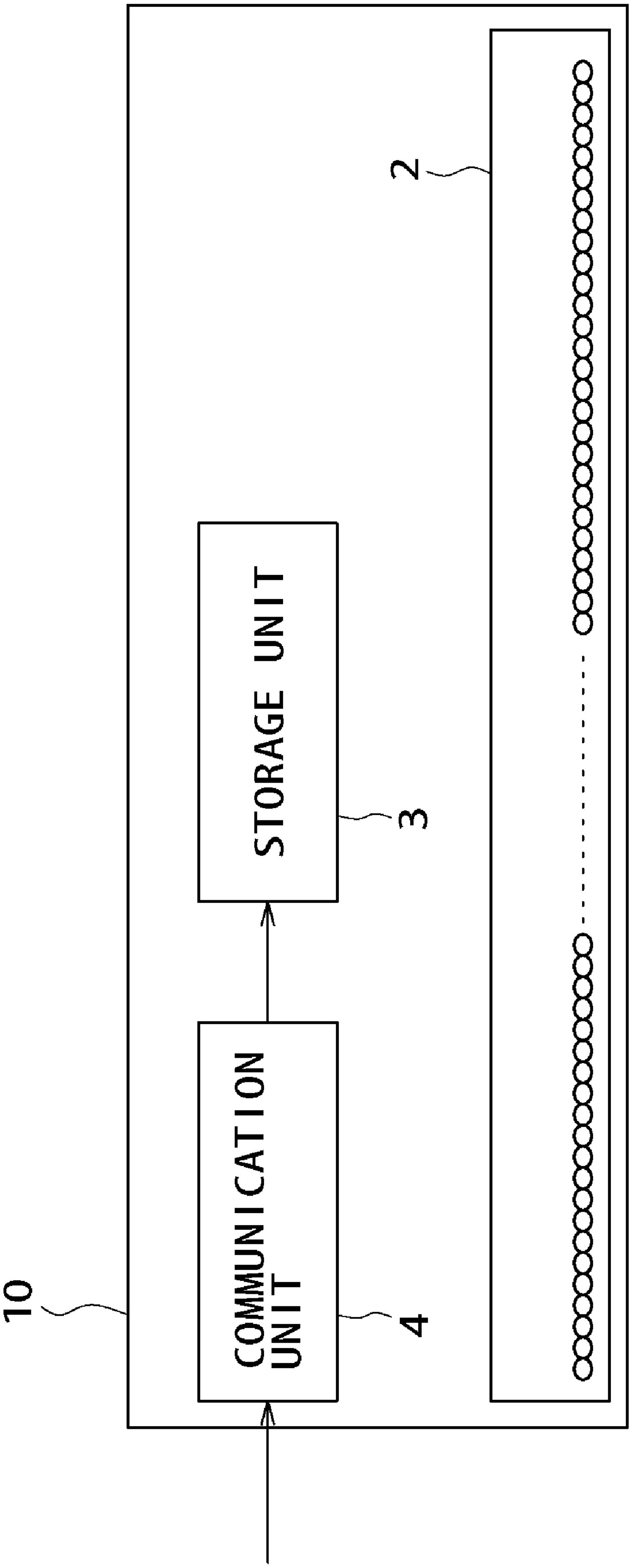
FIG. 4 is a schematic view illustrating a structure of a droplet discharging apparatus with its status information updated externally.

FIG. 4 shows another droplet discharging apparatus according to the invention. A communication unit 4 of this apparatus communicates with an externally located information processing apparatus and is used to write status information about a discharge head 2 to a storage unit 3. The communication unit 4 permits updating of status information being held in the droplet discharging apparatus. In turn, the status information thus updated allows the worker engaged in repair work to restore a failed function of the discharge head 2.

The droplet discharging apparatus should preferably possess an authentication unit for enabling only an authenticated communicating party to access the storage unit 3. That status information about the discharge head 2, which is held in the storage unit 3, is important for keeping the result of the rendering above a predetermined level of quality. This requires that only those who recognize the importance of the status information be granted access to the storage unit 3.

(3) Information Processing Apparatus

Figure 5:
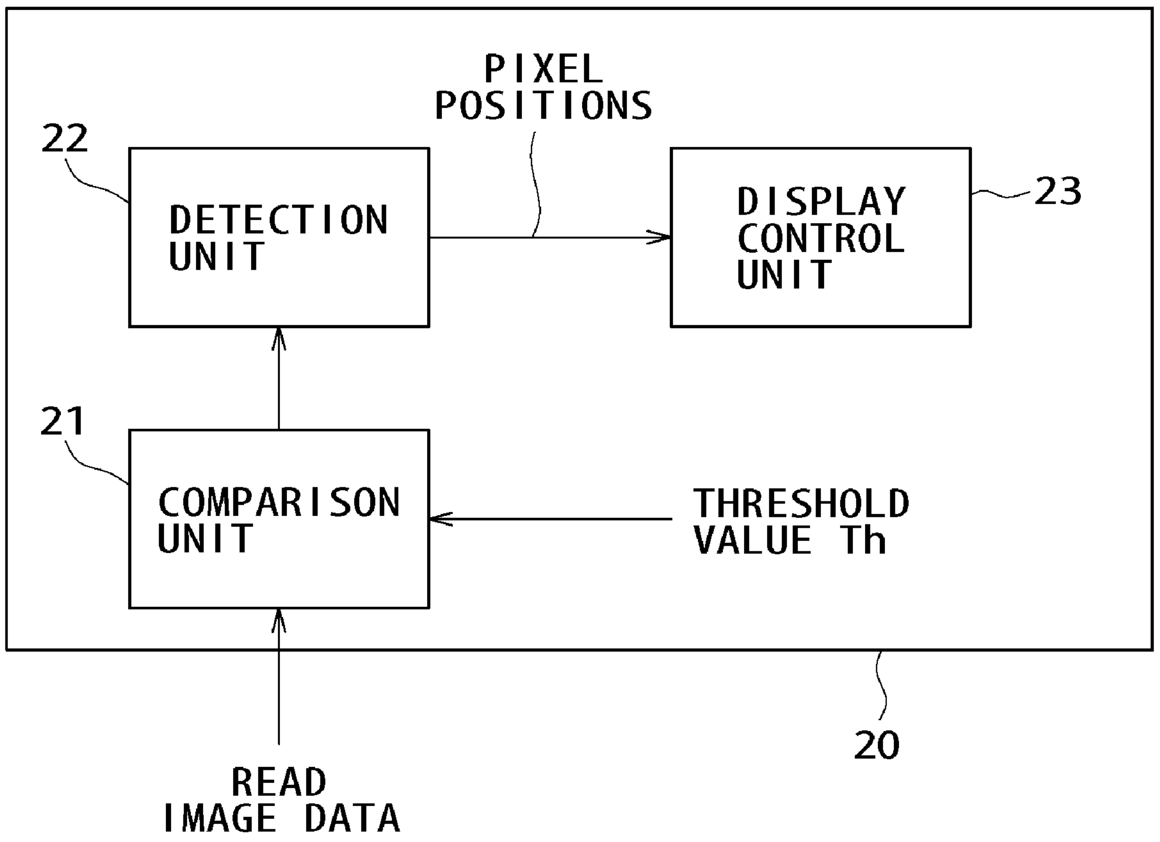
FIG. 5 is a block diagram of an information processing apparatus arranged to analyze defective positions.

This invention also proposes an information processing apparatus having the components to be discussed below. FIG. 5 depicts a typical structure of an information processing apparatus 20 according to the invention. In the inventive information processing apparatus 20, a comparison unit 21 compares a threshold value Th of a test pattern discharged by the droplet discharging apparatus for defective position verification, with optically read image data about each of the pixel positions involved.

Test patterns rendered by discharged droplets are arranged so that the discharge ports having discharged the droplets are made distinguishable from one another. For example, the patterns rendered by adjacent discharge ports appear in stepped fashion relative to the row of the discharge ports. In such a case, the pixel positions corresponding to the discharge port array reflect the individual discharge ports laid out on the discharge head.

Given the result of the comparison by the comparison unit 21, a detection unit 22 detects any pixel position on which the read image data is found smaller than the threshold value Th. The image data below the threshold value Th indicates that the amount of discharged droplets from a given discharge port is less than normal. This means the discharge port in question is completely clogged, that the amount of droplets from the port is insufficient, or that the landing position of the droplets is displaced.

A display control unit 23 causes a display device to display position information about the discharge portions corresponding to the detected pixel positions as position information about discharge ports having discharge defects. The display control unit 23 presents the worker engaged in repair work with a display of a faulty discharge head in a clearly distinguishable manner, illustratively using numbers that uniquely identify each of the discharge ports tested.

Figure 6:
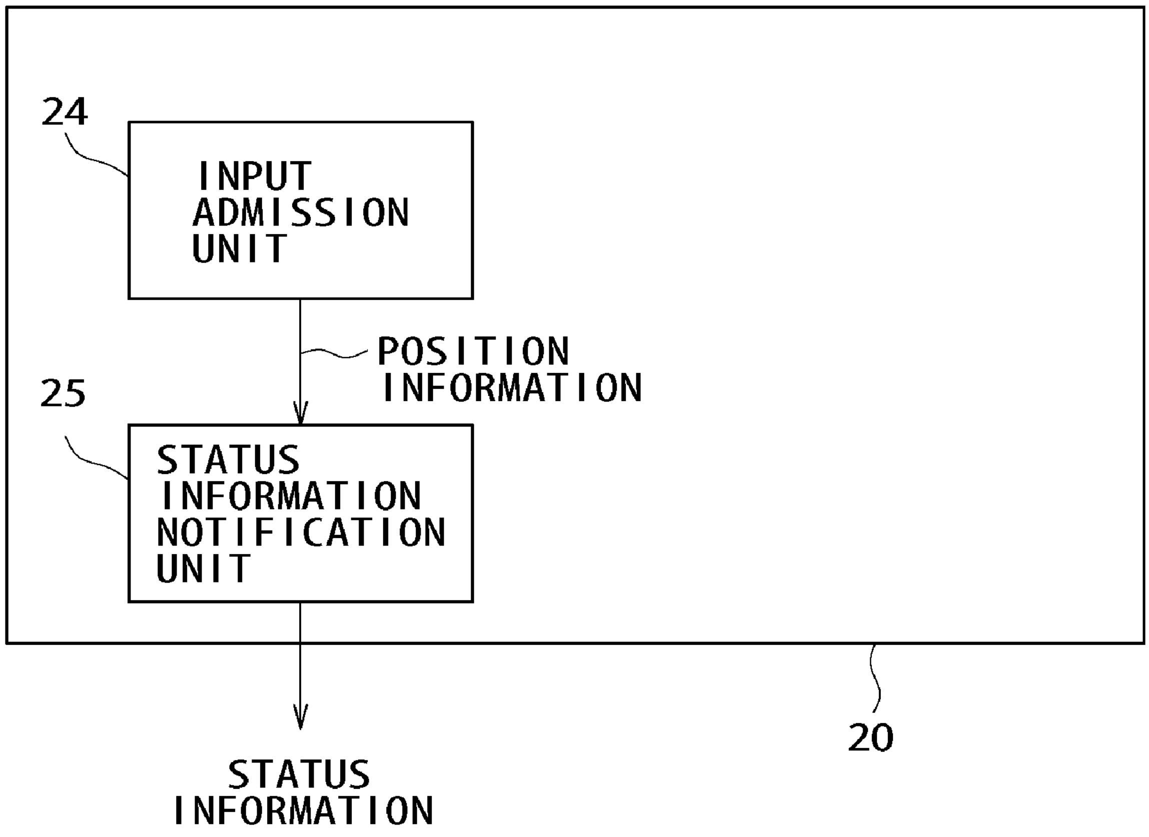
FIG. 6 is a block diagram of an information processing apparatus arranged to update status information.

FIG. 6 outlines another information processing apparatus 20 according to the invention. This apparatus 20 includes an input admission unit 24 and a status information notification unit 25. The input admission unit 24 causes the display device to display a screen through which position information about defective discharge ports is input.

The status information notification unit 25 notifies the droplet discharging apparatus connected via a communication channel, of the discharge port position information entered through the screen as the status information about the discharge head. The notification triggers updating of that status information about the discharge head which is held by the droplet discharging apparatus or by the discharge head itself.

As described, the worker engaged in repair work need only input discharge port position information in order to repair the failed function of the droplet discharging apparatus or discharge head.

(4) Others

The above arrangements proposed by the invention may also be implemented in the form of methods and programs for notifying or updating status information according to other aspects of the invention. These methods and programs when implemented are executed by the droplet discharging apparatus.

The proposed inventive arrangements may further be implemented in the form of methods and programs for detecting defective positions or for updating status information according to other aspects of the invention. These methods and programs when implemented are carried out by the information processing apparatus.

The programs are carried in fixed fashion on recording media for delivery or distribution. Alternatively, the programs may be delivered or distributed over suitable transmission channels.

A printer that discharges ink droplets will now be described as a more detailed example of the droplet discharging apparatus according to the invention. It is assumed that the techniques that are not specifically described in this specification or illustrated in any of its accompanying drawings are part of the techniques and expertise well known to those skilled in the art.

It is also assumed that a computer is used as the information processing apparatus for verifying status information about the discharge head incorporated in the printer.

(1) Computer (1-1) Hardware

Figure 7:
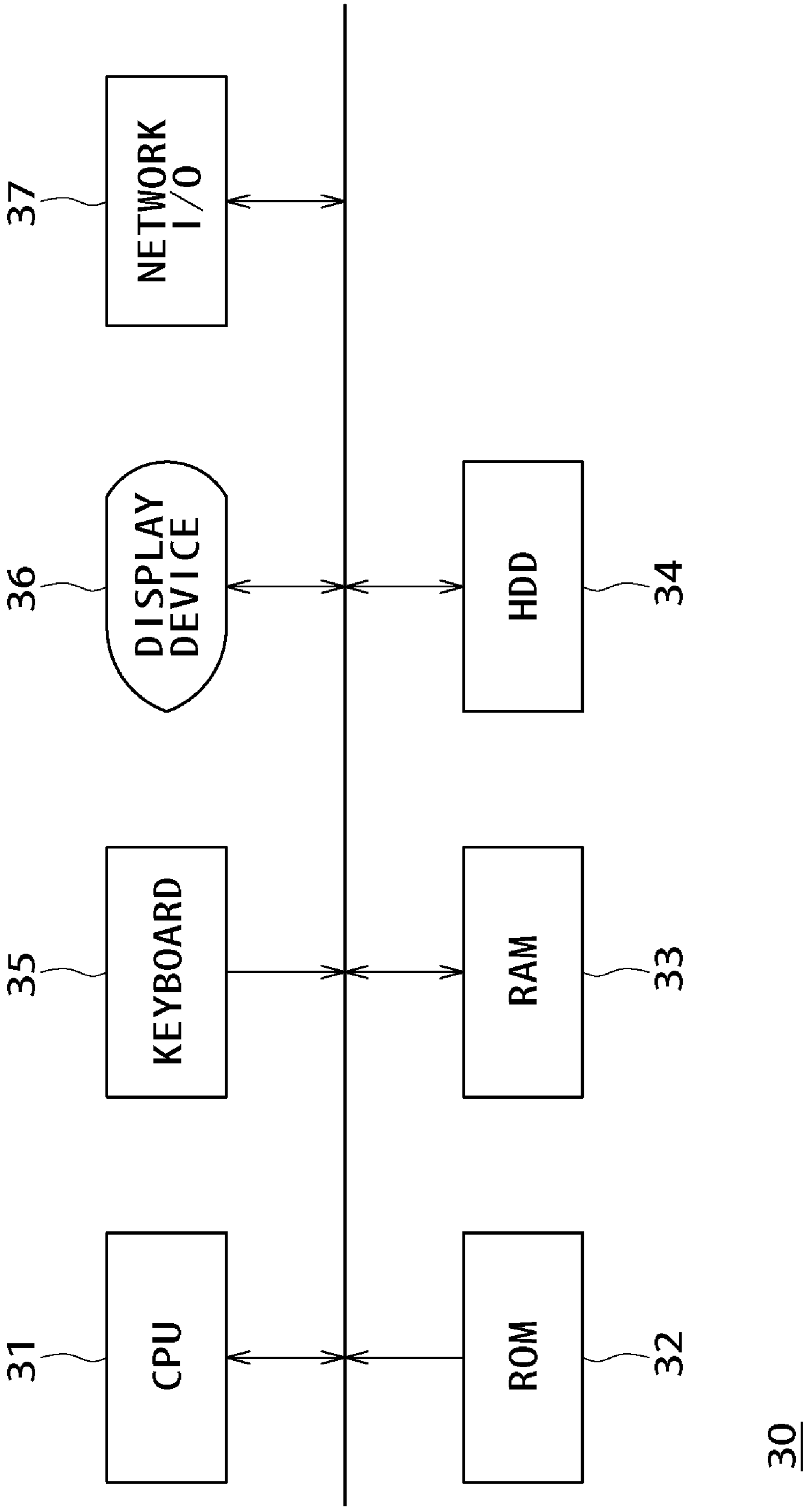
FIG. 7 is a block diagram indicating an internal structure of a computer.

FIG. 7 shows a typical structure of a computer 30, which is well known to those skilled in the art.

The computer 30 includes a CPU (Central Processing Unit) 31, a ROM (Read Only Memory) 32, a RAM (Random Access Memory) 33, a hard disk drive 34, a keyboard 35, a display device 36, and a network I/O 37.

The CPU 31 executes programs using the RAM 33 as its work area. The program execution implements diverse functions. The ROM 32 retains basic programs for controlling data output and input to and from peripheral devices. The RAM 33 is where an operating system and application programs are carried out. The hard disk drive 34 stores the operating system and application programs. The programs according to this invention are also stored on the hard disk drive 34.

The keyboard 35 is an input device used by the worker to input commands and information to the computer. Another typical input device is a mouse. The display device 36 is an output device that displays a user interface screen designed with such graphic parts as buttons and menus. The worker checks the status of the printer by looking up what is displayed on the user interface screen. The worker may modify status information about the printer through the user interface screen.

The network I/O 37 provides communication between the CPU 31 connected to an internal bus on the one hand and network equipment on the other hand. With this embodiment, the network I/O 37 connects the computer 30 to the printer via a network. Access to the printer is provided by use of an IP address or HTTP.

(1-2) Software

The computer 30 carries out a number of programs to resolve problems that may occur on the printer. One such program is an analytic program used to check the operation status of the printer.

The analytic program is executed with regard to image data that is optically read from the result of a test pattern printout. The test patterns are assumed to be defined beforehand for verification of the discharge status of the discharge head.

Figure 8:
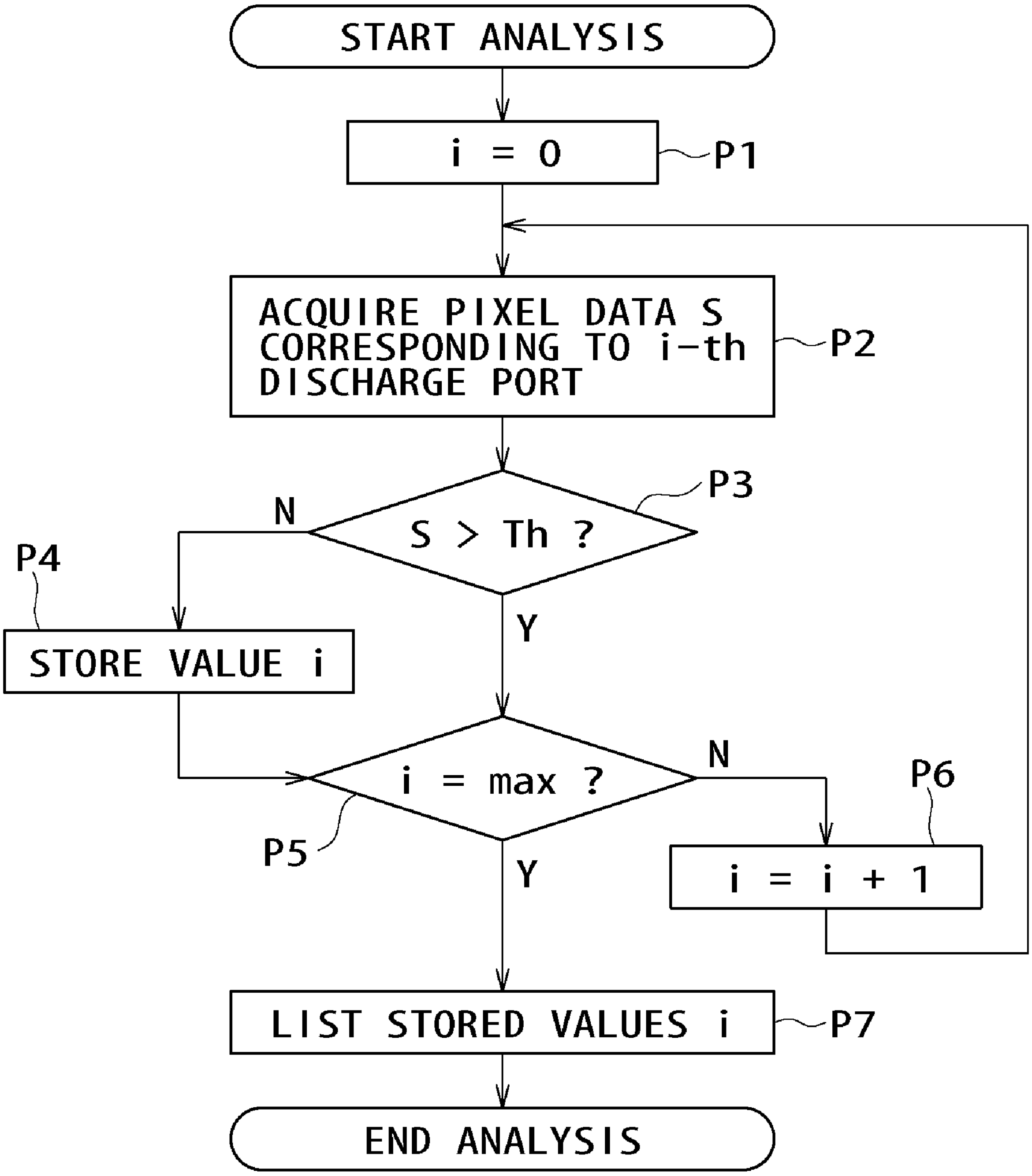
FIG. 8 is a flowchart of processes in which an analytical program is executed.

FIG. 8 is a flowchart of typical processes in which the analytical program is executed. After starting up the program, the computer in process P1 resets a count value "i" on a counter that specifies a discharge port. In process P2, the computer acquires image data S corresponding to an i-th discharge port.

In process P3, the computer determines whether the acquired image data S is greater than a threshold value Th.

Illustratively, the threshold value Th is defined as half the conceivable image data S. In the case of a color printer, the determining process is carried out on each of the colors involved. If the image data is found smaller than the threshold value Th in process P3, the computer determines that the discharge port corresponding to this pixel has failed to discharge droplets, and saves the count value "i" identifying the pixel position in process P4. The computer then goes to process P5.

If the image data S is found larger than the threshold value Th in process P3, the computer goes directly to process P5. In process P5, the computer determines whether the count value "i" has reached a predetermined maximum value. Every time the count value "i" is found below its maximum, the computer increments the count value "i" by 1 in process P6 and returns to process P2. The routine ranging from process P2 to process P5 is repeated until the count value reaches the maximum value.

When the counter reaches the maximum value, the computer in process P7 displays on the display device 36 a list of count values "i" representing the discharge ports found to have discharge defects. In the case of a color printer, the count values are listed for each of the colors involved.

The processing shown in FIG. 8 constitutes a procedure for determining defective discharge positions. Where it is necessary to analyze rendering displacements (in amount and direction) attributable to a skewed mounting position of a head chip (the smallest unit of discharge ports arrayed in line) as part of the discharge head, another determining procedure is utilized. For example, in process P2 of FIG. 8, the computer selects image data about eight pixels surrounding the suspected pixel position. The computer determines whether each of the eight pixel data is larger or smaller than the threshold value Th.

Thereafter, the computer compares the conceivable patterns of detection with the actually detected patterns to measure the amounts and directions of the deviations.

The measurements are displayed in list form as position information about the discharge ports having discharge defects. For the two procedures above, the fact remains that the normal rendering is unavailable.

(1-3) Test Patterns for Discharge Status Verification

Figure 9:
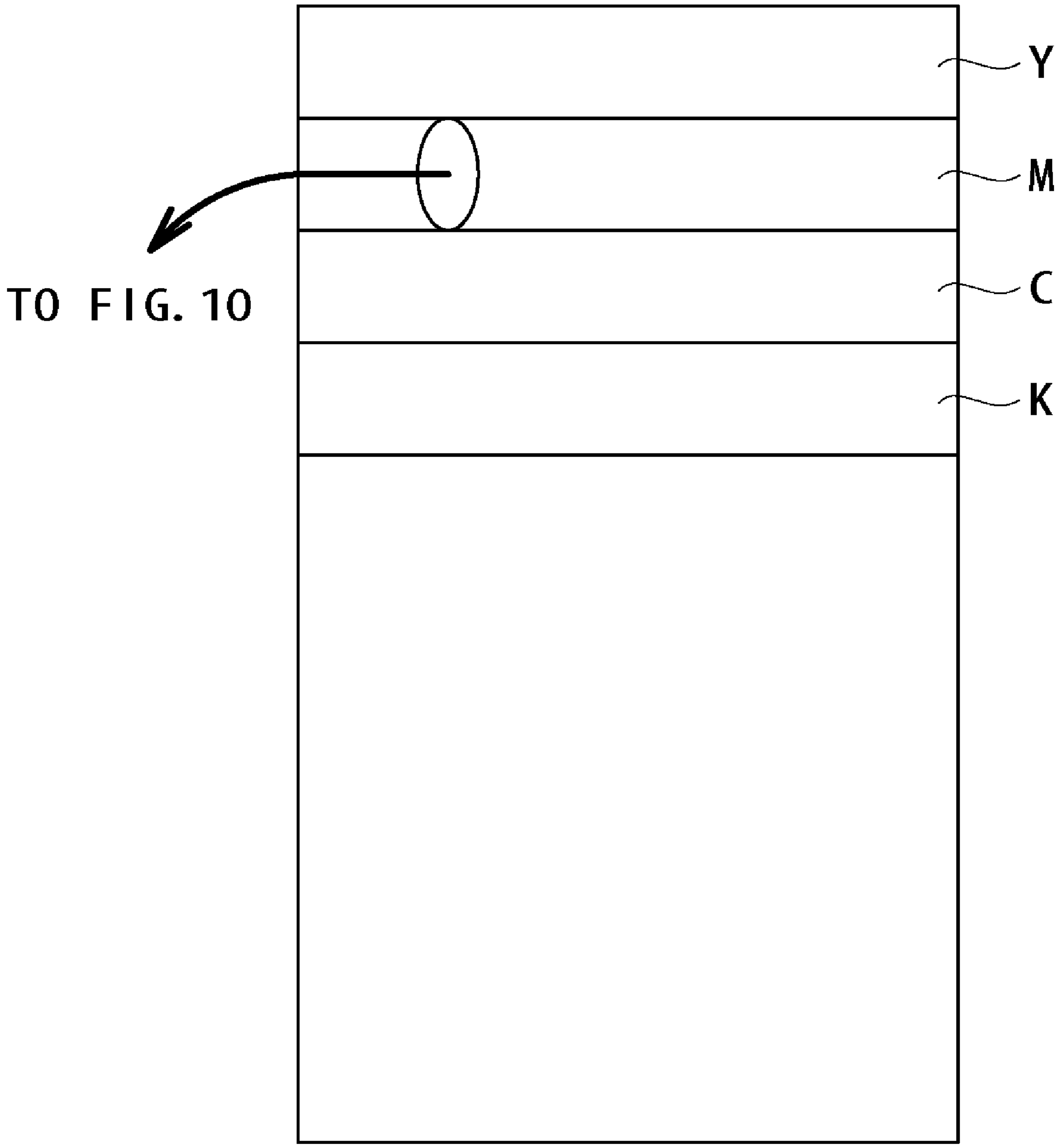
FIG. 9 is a schematic view of a test pattern.

FIG. 9 shows a typical test pattern kept in the computer 30 for discharge status verification. The test patterns, retained illustratively on the hard disk drive, each include stripes made up of, say, four colors (yellow (Y), magenta (M), cyan (N), and black (K)).

Figure 10:
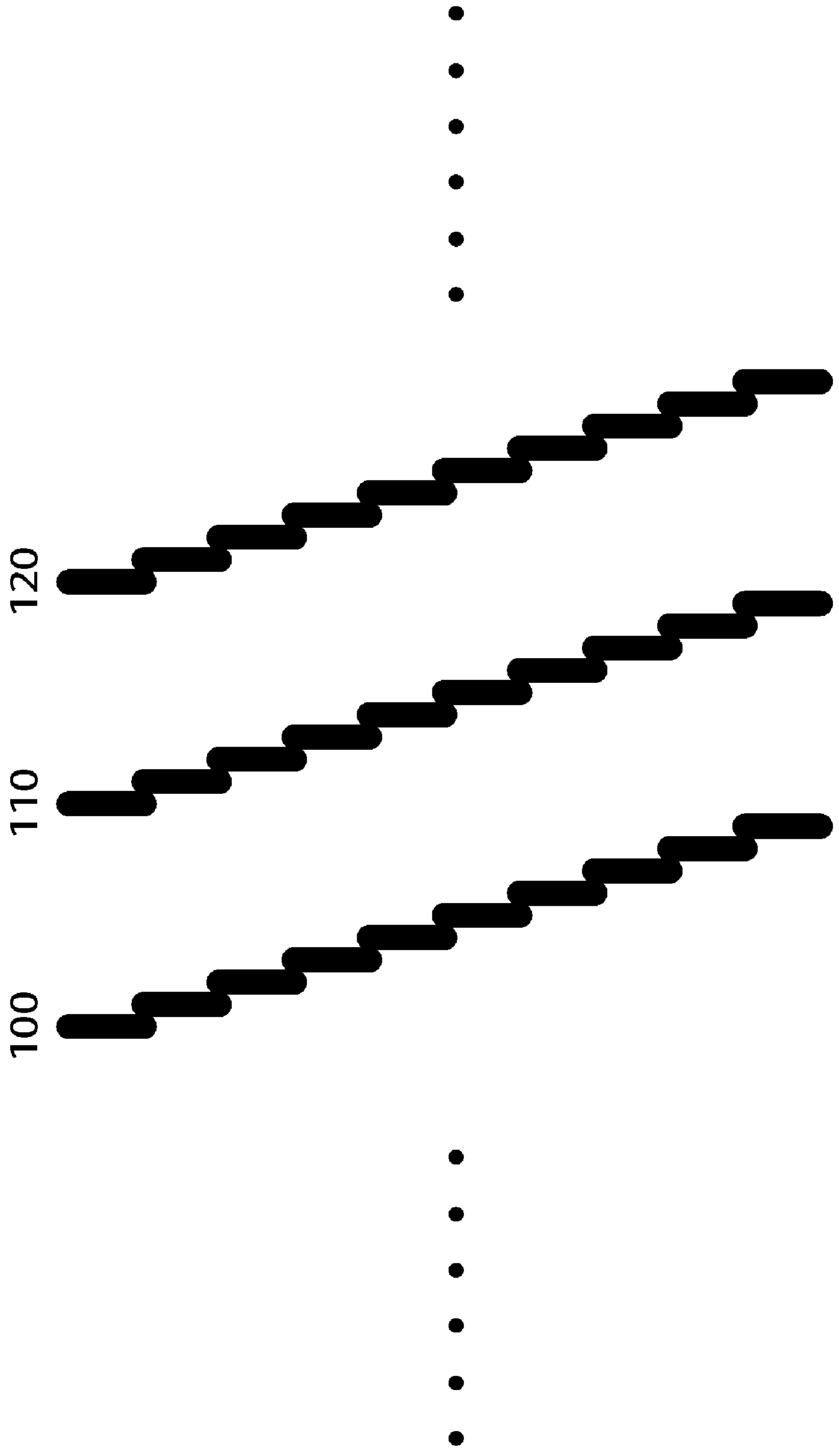
FIG. 10 is an enlarged view of the test pattern.

FIG. 10 is an enlarged view of the test pattern in FIG. 9. As shown in FIG. 10, this test pattern is formed by stepped basic patterns arranged in the direction of the discharge port array. In this pattern example, each basic pattern has 10 steps each corresponding to a single discharge port.

The adjacent basic patterns in the same step are thus 10 discharge ports apart. For this reason, the smallest rendering patterns making up a given test pattern are each an independent pattern in the vertical and the horizontal directions.

Figure 11:
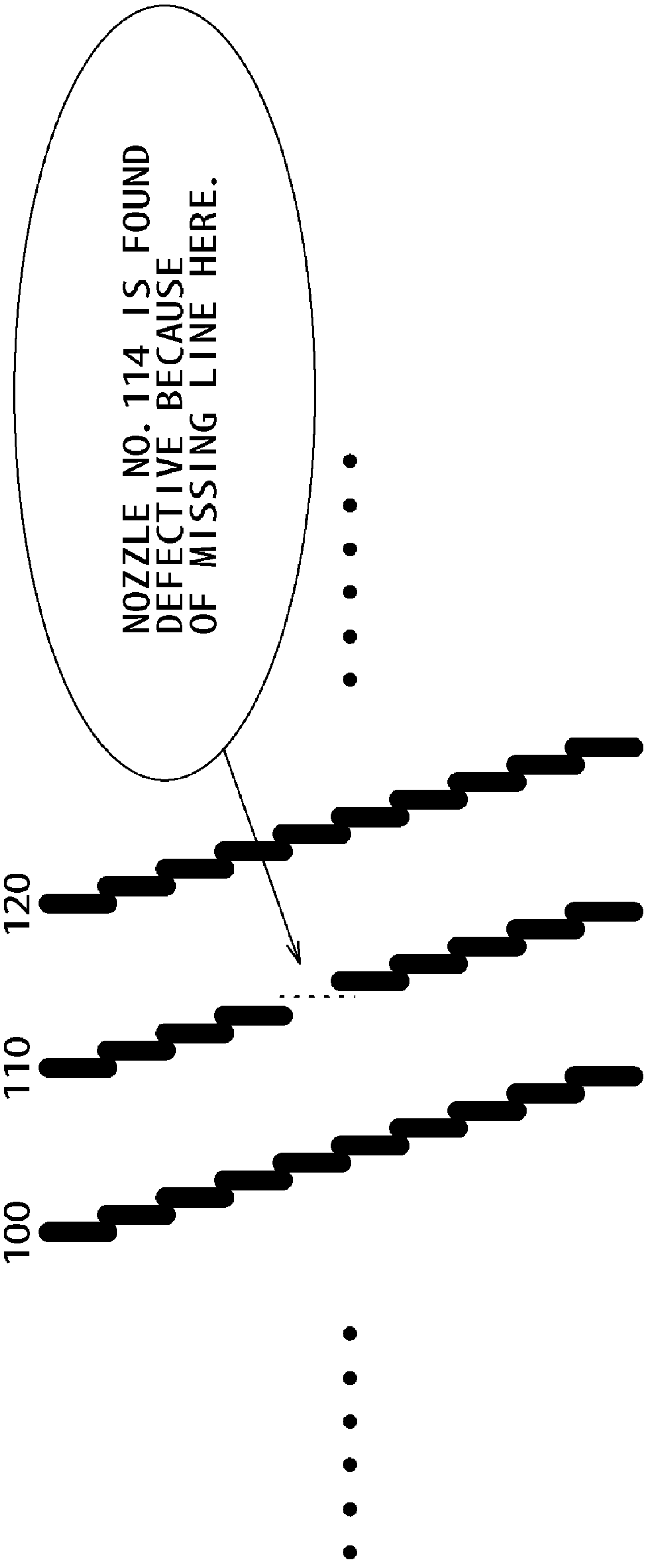
FIG. 11 is a schematic view of a test pattern rendered by a discharge head having a discharge defect.

As shown in FIG. 11, if the position of a rendering pattern as part of the test pattern is known, it is possible uniquely to identify the position of the corresponding discharge port. In the example of FIG. 11, a missing portion in the rendering pattern indicates that discharge port (i.e., nozzle) No. 114 has a discharge defect.

(2) Printer (2-1) Hardware

Figure 12:
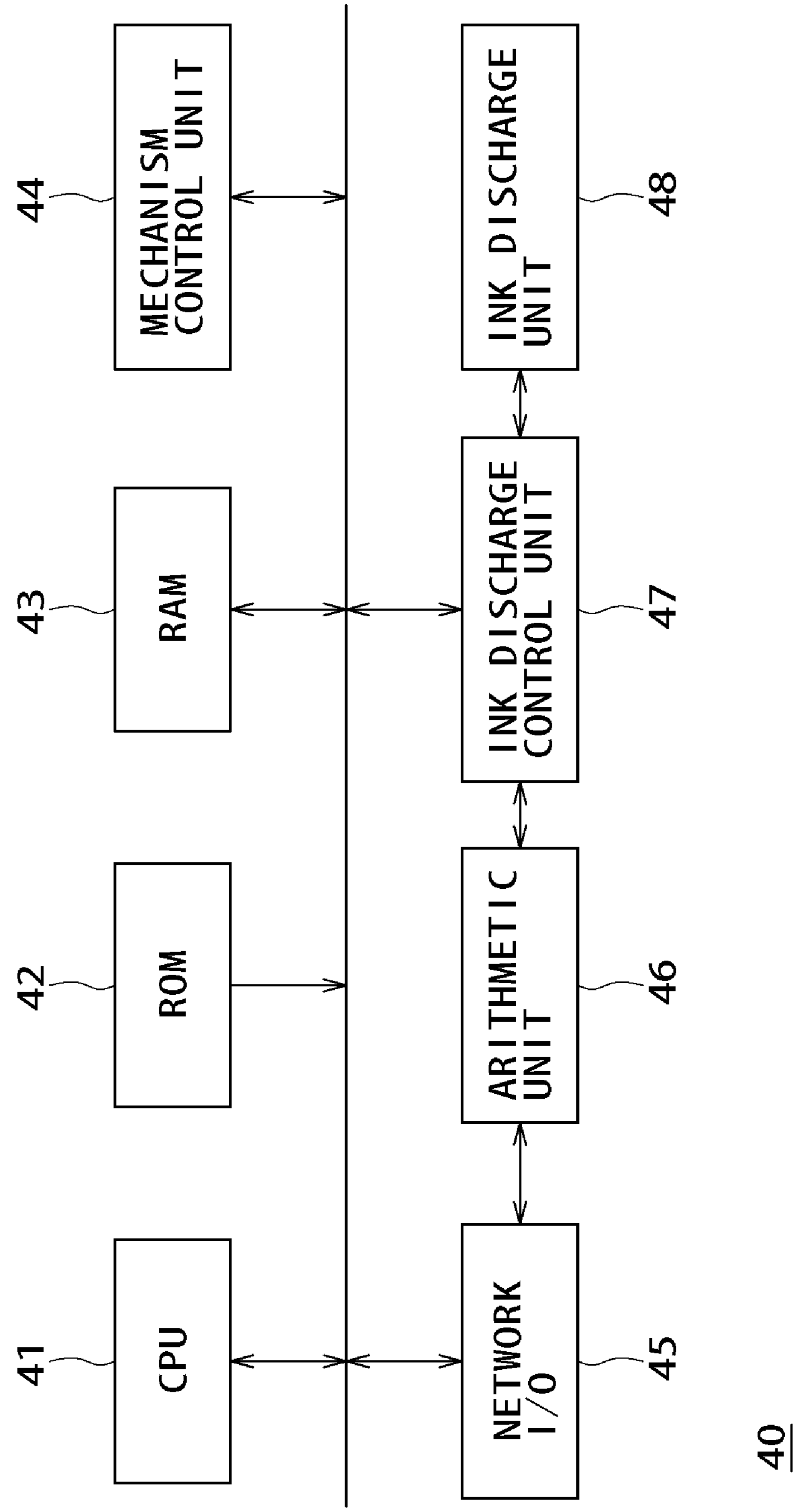
FIG. 12 is a block diagram presenting an internal structure of a printer.

FIG. 12 depicts a typical structure of a printer 40. The hardware of the printer 40 is well known to those skilled in the art. The printer 40 includes a CPU 41, a ROM 42, a RAM 43, a mechanism control unit 44, a network I/O 45, an arithmetic unit 46, an ink discharge control unit 47, and an ink discharge unit 48.

The CPU 41 executes programs using the RAM 43 as its work area. The program execution implements diverse functions. The ROM 42 retains firmware that defines the basic operations of the printer. The programs according to this invention are stored as part of the firmware.

The RAM 43 is used not only as a work area in which the firmware is executed but also as a place where status information about the printer is stored. Illustratively, the RAM 43 stores system version information and machine version information as part of the status information about the printer. The RAM 43 is also used to accommodate temporarily that status information about a line head which has been retrieved from the ink discharge unit 48. For example, discharge defect position data is stored as the line head status information in the RAM 43.

The mechanism control unit 44 is used to control a sheet feeder mechanism. The network I/O 45 is a device that provides communication with an externally established computer. With this embodiment, the printer 40 is connected to the computer over the network.

The arithmetic unit 46 is used to generate gradation data by subjecting image data to a many-valued error variance process. In this example, image data on each color is input in eight bits. The arithmetic unit 46 converts the input data into gradation data in four bits on each color and outputs the converted data.

The gradation data refers to data that defines the number of droplets reaching each pixel area. The way in which each pixel is thus rendered by a set of a plurality of droplets is called pulse number modulation. The number that the gradation data may take for each pixel is dependent on the number of gradations to be rendered. In this example, each pixel is constituted by up to six droplets.

The ink discharge control unit 47 converts gradation data into a corresponding discharge pattern and supplies the ink discharge unit 48 with the discharge pattern in a suitably timed manner. The ink discharge unit 48 has a line head having a plurality of discharge ports (i.e., nozzles) arrayed in a single line. The line head corresponds to the discharge head discussed above.

The ink discharge unit 48 includes a driving circuit for causing droplets to be discharged through each discharge port, and a RAM 48A that stores status information about the line head. The ink discharge unit 48 corresponds to the head unit described above.

The line head used here is designed to control deflectively the direction in which droplets are discharged using electrical controls. In this example, each discharge port is capable of hitting two pixel areas with droplets, as illustrated in FIGS. 2A and 2B. It is assumed that the direction of deflection control coincides with the array of a plurality of discharge ports (nozzles) on the line head.

It is also assumed that in a single discharge cycle constituting the smallest rendering period for one pixel, all or a single set of discharge ports discharges droplets deflectively in the same direction. For this example, it is assumed further that the direction of deflection can be switched per discharge cycle.

(2-2) Ink Discharge Control Unit

Figure 13:
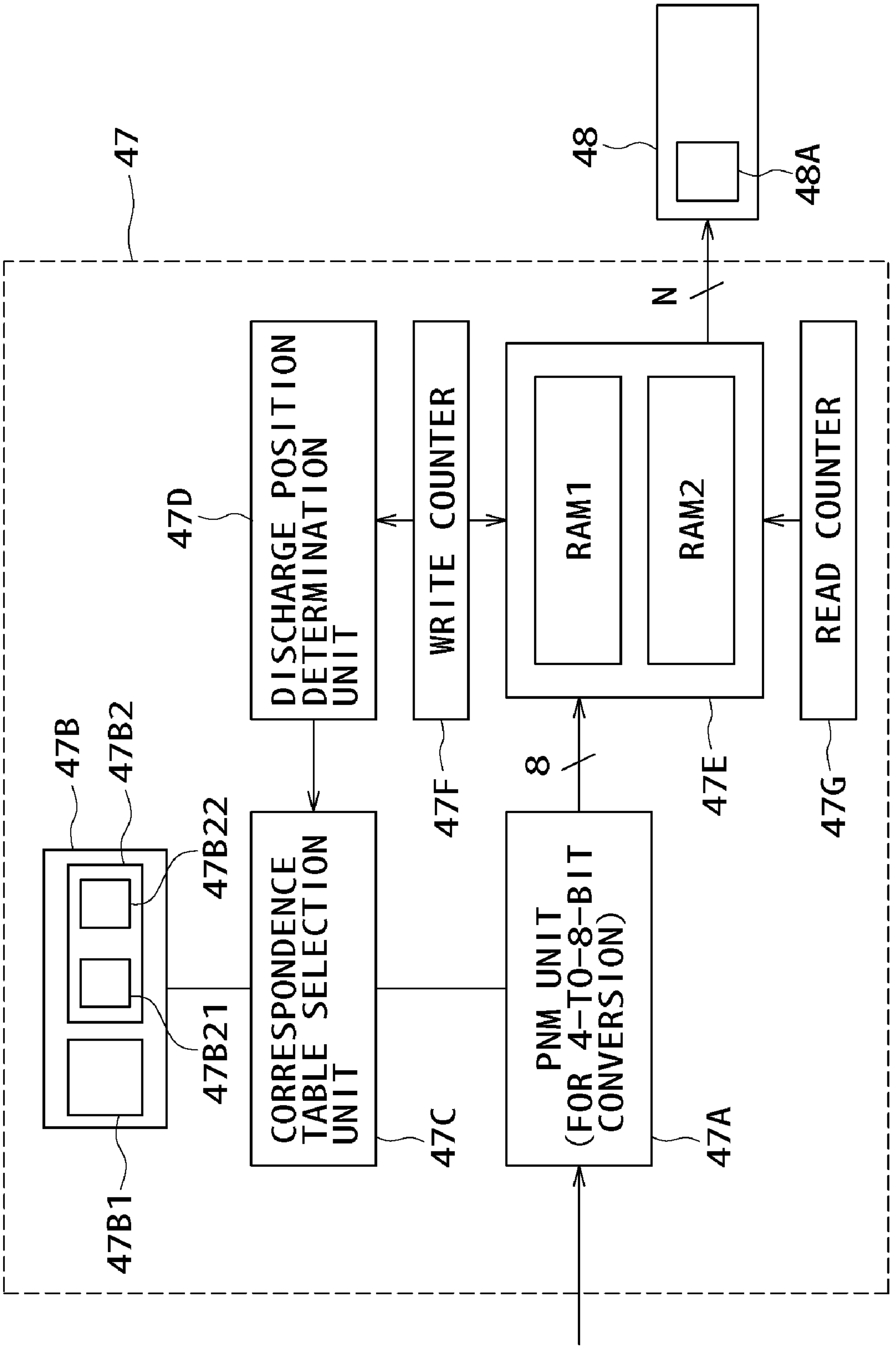
FIG. 13 is a block diagram sketching an internal structure of an ink discharge control unit.

FIG. 13 outlines a typical structure of the ink discharge control unit 47. The ink discharge control unit 47 includes a pulse number modulation unit 47A, a discharge pattern storage unit 47B, a correspondence table selection unit 47C, a discharge position determination unit 47D, a buffer memory 47E, a write counter 47F, and a read counter 47G.

The pulse number modulation (PNM) unit 47A is a functional element that converts gradation data into a corresponding discharge pattern by referencing correspondence tables held in the discharge pattern storage unit 47B. With this example, the PNM unit 47A converts four-bit gradation data into eight-bit discharge patterns.

The discharge patterns constitute data for defining droplet discharge timings. More specifically, a discharge pattern is a series of discharge data items each specifying whether or not to discharge a plurality of droplets.

Illustratively, if "presence of discharge" is represented by discharge data "1" and "absence of discharge" by discharge data "0," then a discharge pattern is expressed as a series of 1's and 0's. The length of the series reflects the number of discharge cycles constituting the rendering period of one pixel. For this example in which the rendering period is made up of eight discharge cycles, the length of the series constituting the discharge pattern is "8." Each discharge data item specifies whether droplets are to be discharged during the discharge cycle corresponding to the array position in question.

Figure 14A:
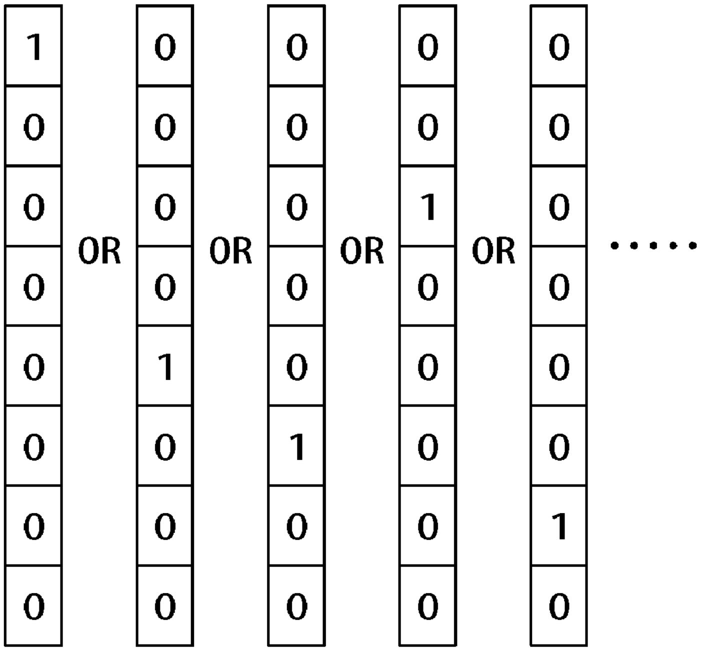
FIGS. 14A and 14B are schematic views showing discharge patterns.
Figure 14B:
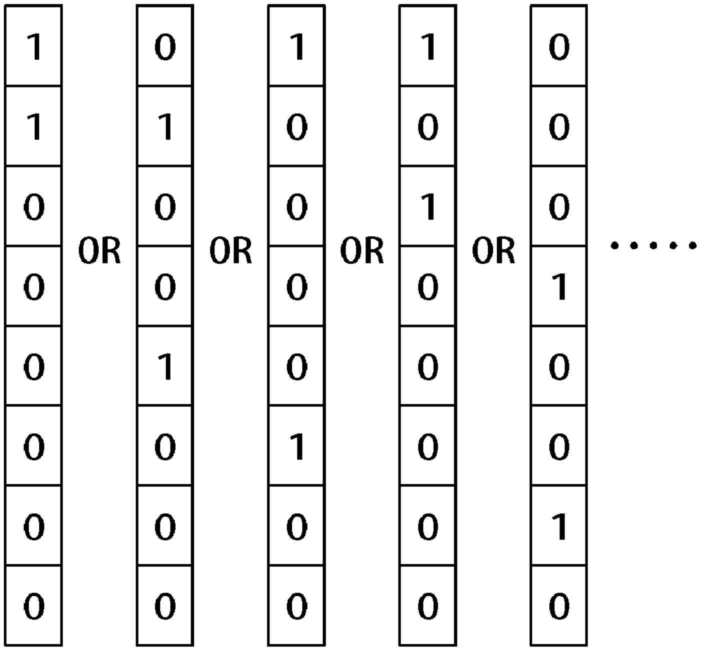

FIGS. 14A and 14B show typical discharge patterns. FIG. 14A indicates a discharge pattern PNM1 corresponding to gradation data "1." The gradation data "1" signifies that droplets are discharged in one out of every eight discharge cycles. The discharge pattern "1" alone has eight pattern candidates. Selection of one of the discharge cycles in which droplets are to be actually discharged depends on which of the pattern candidates is associated with the gradation data "1."

FIG. 14B shows a discharge pattern PNM2 corresponding to gradation data "2." The gradation data "2" signifies that droplets are discharged in two of the eight discharge cycles. That means the discharge pattern "2" has 28 pattern candidates. As illustrated in FIG. 14B, the discharging may take place either continuously or discontinuously. In this case, too, selection of two of the discharge cycles in which droplets are to be actually discharged depends on which of the pattern candidates is associated with the gradation data "2." The same arrangement applies to other gradation data.

The discharge pattern storage unit 47B is a functional device that stores a plurality of types of correspondence tables designating correspondence between gradation data and discharge patterns. The storage unit 47B of this example accommodates two types of correspondence tables, one for normal discharging and the other for defective discharging.

A correspondence table 47B1 for normal discharging is made up of a single correspondence table. That is, a single discharge pattern is retrieved for each gradation data item.

A correspondence table 47B2 for defective discharging uses discharge patterns arranged in such a manner that the discharge data denoting "presence of discharge" will not be given with regard to a discharge port found to have a discharge defect. The correspondence table 47B2 is actually constituted by two correspondence tables 47B21 and 47B22 because the discharge direction is controlled deflectively in two directions with this example.

The correspondence table 47B21 addresses discharge ports found to have a discharge defect each, and the correspondence table 47B22 applies to discharge ports associated with the discharge defects.

The discharge ports associated with the discharge defects refer to discharge ports each located adjacent to a defective discharge port in the deflective discharge direction.

The associative relations mentioned above are explained with reference to FIGS. 15 and 16. FIG. 15 shows an example in which converted discharge patterns are written to the buffer memory 47E. The column addresses in FIG. 15 correspond to pixel areas. Illustratively, with no deflection control in effect, a discharge port (nozzle) "n" corresponding to column address "n" discharges droplets in accordance with a discharge pattern "00001010." It should be noted that the row addresses in FIG. 15 correspond to eight discharge cycles.

Notations PNMi (i=1 to 8) in FIG. 15 indicate discharge patterns in increments of discharge cycles (discharge patterns in the line direction). The arrows in FIG. 15 denote the directions of deflective discharges. These directions are the same as those of deflective discharges shown in FIG. 2B. Notations "+1" and "0" represent the directions of read address displacements. The values coincide with the directions of deflection control and correspond to the deflected directions as illustrated in FIGS. 2A and 2B.

In this example, as described, droplets discharged through each discharge port are controlled deflectively. It is thus necessary to read discharge patterns for each discharge port (nozzle) by taking into consideration the direction of deflection as indicated by shaded portions in FIG. 15. In the example of FIG. 15, the discharge port (nozzle) "n" discharges droplets in keeping with a discharge pattern "00011110."

That is, if the discharge port (nozzle) "n" has a discharge defect, the discharge patterns for the gradation data involved (regarding each pixel) need to be established in such a manner that all discharge data corresponding to the shaded portions become "0."

Figure 16A:
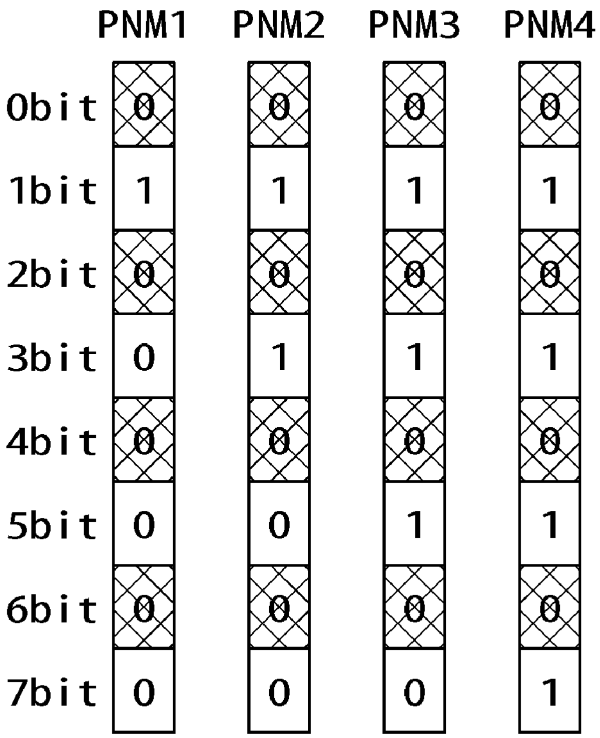
FIGS. 16A and 16B are schematic views indicating tables of correspondence prepared for discharge defect verification.
Figure 16B:
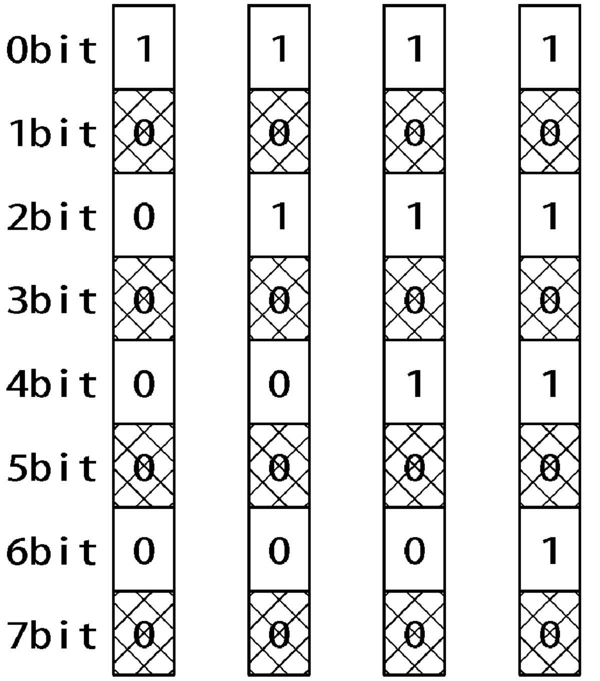

FIGS. 16A and 16B show typical correspondence tables associated with discharge defects, with deflective discharges taken into consideration. The table in FIG. 16A corresponds to the correspondence table 47B21 addressing discharge ports found to have a discharge defect each, and the table in FIG. 16B corresponds to the correspondence table 47B22 applying to discharge ports associated with the discharge defects.

The two tables in FIGS. 16A and 16B, like their counterparts in FIGS. 15A and 15B, are shown to have shaded discharge cycles in which the discharge port (nozzle) "n" with a discharge defect discharges droplets. As illustrated, all discharge data corresponding to the shaded portions are set for "0." On the other hand, discharge data "1" is set for each of the discharge cycles other than those shaded, with a view to making graduated rendering possible in keeping with gradation data.

The discharging of droplets is possible in any positions other than those corresponding to the discharge cycles shown shaded.

In this example, the discharge data "1" may be set for the position corresponding to one of every four discharge cycles, i.e., half of the total of eight discharge cycles.

As described, the periods that may be used for graduated rendering are limited to half of the entire discharge cycles. For this reason, if the gradation data involved exceeds the allowable number of discharge cycles, the gradations that can be actually rendered are limited to those that may be rendered in half of all discharge cycles. Meanwhile, the discharge pattern storage unit 47B is generally implemented using a Read-Only memory (ROM).

Alternatively, a Random Access Memory (RAM) or other semiconductor storage device may be used to implement the discharge pattern storage unit 47B. If a RAM is adopted, the correspondence tables held therein can be rewritten as desired. That is, the discharge positions can be changed as needed. The storage unit may alternatively be implemented using a storage medium that is removably attached to the droplet discharging apparatus.

The correspondence table selection unit 47C is a functional element that selects the correspondence table to be referenced by the pulse number modulation unit 47A in accordance with the result of the determination by the discharge position determination unit 47D. The result of the determination is given as information indicating whether the gradation data to be converted represents a normal discharge port or a discharge port having a discharge defect.

If the gradation data corresponds to a pixel unaffected by discharge defects, the correspondence table selection unit 47C selects the correspondence table 47B1 for normal discharging. If the gradation data corresponds to a pixel subject to defective discharging, the correspondence table selection unit 47C selects the correspondence table 47B21 or 47B22 associated with discharge defects.

In this example, the correspondence table selection unit 47C first selects the correspondence table 47B21, then the correspondence table 47B22 upon input of the next gradation data. The reason is that for the deflection direction of this example, a discharge port with a discharge defect first appears, followed by a discharge port affected by the discharge defect.

If the deflective direction is opposite to the direction of this example, the correspondence table selection unit 47C reverses its choices.

Selection of the two correspondence tables 47B21 and 47B22 associated with discharge defects can be brought about illustratively using a toggle switch. Activation of the toggle switch is triggered by the determination that the gradation data in question corresponds to a pixel affected by a discharge defect.

If the discharge position determination unit 47D also provides information about details of the discharge defect as part of the result of its determination, then it is possible to select one of the two correspondence tables based on that information. In this case, a suitable switch may be furnished to make the choice depending on the information.

Figure 17:
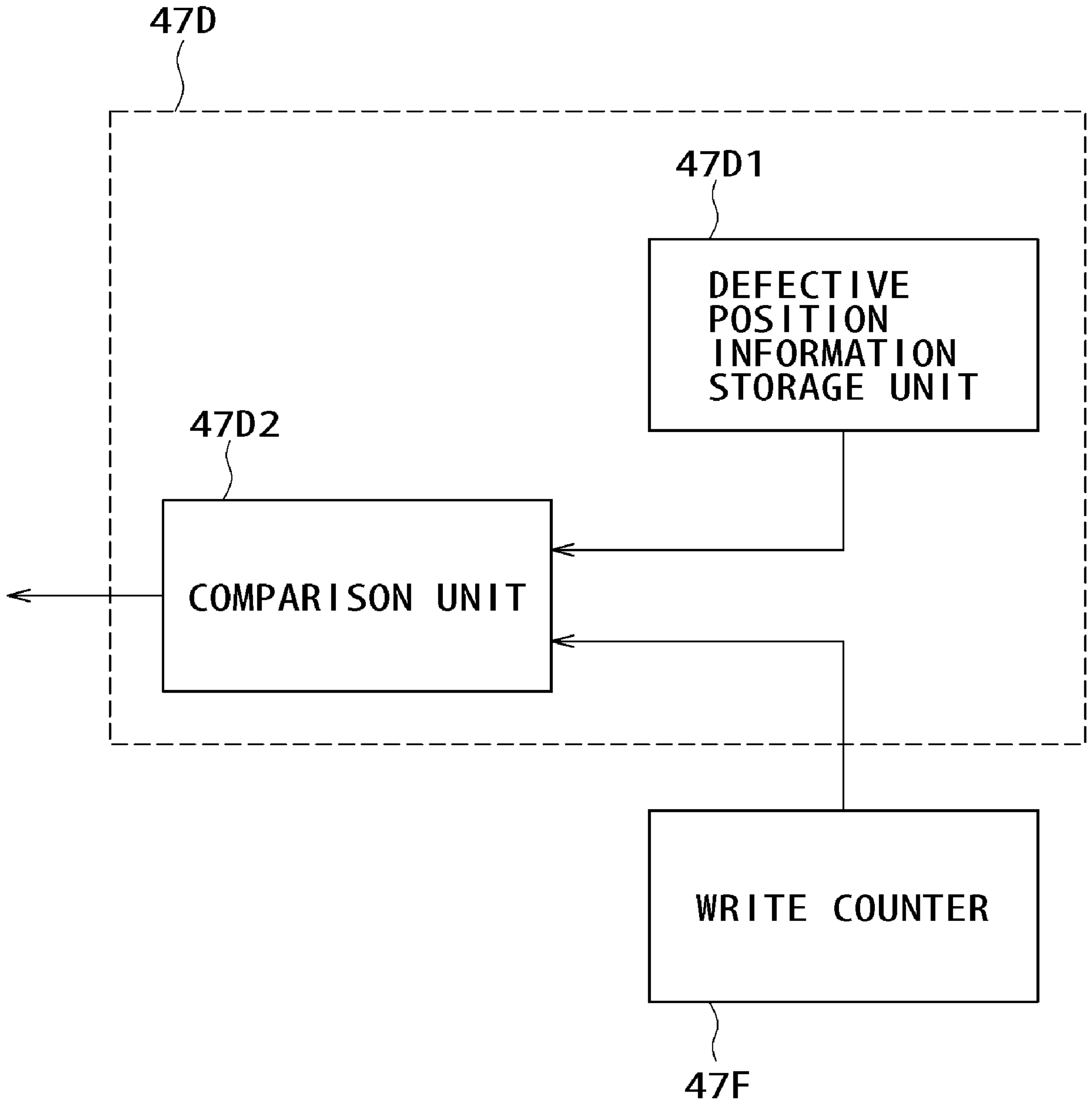
FIG. 17 is a block diagram outlining an internal structure of a discharge position determining unit.

The discharge position determination unit 47D is a functional element which, based on the write addresses generated by the write counter 47F, determines whether the gradation data to be converted represents a pixel affected by a discharge defect. FIG. 17 outlines a typical structure of the discharge position determination unit 47D. In this example, the discharge position determination unit 47D is made up of a defective position information storage unit 47D1 and a comparison unit 47D2.

The defective position information storage unit 47D1 stores the position information about the pixels opposite to the discharge ports found to have discharge defects, and the position information about the pixels affected by the discharge defects. The position information corresponds to the above-described status information about the discharge head.

The comparison unit 47D2 is a functional element that compares the position information generated by the write counter 47F with the defective position information. If a match is detected between the two kinds of position information, the comparison unit 47D2 recognizes gradation data that is affected by a discharge defect. If no match is found, the comparison unit 47D2 recognizes gradation data about a pixel that can be rendered normally.

The correspondence table selection unit 47C may find that a predetermined number of gradation data items following the input of a first-detected discharge defect constitute gradation data about the pixels affected by discharge defects. In that case, the defective position information storage unit 47D1 need only accommodate the first-read position information about the pixel affected by the discharge defect.

As described, the correspondence table selection unit 47C and defective position information storage unit 47D1 may be implemented suitably in keeping with what is to be processed and what is to be stored by them.

The position information given by the write counter 47F to the comparison unit 47D2 is address information advanced in phase with regard to the write addresses placed into the buffer memory 47E with a view to providing the pixel position of the gradation data to be processed by the pulse number modulation unit 47A.

The buffer memory 47E is a functional element that temporarily accommodates discharge patterns. The buffer memory 47E is constituted by Random Access Memories (RAM) 1 and 2. The two memories 1 and 2 are opposite to each other in phase when discharge patterns are read and written. That is, when a discharge pattern is being written to one memory, a discharge pattern is being read from the other memory.

The write counter 47F is a functional element that generates write addresses with regard to the buffer memory 47E as well as position information to be fed to the comparison unit 47D2. A discharge pattern is written to the buffer memory 47E in accordance with the generated write addresses.

The read counter 47G is a functional element that generates read addresses with respect to the buffer memory 47E. Discharge data is read from the buffer memory 47E in keeping with the generated read addresses. The discharge data is read at intervals of a discharge cycle.

Figure 18:
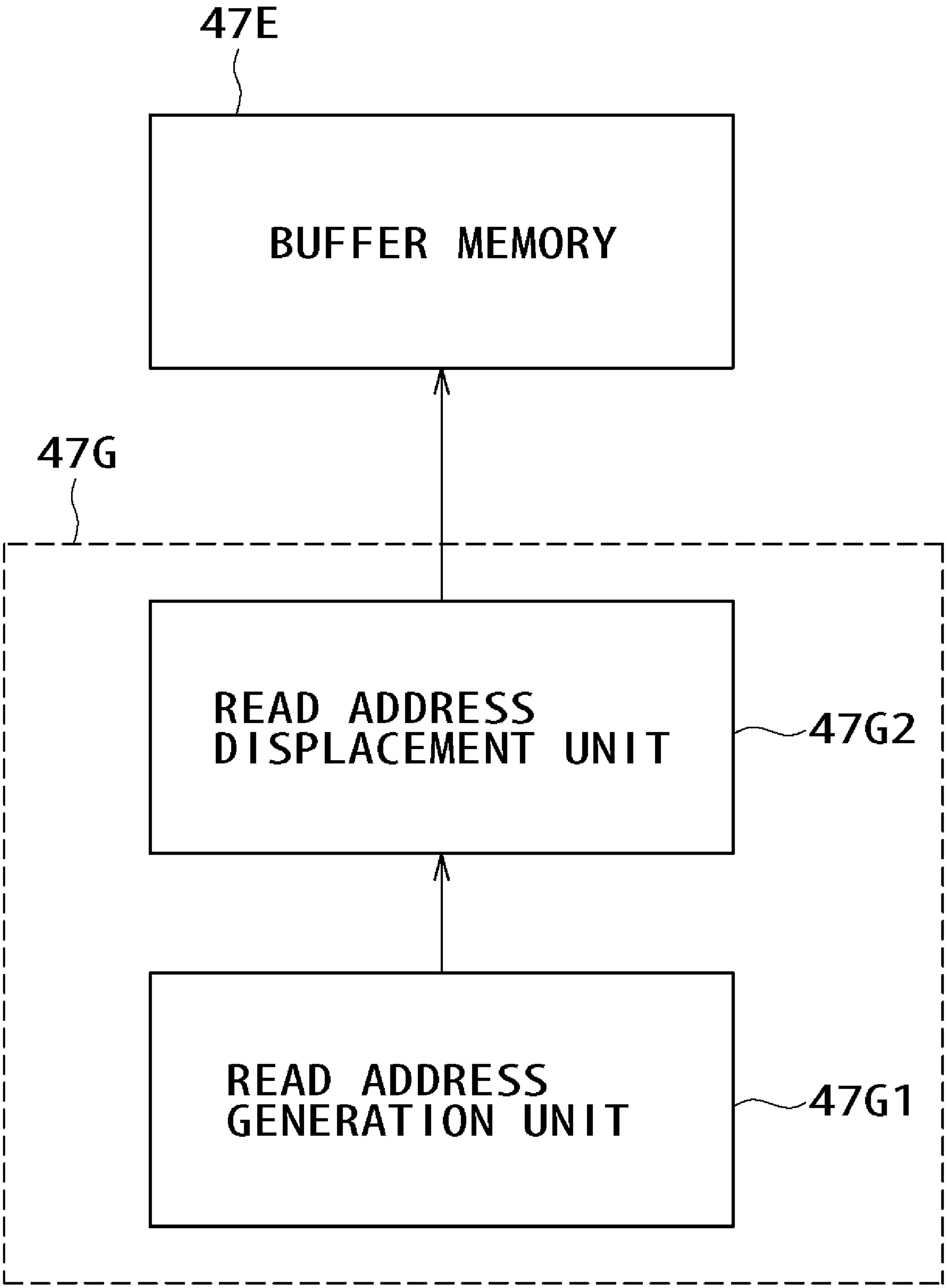
FIG. 18 is a block diagram depicting an internal structure of a read counter.

The read counter 47G needs to generate read addresses by taking the deflective discharge from each discharge port into account. FIG. 18 shows a typical structure of the read counter 47G. As illustrated in FIG. 18, the read counter 47G is made up of a read address generation unit 47G1 and a read address displacement unit 47G2 that displaces the generated read address in the direction of deflection control.

Figure 19:
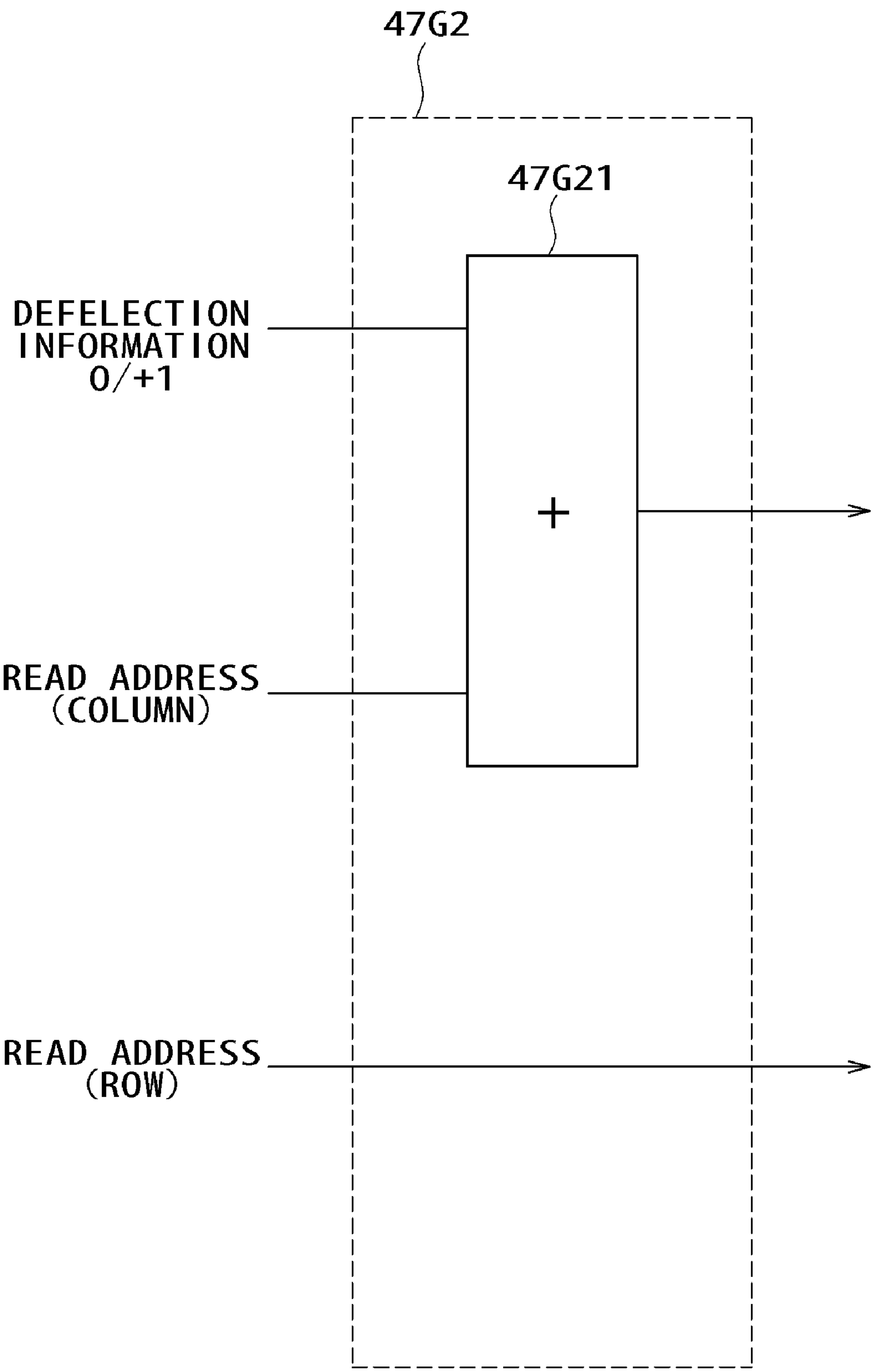
FIG. 19 is a schematic view illustrating an internal structure of a read address displacement unit.

In operation, the read address displacement unit 47G2 adds a value denoting the direction of deflection control (e.g., "0" for no deflection, "1" for deflection) to the column address, one of the read addresses coming from the read address generation unit 47G1, and supplies the buffer memory 47E with the result of the addition as a new column address. The row address is output unmodified. FIG. 19 depicts a typical structure of the read address displacement unit 47G2. An adder 47G21 effects the displacement of the column address.

The arrangement above thus makes it possible to read discharge data from the buffer memory 47E in a "zigzag" manner, as shown shaded in FIG. 15.

(2-3) Software

Figure 20:
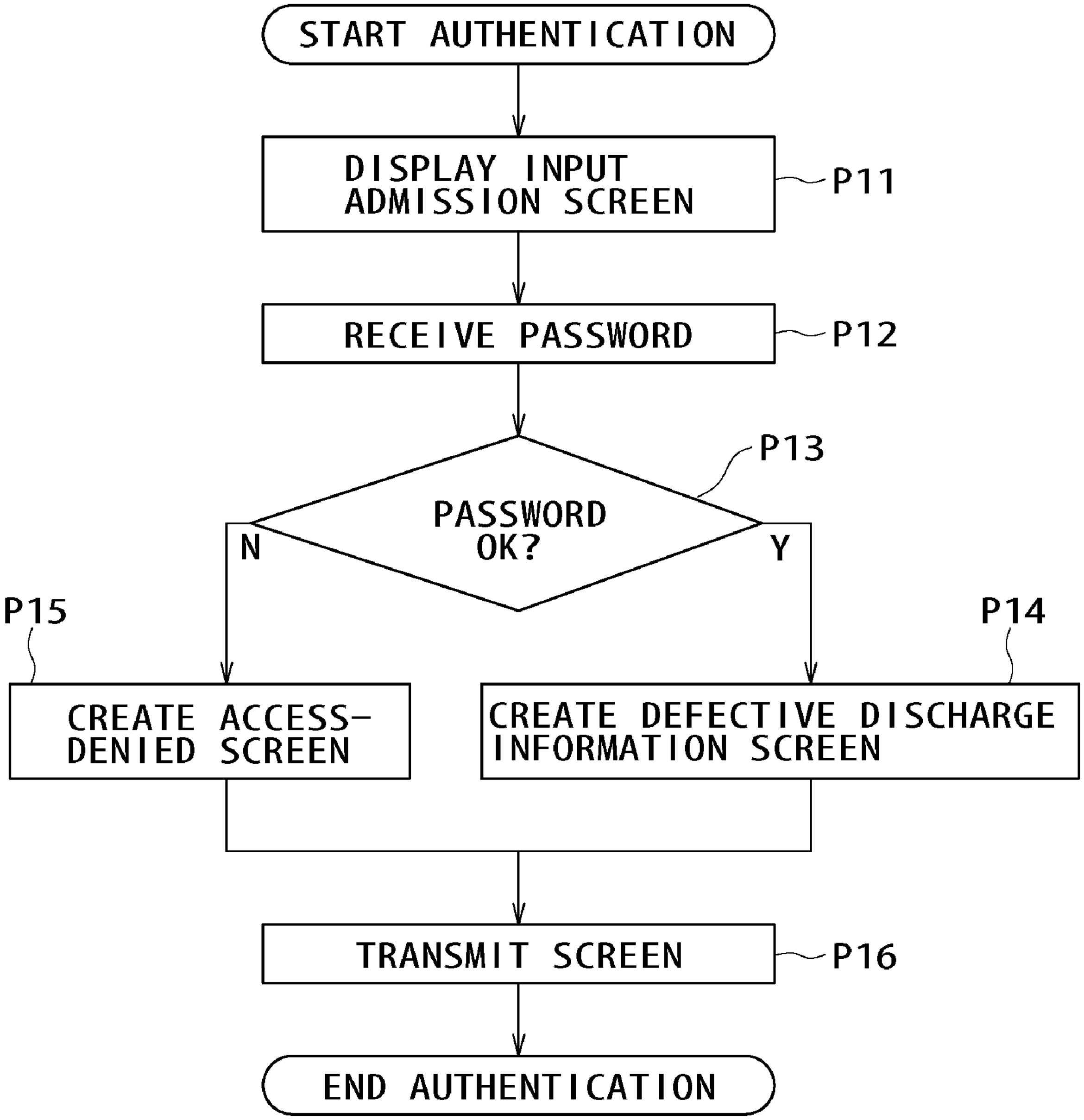
FIG. 20 is a flowchart of processes in which an authentication program is executed.

The printer 40 carries out a number of programs to resolve problems that may occur inside. One such program is a so-called authentication program. FIG. 20 shows a flowchart of processes constituting a typical authentication program. Activation of this program is triggered by an access request coming from the connected computer.

With the authentication program started, the printer transmits a password input admission screen to the computer 30. In turn, the computer 30 causes its Web browser to display the received input admission screen on the display device 36 in process P11.

The worker inputs a password to the screen using the keyboard 35. The computer 30 transmits the entered password to its destination that is the printer 40 connected via the network. In process P12, the printer 40 receives the password entered by the worker. With receipt of the password verified, the printer 40 determines in process P13 whether the received password is correct.

If the password is found correct, the printer 40 reads the line head status information from the ink discharge unit 48 and creates a screen that grants access to defective discharge information in process P14. If the password is not found correct, the printer 40 creates a screen denying access to the defective discharge information in process P15.

In process P16, the printer 40 transmits an authentication result image created in the preceding process to the computer 30 connected via the network. The authentication result image is presented by the display device 36 to the worker. The authentication program carried out in this manner protects against illicit access the line head status information that crucially affects the outcome of printing by the printer.

Figure 21:
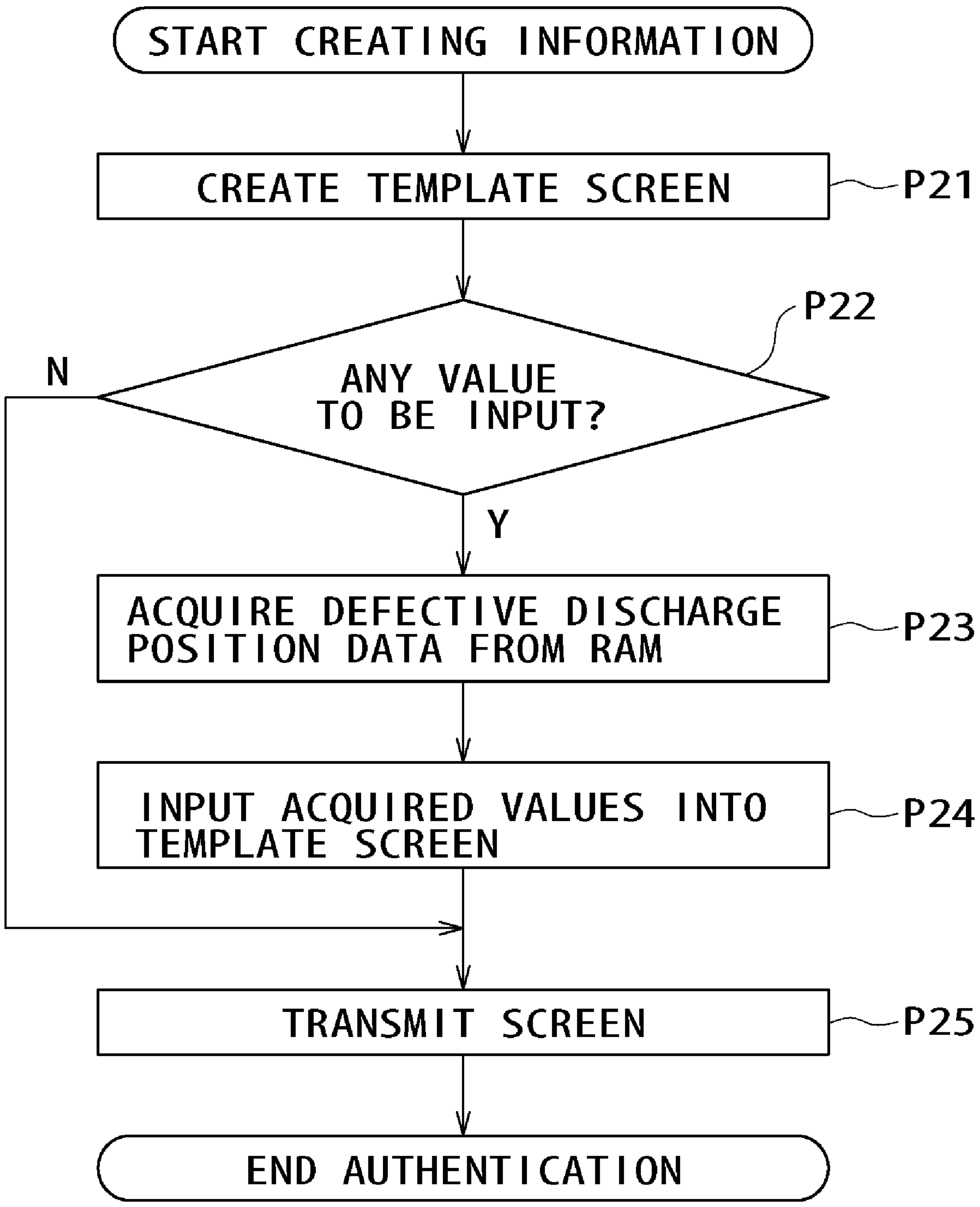
FIG. 21 is a flowchart of processes in which a program for creating a discharge information screen is executed.

The printer 40 also carries out a discharge information screen creation program. FIG. 21 is a flowchart of processes constituting a typical discharge information screen creation program. This program is activated by the printer 40 when the communicating party is authenticated for access to the printer's information. With the creation program started, the printer 40 creates a template screen in process P21. In process P22, the printer 40 determines whether it is necessary to input values into the template screen. More specifically, the printer 40 determines whether there is any line head status information to be written to the screen.

In process P23, the printer 40 reads the defective position data as the status information from the RAM 48A. In process P24, the printer 40 enters the acquired values into the template screen. The defective positions are indicated for each of the colors involved, which creates a screen listing the defective position values on a color by color basis.

In process P25, the printer 40 transmits a discharge information screen completed in the preceding process to the computer 30. If no value is found for input to the screen in process P22, the printer 40 transmits the template screen unchanged to the computer 30. The transmission allows the worker engaged in printer repair to have an accurate knowledge of the preconditions regarding the line head.

The discharge information screen is transmitted as a Web page. Illustratively, the screen is structured as a text document with a screen layout. Layout information may be prepared as a file separate from the text document.

The printer 40 also has the capability of writing to a non-volatile RAM 48A and to the defective position information storage unit 47D1 the most recent status information about the line head coming from the computer 30. Although the two memory devices were explained above as two independent storage areas for purpose of description in this specification, that is not limitative of the invention. Alternatively, the two storage units may be implemented physically as a single storage area.

(3) Function Recovery Work

Figure 22:
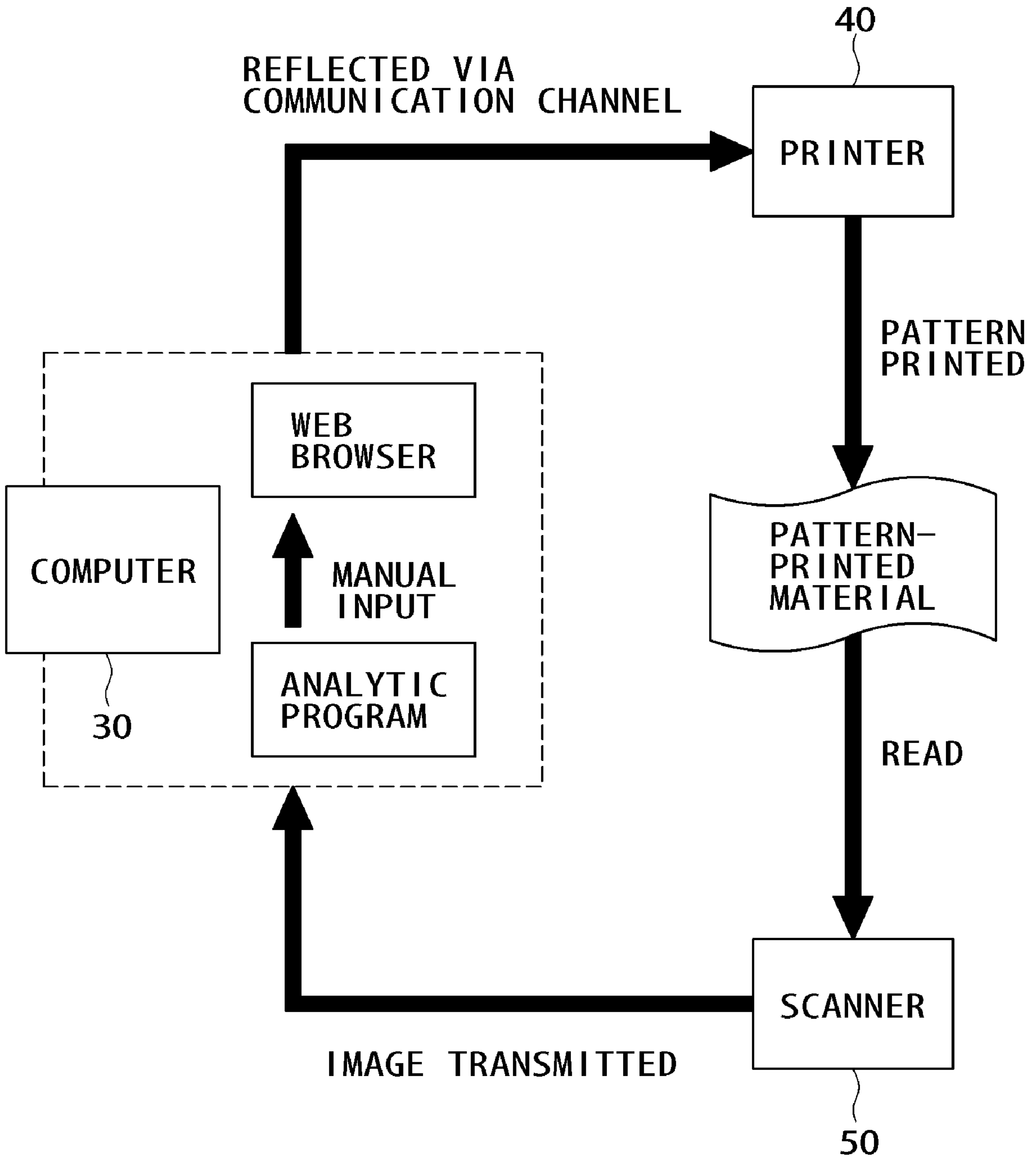
FIG. 22 is a schematic view of a system configuration assumed for function recovery work to be done.

FIG. 22 shows a typical system configuration necessary for function recovery work. As illustrated in FIG. 22, the recovery of a failed function in the printer 40 requires a computer 30 communicating with the printer 40, and a scanner 50 for reading images printed by the printer 40. The computer 30 and printer 40 need not be installed in the same place.

Figure 23:
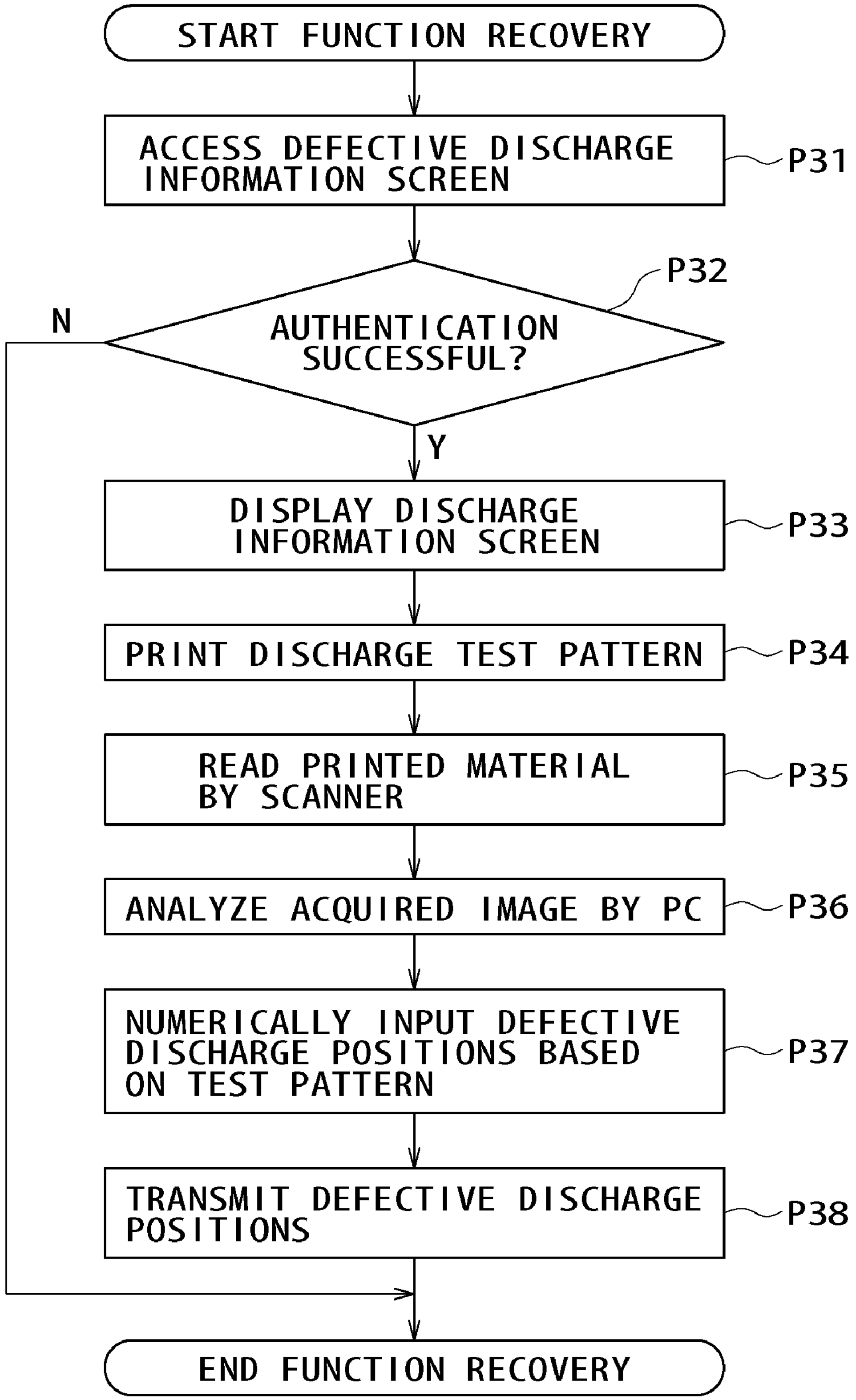
FIG. 23 is a flowchart of processes in which function recovery work is carried out.

FIG. 23 is a flowchart of processes in which function recovery work is carried out. The worker entrusted with repair work on the printer 40 verifies that a working computer 30 is connected to the printer 40 via the network. After the verification, the computer 30 is operated to access the printer 40 using its IP address and HTTP (Hyper Text Transfer Protocol).

Figure 24:
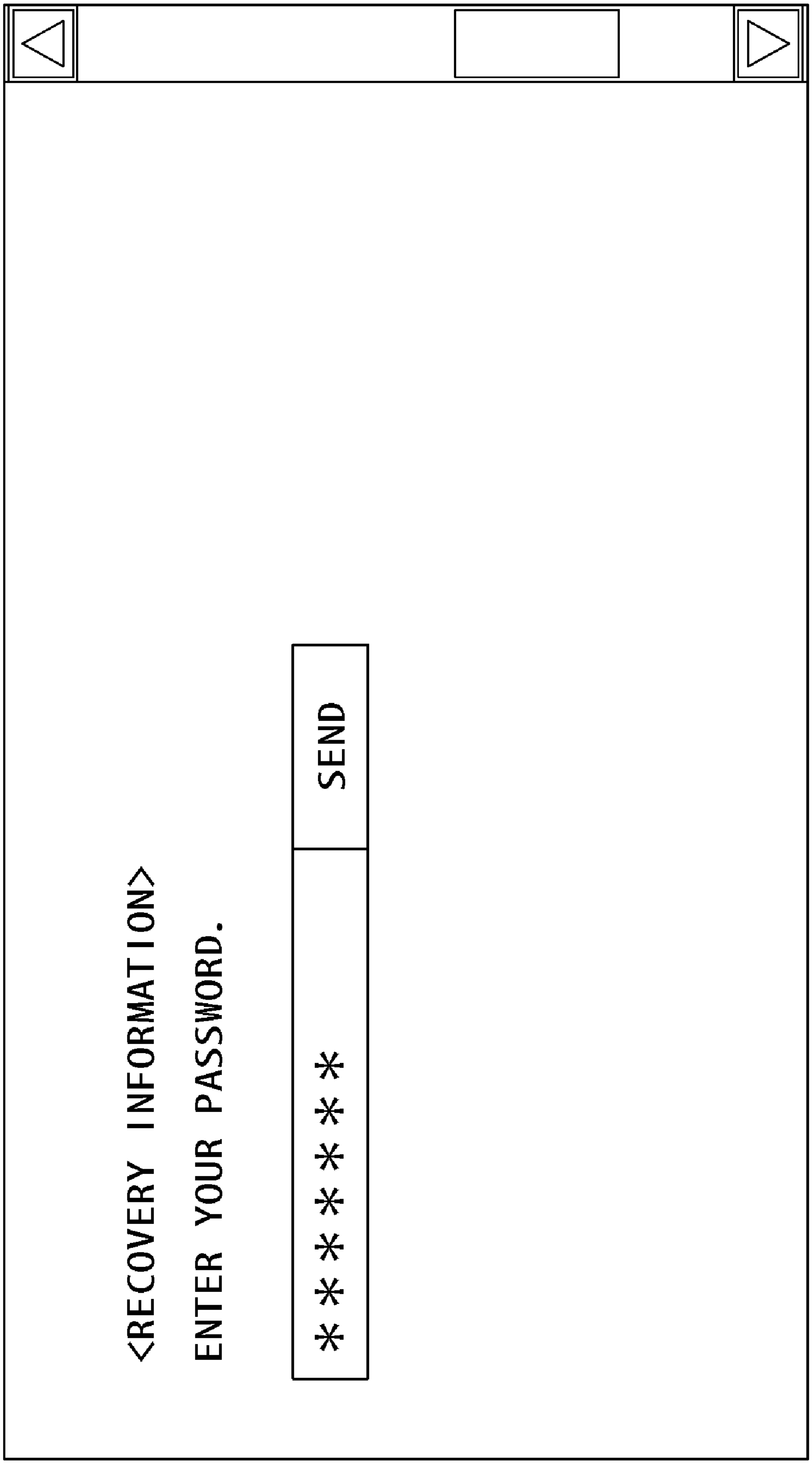
FIG. 24 is a schematic view of an authentication screen.

The printer 40 activates the authentication program shown in FIG. 20, and returns to the worker a screen (FIG. 24) prompting the input of a password as a response. In process P31, the computer 30 causes the display device 36 to display the screen of FIG. 24. FIG. 24 shows a state where the worker has already input the password. The character string constituting the password is displayed as a series of asterisks (*) so that no one other than the worker can sneak a look at the typed password. The password is definitely entered when the worker operates on a send button. The entered password is transmitted to the printer 40 over the network.

Figure 25:
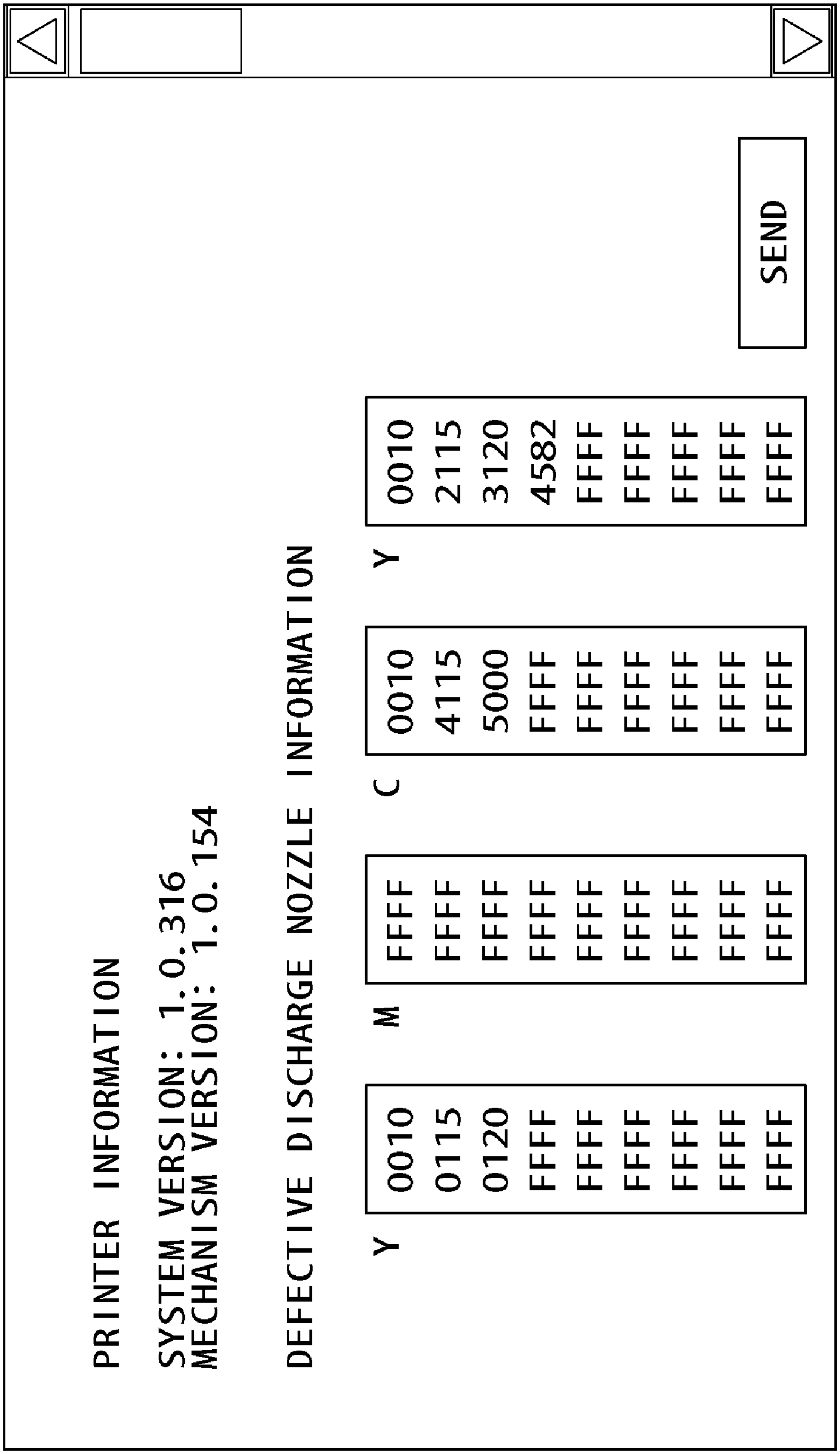
FIG. 25 is a schematic view of a discharge information screen.

The password is compared in process P32 with an encrypted character string held in an internal memory (e.g., ROM 42) of the printer 40 in order to determine whether the password is correct. If the password is found correct, then the printer 40 goes to process P33 and collects status information from within and from the line head to create a discharge information screen (FIG. 25).

The discharge information screen (FIG. 25) is prepared as a Web page with a system version, mechanism version, and defective discharge nozzle information included as display items. The Web page is created by embedding the collected status information into a template screen containing layout information. The information denoting defective discharge nozzle positions is given in decimal numerals in tabular columns assigned separately to the colors involved. With this example, each of the columns in FIG. 25 can display up to 16 nozzle numbers. Of the 16 display fields in each column, those left empty are filled with dummy data "FFFF."

The discharge information screen created by the printer 40 is transmitted to the computer 30 over the network. The worker verifies the transmitted discharge information screen using a Web browser. Checking the discharge information screen allows the worker to verify the information in effect upon shipment of the printer 40 from the factory or during the preceding repair work. This information is important for enabling the worker to isolate the probable cause of the currently observed symptom.

With basic information thus obtained, the worker in process P34 causes the computer 30 to transmit a discharge status test pattern print command to the printer 40. This causes the printer 40 to print a test pattern such as one shown in FIG. 9. In process P35, the worker causes the scanner 50 to read a pattern-printed material 60. If the worker is in a remote location, process P35 is carried out by the administrator of the printer 40.

Image data acquired by scanning is transferred to the worker's computer 30 through the network or by means of a suitable recording medium. The configuration shown in FIG. 22 assumes that the scanner 50 and computer 30 are connected via the network.

After the image data is acquired from the pattern-printed material, the worker starts up the analytic program (FIG. 8) of the computer 30 to analyze the acquired image data in process P36. As shown in FIG. 11, the analytic program calculates the nozzle number of each discharge port with an ink discharge defect on the basis of the applicable pixel position.

The calculated pixel positions are arranged by color and displayed as an analysis result screen on the display device 36. In process P37, the worker corrects the nozzle numbers displayed on the discharge information screen so as to bring them into line with the nozzle numbers on the analysis result screen. The keyboard 35 is used to input nozzle numbers. The correction work brings the line head status information up to date.

In process P38, the worker pushes the send button to transmit the corrected status information to the printer 40 over the network. The printer 40 in turn writes the updated status information to its relevant memories. This completes the function recovery work on the printer 40.

(4) Printing After Recovery

Once the positions of the faulty discharge ports are known, the printer 40 can print images whose quality is identical to or about the same as defect-free image quality. This kind of printing is brought about as a function of the ink discharge control unit 47.

How the ink discharge control unit 47 works will now be described. The pulse number modulation unit 47A feeds input gradation data to the correspondence table selection unit 47C. At this point, the discharge position determination unit 47D determines whether or not the gradation data to be processed is affected by discharge defects, and sends the result of the determination to the correspondence table selection unit 47C.

If the result of the determination from the discharge position determination unit 47D says the gradation data represents pixels unaffected by discharge defects, the correspondence table selection unit 47C selects the correspondence table 47B1 and supplies the pulse number modulation unit 47A with a relevant discharge pattern read from the selected table.

If the result of the determination from the discharge position determination unit 47D says the gradation data represents pixels subject to discharge defects, the correspondence table selection unit 47C first selects the correspondence table 47B21 and reads a corresponding discharge pattern from the selected table. The discharge pattern read at this point is shown in FIG. 16A. Following the readout of the discharge pattern, the correspondence table selection unit 47C selects the correspondence table 47B22 and reads a corresponding discharge pattern from the selected table. The discharge pattern read at this point is indicated in FIG. 16B.

The gradation data representative of pixels rendered solely by normally operating discharge ports is converted to the relevant discharge pattern by use of the correspondence table 47B1 for normal discharging. The gradation data denoting pixels affected by discharge defects is converted to the corresponding discharge patterns using the two correspondence tables 47B21 and 47B22 for defective discharging.

Figure 26:
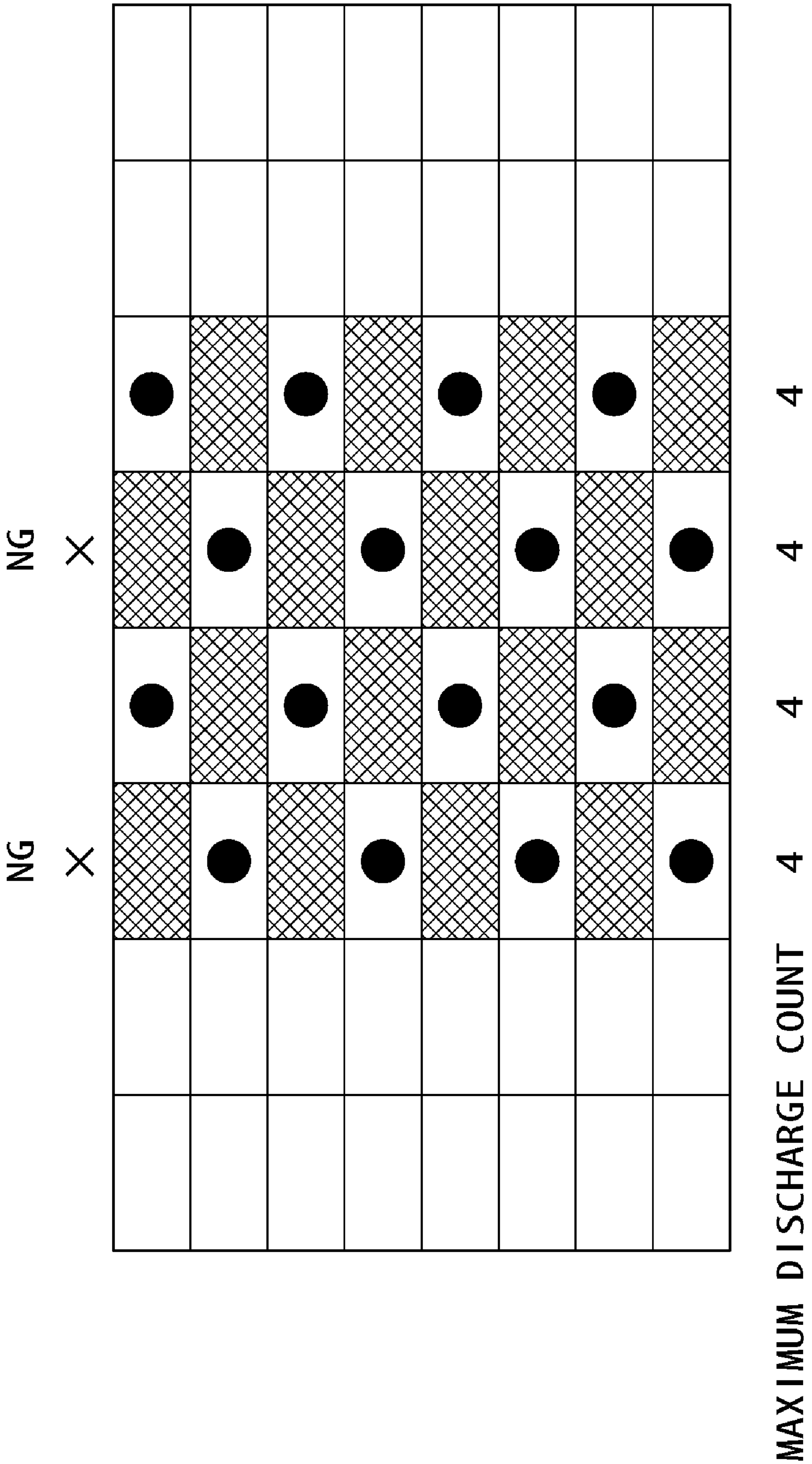
FIG. 26 a schematic view explaining results of print after recovery.

Thus all-zero discharge patterns are read from the buffer memory 47E with regard to the discharge ports subject to discharge defects. For each discharge port positioned immediately after a faulty discharge port, a discharge pattern is read out which is arranged to maintain the gradation of the pixel defined by the gradation data in question.

Where the discharge ports with discharge defects are not continuous as in the case above, droplets may be discharged in such a manner as to offset the defects. This feature makes it possible to render desired gradations accurately. FIG. 26 illustrates how this can be achieved. In the example of FIG. 26 where there are two directions of deflective discharges (i.e., one pixel area is rendered by two discharge ports), faulty discharge ports are found every two ports in the line direction.

In FIG. 26, the discharge defects are each designated by a symbol "X". The shaded portions in the figure represent discharge data to be read with regard to the faulty discharge ports. The shaded portions are each assigned discharge data "0."

Where there exist discharge defects every two discharge ports as in the example above, up to four droplets may be used to render four pixels, as indicated by filled-in circles. Obviously it is assumed that the discharged droplets arrive at their intended positions accurately. On that assumption, there is no degradation in rendering quality provided the maximum value of gradation data is 4. Even if the gradation data exceeds the maximum of 4, the pixels can be rendered at a quality level almost the same as defect-free rendering quality.

(5) Effects of the Embodiment

As described above, where the line head incorporated in the ink discharge unit 48 is designed electrically to deflect the direction of ink discharges, it is possible to recover from a failed discharge function by use of the ink control unit 47. The ink control unit 47 need only determine the positions of faulty discharge ports (nozzles) in order to restore the practically acceptable print quality.

The above-described embodiment enables the worker at the manufacturer or vender to verify easily and reliably the defective parts having caused the functional failure. The worker need only input or modify the isolated faulty positions to recover from the failed function. This helps reduce the degree of workers' dependency on the level of their skills for carrying out satisfactory function recovery work. In addition, the ease with which the defective parts can be checked promises more efficient function recovery work than before.

When the scanner 50 is used to acquire test patterns, it is possible to restore a failed function of the printer from a remote location via the network. That means manufacturers and venders can concentrate their resources for more efficient user support than before. It also means that users of the printer 40 can prolong the service life of their equipment at reduced costs. Because function recovery work is performed by way of the network, the time required for completion of the recovery work is shortened. The savings in recovery work duration translate into an enhanced availability factor of the printer 40.

With their service life thus prolonged, the printers impose fewer burdens on the environment than before. According to the invention, a duly authenticated communicating party alone is granted access to status information about the printer. This feature prevents the line head status information from being rewritten or corrupted arbitrarily leading to a worsening of the line head failure.

(6) Other Variations

With the above-described embodiment, both the result of analysis by the analytic program and the discharge information screen of the printer were displayed on the same screen allowing the worker to compare the two in manually correcting the faulty positions. Alternatively, the analytic program may be arranged to transmit the result of its analysis directly to the printer 40. In this case, the analytic program transmits defective position information to an IP address (on the network) or a serial port (of a direct connection) of the printer.

With the above-described embodiment, it was explained that the Web page created by the printer 40 is filled or overwritten with the position information about the discharge ports found to have droplet discharge defects. Alternatively, the computer 30 may display, as a program function of its own, a screen for admitting an input of the position information about the faulty discharge ports. This program may be arranged to transmit the input position information to an IP address (on the network) or a serial port (of a direct connection) of the printer.

A second embodiment of this invention will now be described. An objective of the second embodiment is to provide arrangements for enabling the end user to isolate the probable cause of a failed function with a high level of accuracy. Another objective of the second embodiment is to provide arrangements for presenting the end user with necessary work to do or relevant action to take to accomplish function recovery.

(1) Droplet Discharging Apparatus

Figure 27:
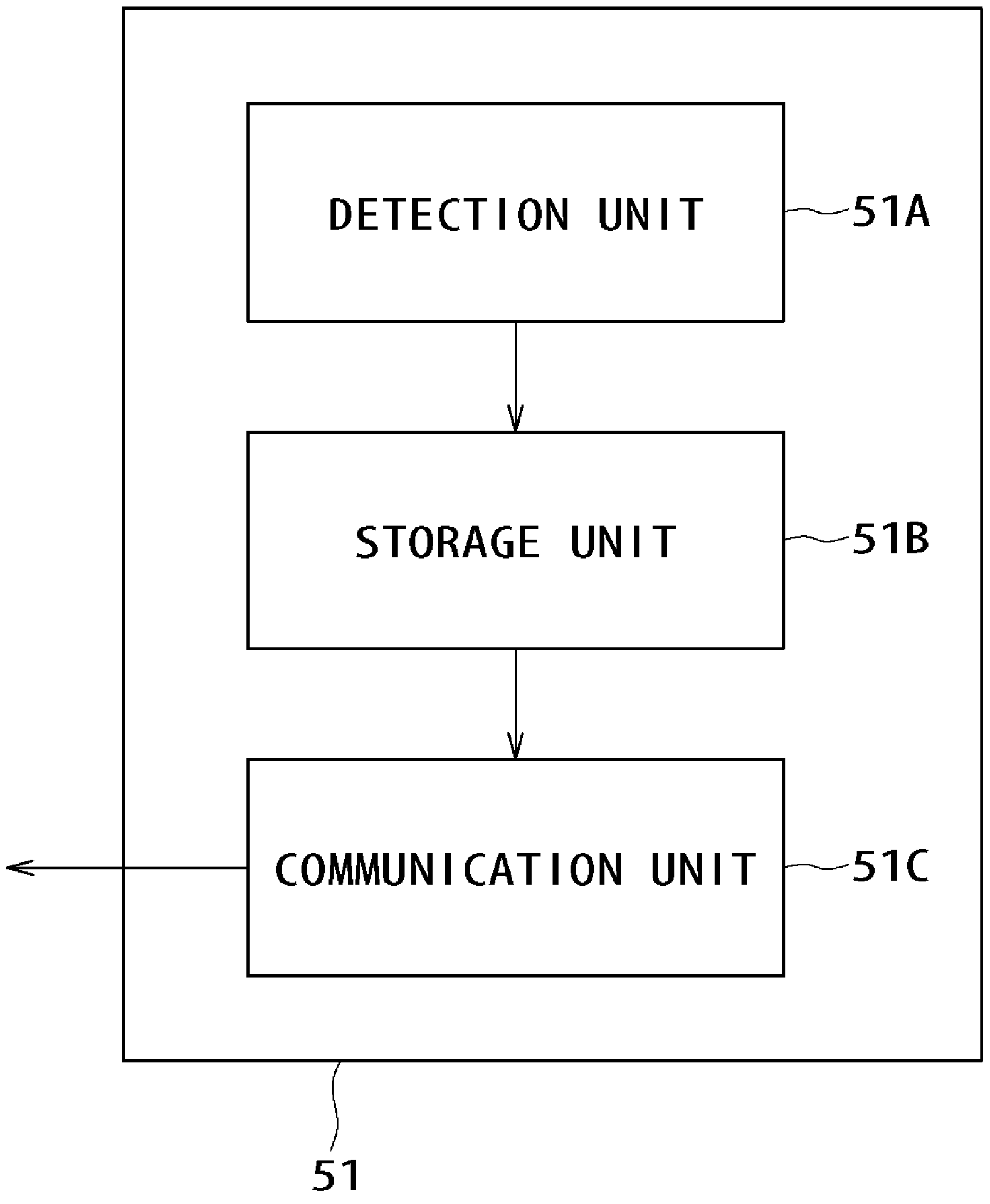
FIG. 27 is a block diagram showing a structure of another droplet discharging apparatus.

The above and other objectives are brought about by the second embodiment of the invention proposed as a droplet discharging apparatus with its major elements described below. FIG. 27 outlines the key components of a droplet discharging apparatus 51 embodying the invention. The droplet discharging apparatus 51 has a detection unit 51A, a storage unit 51B, and a communication unit 51C.

The detection unit 51A is constituted by hardware or software for detecting changes in status of a monitored object. The hardware may include sensors, switches and/or counters. The software may be composed of programs for determining whether a predetermined threshold value is exceeded by value information collected from the monitored positions. In operation, it is possible for the hardware to detect primary events and then for the software to make secondary decisions on the detected events.

The detection unit 51A directly collects information about operation status in the object being monitored as well as information about the presence and absence of any damage or contamination therein. The techniques disclosed by the above-cited Japanese Patent Laid-open No. 2001-7969 involve getting the result of printing to be read by a scanner for indirect diagnosis of the operation status in the printer.

The type of detection unit that may be used varies depending on the monitored object. When mechanical parts or members are monitored for their mounted status, sensors and switches are used. Where individual droplets are monitored for their behavior, sensors and switches are also utilized.

Where mechanical parts and members are monitored for contamination by adhesions or splashes of droplets, sensors and switches are employed as well. If the number of times any part, member or the like is used or has been replaced is to be checked for an accumulated count, then a counter is used. The counter may be implemented by hardware or by software.

The storage unit 51B provides a storage area in which detected values from the detection unit 51A and a use history of the monitored object (including use and replacement counts) are saved as status information. The storage unit 51B may be a memory that is attached or attachable to the droplet discharging apparatus 51. Generally, a semiconductor memory is adopted to construct the storage unit 51B. Alternatively, the storage unit 51B may be formed by a magnetic or an optical storage medium.

The status information to be gathered here should preferably cover parts or members that are to be repaired or replaced upon detection of a defect, such as a head cartridge, an ink cartridge, or a cleaning unit. The status information should also cover parts that can be repaired or improved by electrical settings upon detection of a failure, such as a discharge head.

The communication unit 51C communicates with an externally established information processing apparatus and transmits status information to that apparatus. The communication unit 51C is typically constituted by an interface device that provides communication with an information processing apparatus connected externally to the droplet discharging apparatus.

The physical connection between the droplet discharging apparatus and the information processing apparatus may be implemented in wired or wireless fashion using serial or parallel transmission arrangements. The communication unit 51C may also communicate with the information processing apparatus via a network. As another alternative, the communication unit 51C may communicate with the information processing apparatus over the Internet. The communication capability of the unit 51C should preferably comply with a communication system on the end user's side.

The information processing apparatus as a communicating party may be any one of electronic appliances incorporating computer capabilities, such as a PC, a PDA, a mobile phone, or a video game console. The information processing apparatus should preferably possess a display area or be capable of displaying information on a connected display area.

There are no restrictions on the type of discharge head or the kind of rendering method for use by the droplet discharging apparatus 51. Illustratively, a rendering method adopted by the apparatus 51 may involve getting the discharge head moved relative to the rendering object fixed at a specific location. Another rendering method employed by the apparatus 51 may involve having the rendering object moved relative to the discharge head.

A discharge head of one type may be constituted by a line head with nozzles arrayed at the same density as the rendering resolution in effect across the width to be rendered. A discharge head of another type may be moved relatively in a direction (sub-scanning direction) perpendicular to the direction in which the rendering object is displaced (in the main scanning direction).

The droplet discharging apparatus 51 is typically constituted by a printer or a combination printer-scanner. The droplet discharging apparatus 51 may also be a sample discharging apparatus that discharges various samples in droplets, or a rendering device that draws wiring patterns onto semiconductor substrates and display panels.

The droplet discharging apparatus 51 should preferably include an authentication unit which, in response to a request to rewrite discharge head driving conditions, enables only a duly authenticated communicating party to access a storage unit that stores the driving conditions in question. With access to the storage unit strictly controlled, the driving conditions held therein are protected against arbitrary attempts at rewriting the content of the storage unit. Illustratively, only service personnel are authorized to rewrite the driving conditions stored.

The discharge head for use by the droplet discharging apparatus 51 should preferably be of a type that adaptively allows each discharge port to discharge droplets deflectively at a plurality of pixel areas. The deflective discharge capable head is suitable for raising the number of gradations to be rendered and for correcting faulty discharge ports.

The discharge head used by the droplet discharge apparatus 51 is driven by any one of suitable driving methods, such as valve operating method, piezoelectric method, and bubble jet method. The valve operating method involves opening and closing nozzle valves to discharge pressurized ink droplets. The piezoelectric method involves causing piezoelectric elements to vibrate in order to discharge ink droplets. The bubble jet method involves causing heaters to heat up and expand ink bubbles to jet out ink droplets.

(2) Information Processing Apparatus

Figure 28:
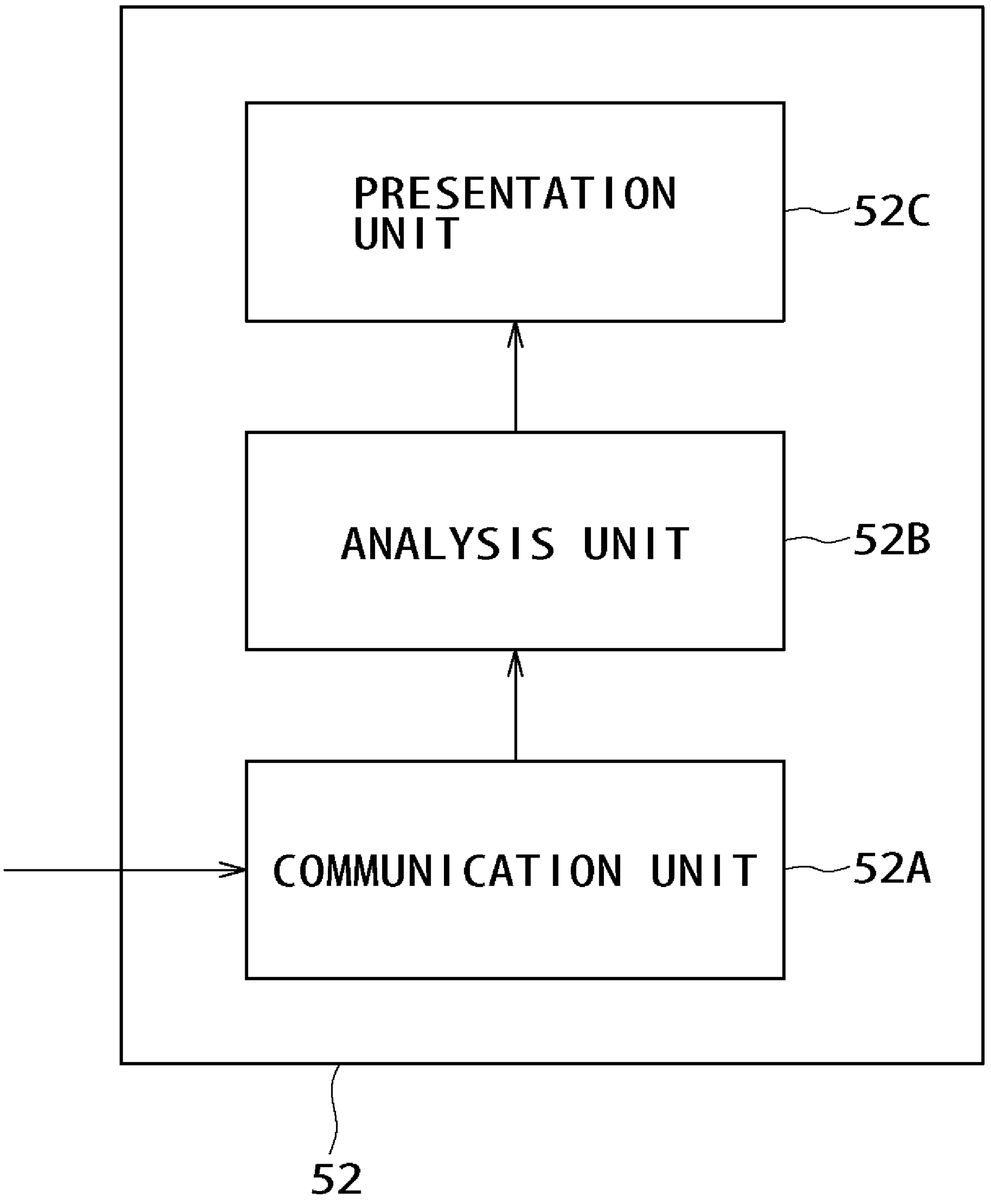
FIG. 28 is a block diagram depicting a structure of another information processing apparatus.

As its second embodiment, this invention proposes another information processing apparatus whose components will be described below. FIG. 28 outlines the key components of an information processing apparatus 52 embodying the invention. The information processing apparatus 52 has a communication unit 52A, an analysis unit 52B, and a presentation unit 52C.

These component units are operational when the information processing apparatus 52 is connected to the droplet discharging apparatus 51 via a communication channel. The communication unit 52A need not function solely to provide communication with the droplet discharging apparatus 51. The communication unit 52A may be identical in function and structure to the communication unit 51C included in the droplet discharging apparatus 51.

The analysis unit 52B is constituted either by hardware or by software for use in analyzing detected values of changes in the status of a monitored object or a use history of the monitored object. Generally, the analysis unit 52B is implemented by software because this invention presupposes the use of a general-purpose information processing apparatus. The same preference for software applies to the presentation unit 52C as well.

The analysis unit 52B analyzes the significance of each of the values acquired as status information. In carrying out its analyzing process, the analysis unit 52B determines whether each of the acquired value falls within a corresponding tolerance. One or a plurality of results from such determination are combined to isolate the cause of the trouble being examined.

The isolating process typically turns up one or a plurality of probable causes. The process may be carried out using predetermined flowcharts or matching tables.

The presentation unit 52C is formed by hardware or software in a manner suitable for presenting the end user with suspected causes of the trouble in an easy-to-understand format. This invention proposes a presentation unit 52C designed to present the end user with the probable causes of the defect in textual or visual form.

The presentation function is brought about following the analysis of the probable causes of the current symptom based on detailed status information about individual objects being monitored. The presentation function enables the end user specifically to know what is probably causing the trouble. By looking up what is presented in the instruction manual at hand, the end user can readily find out what needs to be done to restore the failed function.

Where it is necessary for the end user to query the support center or like repair facility for the action to take to recover from the defect, the end user is able to know early on the rough estimates of how much the repair will cost and how long it will take. The early acquisition of pertinent information on the end user's part will likely contribute to enhancing the end user's satisfaction, as opposed to the current practice of asking the user to leave the failed equipment at the center for repair without letting him/her know what probably caused the failure or how long it will take to complete the repair.

The visual form of presentation may be implemented with computer graphics, graphic representations, tabular views, or other resources used singly or in combination. An audible form of presentation may be adopted in combination with other forms of presentation. Illustratively, guidance messages may be announced by voice.

Other variations of the presentation unit 52C are also conceivable. Illustratively, this invention proposes a presentation unit 52C that presents the end user in either textual or visual form with contents of work to be done to restore a failed function. Obviously, the presentation presupposes that the detected symptoms of individual objects being monitored are analyzed based on detailed status information about the objects.

The presentation function enables the end user to know on the spot what specific work needs to be done to recover from the defect and how likely the recovery is attained. The presentation function also allows service personnel quickly to determine which parts or which units need to be replaced. Such information is particularly useful for those manning the service center and having to answer queries from anxious end users.

The information processing apparatus 52 should preferably include an authentication unit that enables only a duly authenticated communicating party to access the storage unit of the droplet discharging apparatus in order to rewrite the driving conditions stored in that unit. With access to the storage unit strictly controlled, the driving conditions held therein are protected against arbitrary attempts at rewriting the content of the storage unit. Illustratively, only service personnel are authorized to rewrite the driving conditions.

The information processing apparatus 52 should preferably has the ability to substitute recommended values for the driving conditions of the droplet discharging apparatus if changing of the driving conditions appears likely to restore the failed function of the latter apparatus. The recommended values are to be stored in advance and are used selectively depending on the probable cause and type of the detected fault.

The recommended values may be selected either automatically by the information processing apparatus 52 or manually by the end user through a suitable display screen. It is possible to enter the recommended values manually through the screen. In this case, access to the recommended value entry feature should be controlled in combination with the above-described authentication feature.

Furthermore, the presentation unit 52C should preferably be capable of presenting a display of the defect-related items isolated by analysis in a manner clearly distinguishable from other, normal items. The distinguishing feature may also be used to present the above-mentioned probable causes of the observed symptom.

Typical means for making the distinctions on display include: adding or suppressing markings to the items depending on their being normal or faulty, changing colors of these items, changing the size and thickness of characters representing the items being displayed, listing the items by group, and adding or suppressing a sound regarding each of the items as it appears on display.

A printer that discharges ink droplets will now be described as an example representative of the droplet discharging apparatus embodying the invention. It is assumed that the techniques that are not specifically described in this specification or illustrated in any of its accompanying drawings are part of the techniques and expertise well known to those skilled in the art.

(1) Printer System (Droplet Discharging System)

Figure 29:
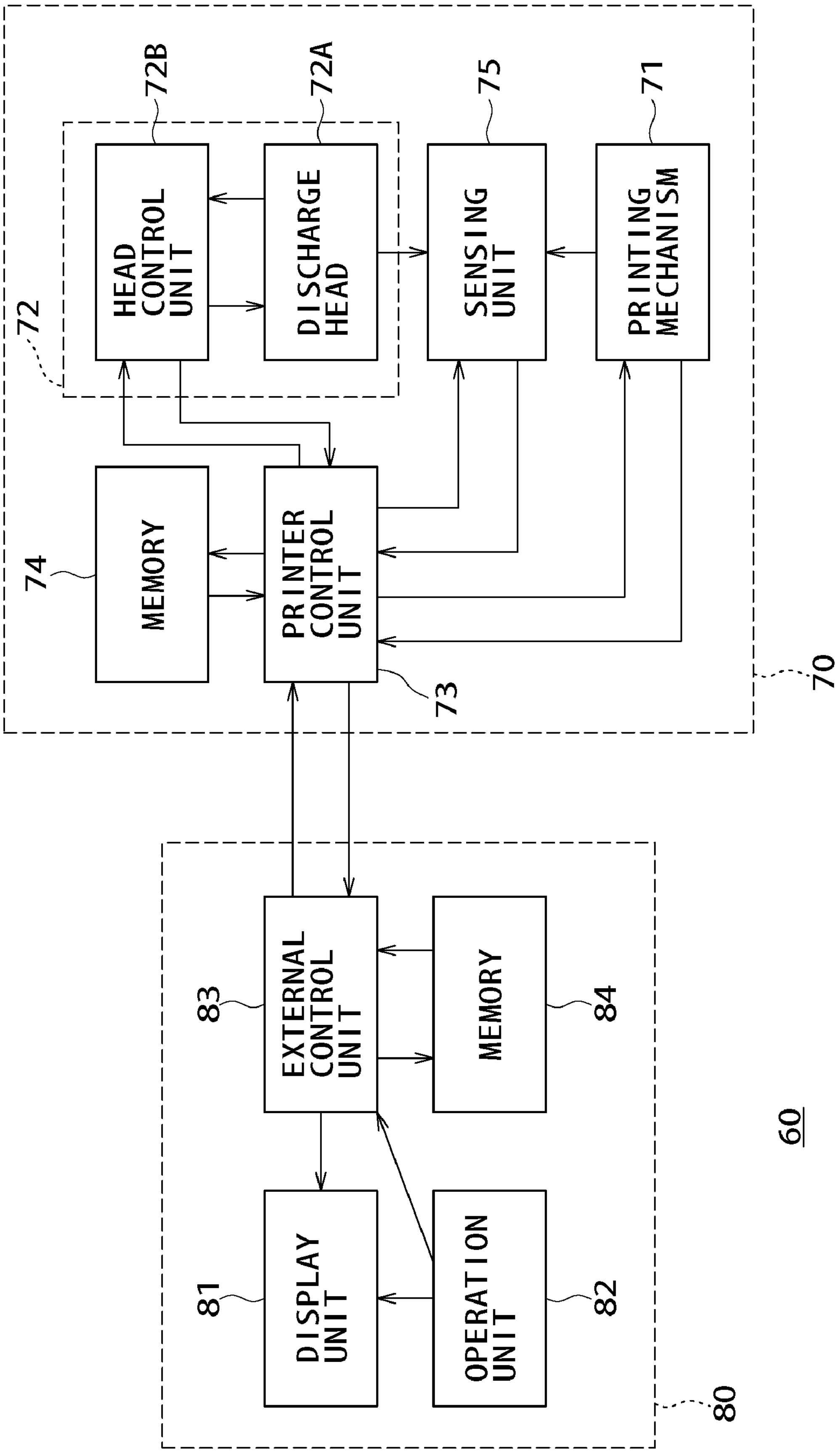
FIG. 29 is a block diagram illustrating an overall configuration of a printer system.

FIG. 29 shows an overall structure of a printer system 60 presupposed by this embodiment of the invention. The printer system 60 has a printer 70 and an external computer 80 interconnected via a communication channel.

In this example, the printer 70 and external computer 80 are connected using a USB (Universal Serial Bus) cable. Normally, print data are input to the printer 70 from the external computer 80. If a memory slot is furnished in the printer 70, print data may be tapped from a memory device inserted into the slot.

(2) Printer (2-1) Overall Structure

The printer 70 includes a printing mechanism 71, a head cartridge 72, a printer control unit 73, a memory 74, and a sensing unit 75. The printing mechanism 71 is constituted by a mechanism for transporting an appropriate recording medium as a print object, by a cleaning unit, and by a signal block. Sheets of paper or other materials and disk-like optical recording materials are used adaptively as the recording medium for the printer.

The head cartridge 72 includes a discharge head 72A and a head control unit 72B. The discharge head 72A has nozzles arrayed in a way conducive to discharging ink droplets, and the head control unit 72B drives the nozzles to discharge ink droplets. With this example, the head cartridge 72 is attached removably to the printer 70. A line head is used as the discharge head 72A. The head control unit 72B carries out diverse controls such as recording of a drive history of the discharge head 72A and switching of its driving mode.

The printer control unit 73 provides overall control of the internal system. The firmware of the system is retained in a nonvolatile memory. The firmware is executed with the memory 74 used as a work area. The printer control unit 73 operates on image data and supplies the result of the operations to the head control unit 72B. Furthermore, the printer control unit 73 controls the printing mechanism 71 in operation and transports the recording medium.

The memory 74 holds various items of status information gathered from inside the apparatus, such as clogged conditions of the nozzles, ink droplet discharge speeds, driving pulse widths, driving voltages, bubble conditions in ink flow paths, soiled state of the cleaning unit, accumulated discharge counts, accumulated printed sheet counts, and the number of times an ink circulation pump has been operated.

The sensing unit 75 is made up of sensors for detecting the operating status of the printer innards. The sensors may illustratively include optical sensors (scanner), discharge detection sensors, bubble sensors, resistance sensors, and counters.

The optical sensors (scanner) are used optically to read photos and images for conversion into digital data. The discharge detection sensors are used directly to count discharged ink droplets so as to have the discharge status grasped comprehensively. For example, laser beams are emitted in such a manner as to intersect the paths of flying ink droplets. Light-receiving sensors are suitably positioned to detect changes in the luminous energy of the laser beams received after passage across the ink droplet paths.

The bubble sensors are employed to monitor the presence or absence of bubbles inside the ink flow paths. Illustratively, ultrasonic sensors are used as the bubble sensors. The resistance sensors are adopted to monitor the soiled state of the cleaning unit (e.g., of cleaning roller and ink absorbing sponge) in terms of changes in the electrical resistance of the components involved.

The counters are utilized for counting the number of times the ink circulation pump has been operated, the number of times the cleaning unit has been replaced, the cumulative number of printed sheets, dates and times of printing passes effected, and the number of times a faulty state has been detected.

(2-2) Detailed Structures

Detailed structures of the key components making up the printer will now be described. What follows is a detailed description of the head cartridge 72 and sensing unit 75.

(a) Head Cartridge

Figure 30:
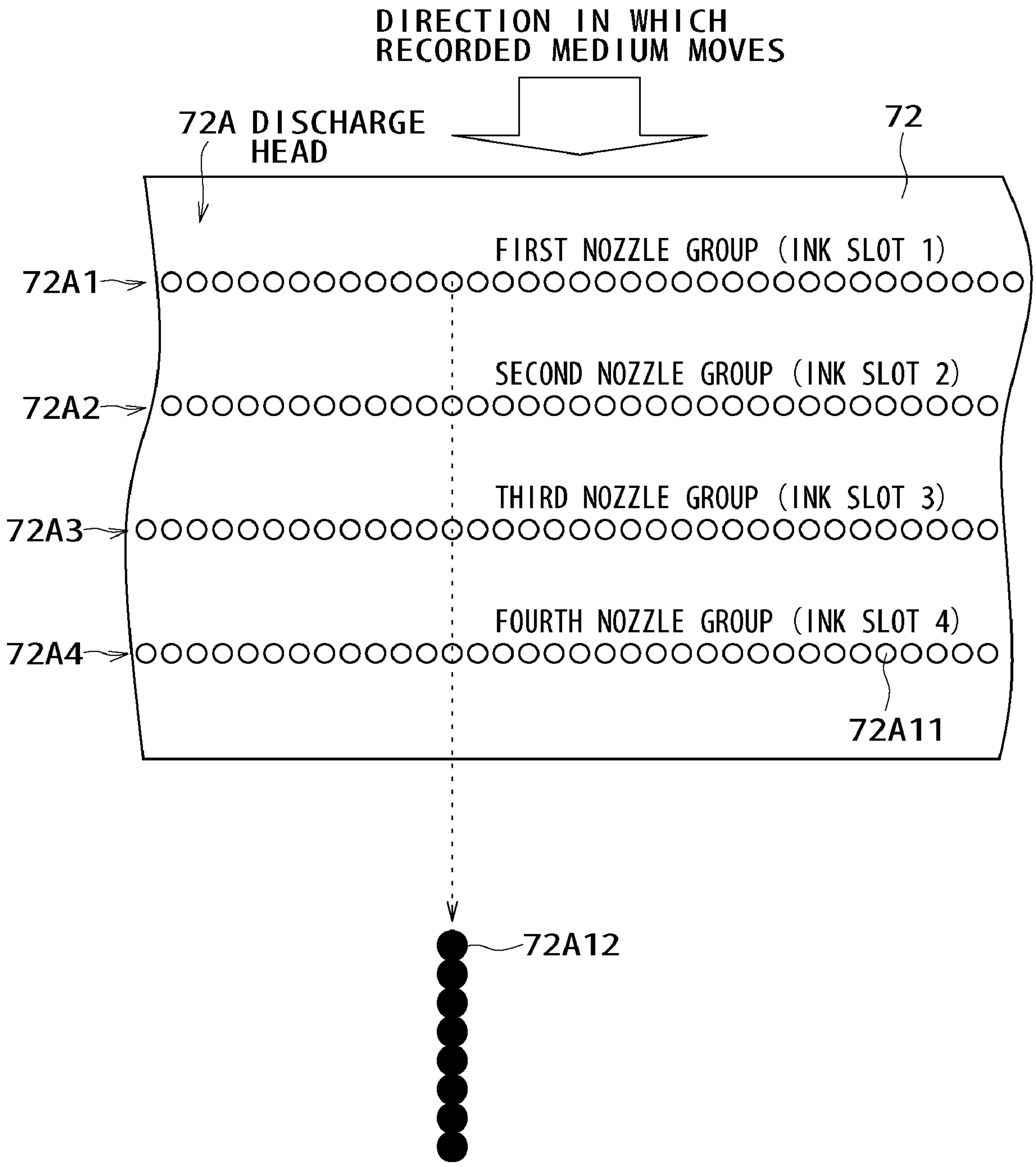
FIG. 30 is a schematic view indicating a bottom structure of a head cartridge.
Figure 31:
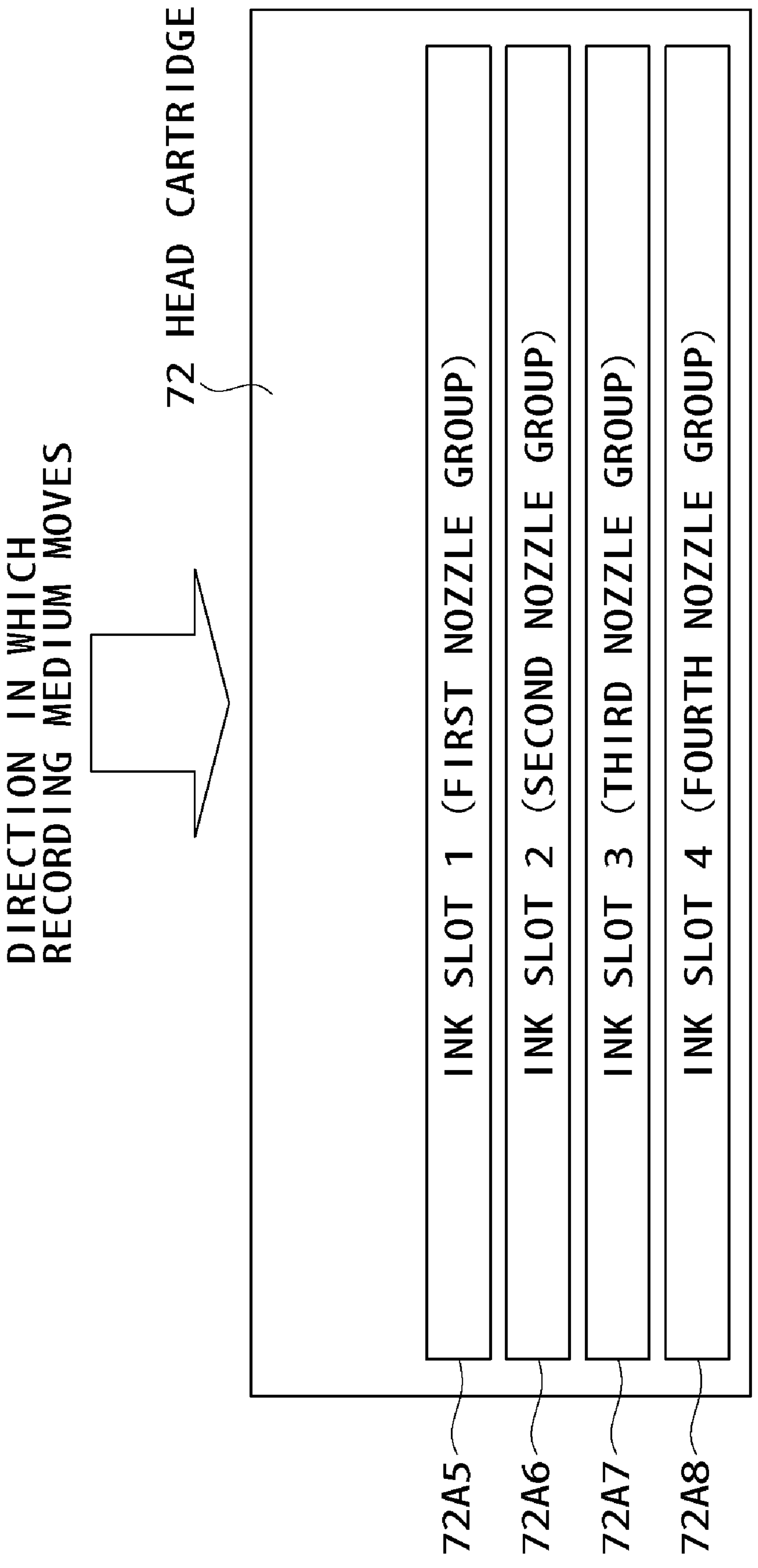
FIG. 31 is a schematic view presenting a top structure of the head cartridge.
Figure 32:
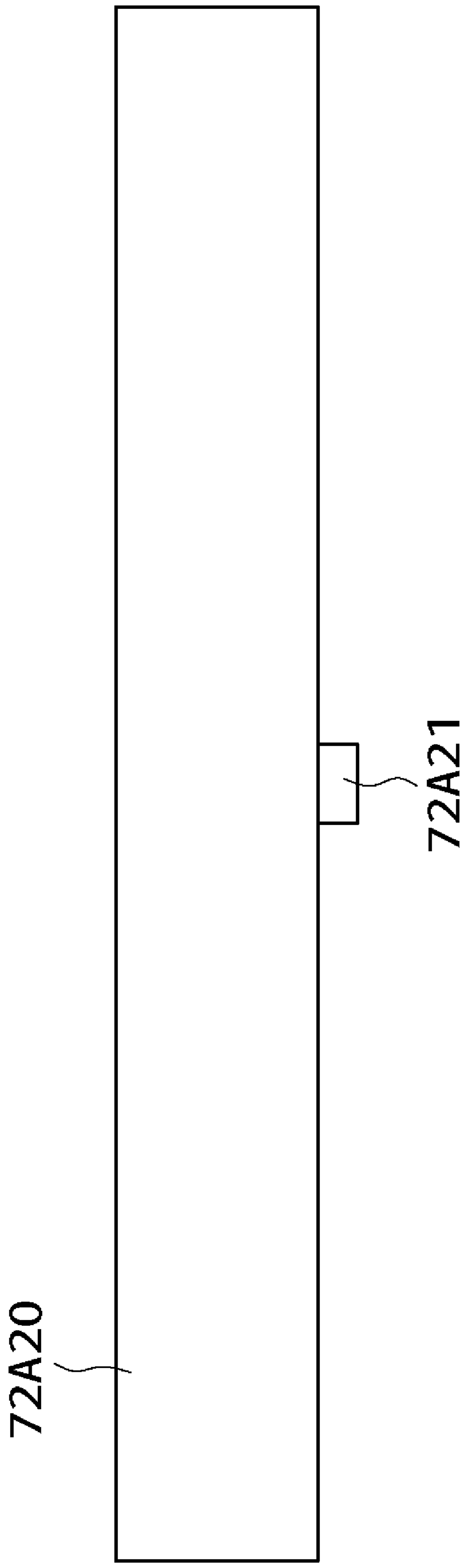
FIG. 32 is a schematic view sketching a structure of an ink cartridge.

FIGS. 30 through 32 outline an overall structure of the head cartridge 72. FIG. 30 is a partially enlarged view of the head cartridge 72 as viewed from the nozzle surface. With this embodiment, a line head is adopted for the discharge head 72A. The head surface has four nozzle groups 72A1 through 72A4 arrayed in a direction perpendicular to the moving direction of the recording medium.

Each of the nozzle groups has nozzles 72A11 arrayed at the same density as the printing resolution in effect across the width to be printed. The nozzle groups are laid out at predetermined intervals in the moving direction of the recording medium. Each nozzle group corresponds to an ink slot that accommodates an ink-filled container (i.e., ink cartridge). For example, the first nozzle group 72A1 corresponds to ink slot 1. Likewise, the second, the third, and the fourth nozzle groups 72A2 through 72A4 correspond to ink slots 2, 3, and 4, respectively.

FIG. 31 shows a top surface of the head cartridge 72. This surface has four ink slots 72A5 through 72A8 that accommodate ink cartridges 72A20 (FIG. 32). The ink slots 72A5 through 72A8 correspond to the nozzle groups 72A1 through 72A4 respectively.

The bottom of the ink slots 72A5 through 72A8 has openings to admit ink supplies. The openings are connected to the corresponding nozzle groups via ink flow paths. The openings are located approximately in the middle of the bottom surface. Ink supply ports 72A21 of the ink cartridges 72A20 (FIG. 32) are inserted into these openings.

Each nozzle 72A11 is capable of discharging up to "p" (a natural number) ink droplets at one pixel. The larger the natural number "p," the higher the resolution. It is also possible to render each pixel using ink droplets discharged by a plurality of nozzles.

For example, "p" ink droplets discharged by the four nozzle groups may form one pixel. As another example, each pixel may be formed by "p" ink droplets discharged by a plurality of nozzles in a single nozzle group. Illustratively, deflective discharge techniques are used to deflect electrically the direction of ink droplet discharges.

Figure 33A:
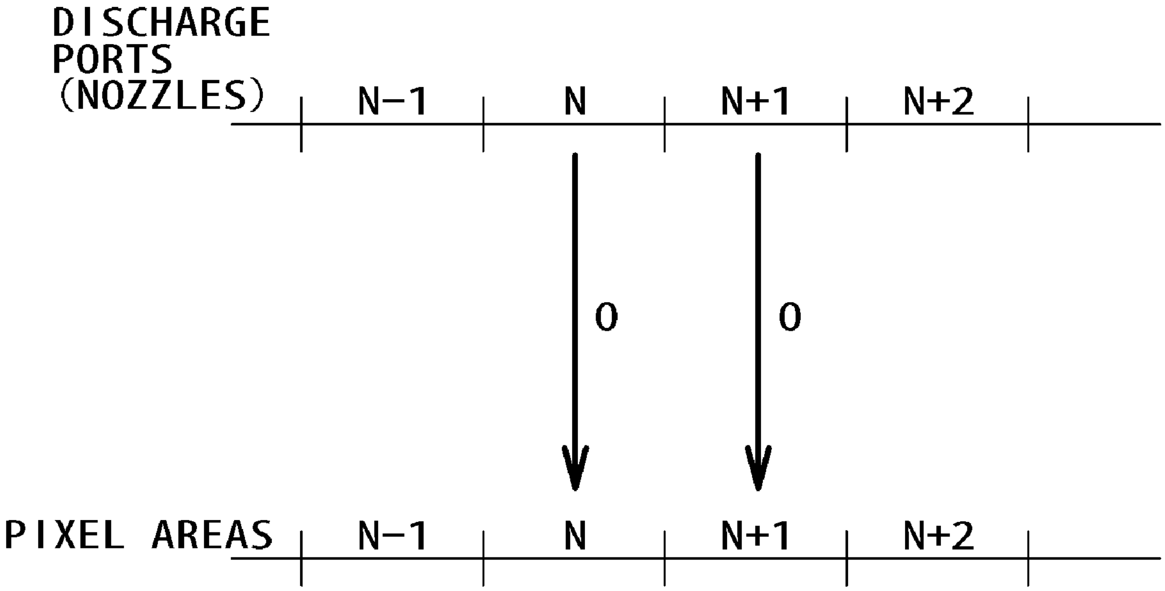
FIGS. 33A and 33B are schematic views explaining how droplets are discharged deflectively.
Figure 33B:
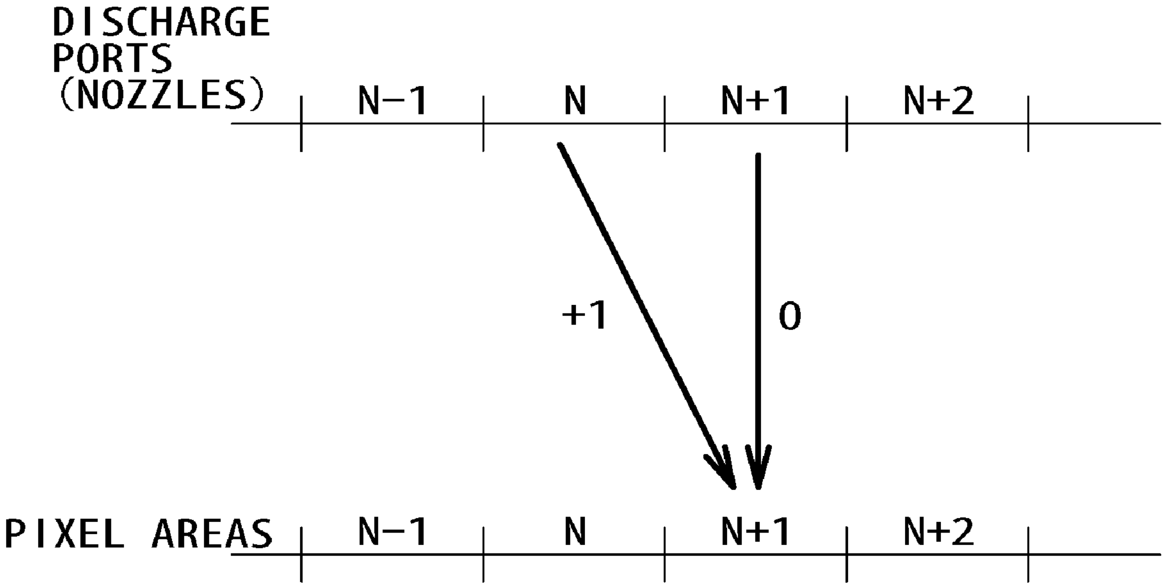

FIG. 33A shows how droplets are discharged without deflection, and FIG. 33B depicts how droplets are discharged deflectively. In this case, deflective discharges are assumed to be in the rightward direction only as seen in the figures, the direction being represented by a symbol "+1." The number "1" signifies that an ink droplet arrives at the position one pixel away. Depending on the type of discharge head 72, an ink droplet can be discharged at a position two or more pixels away. It is also possible to discharge ink droplets in the leftward direction as viewed in the figures.

(b) Sensing Unit

Figure 34:
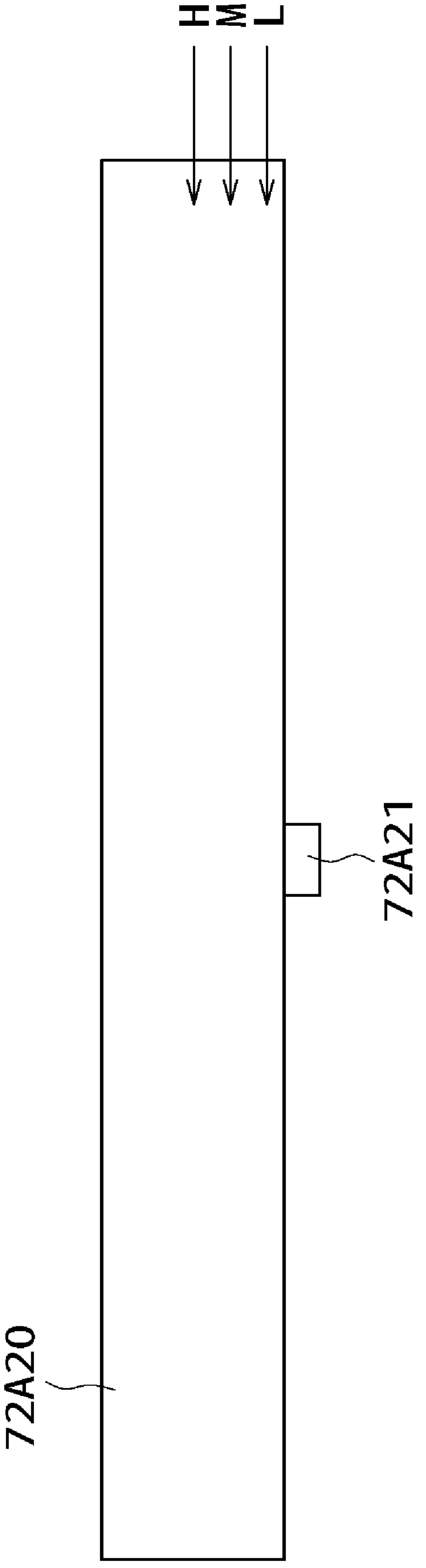
FIG. 34 is a schematic view indicating where a remaining ink sensor is attached.
Figure 35:
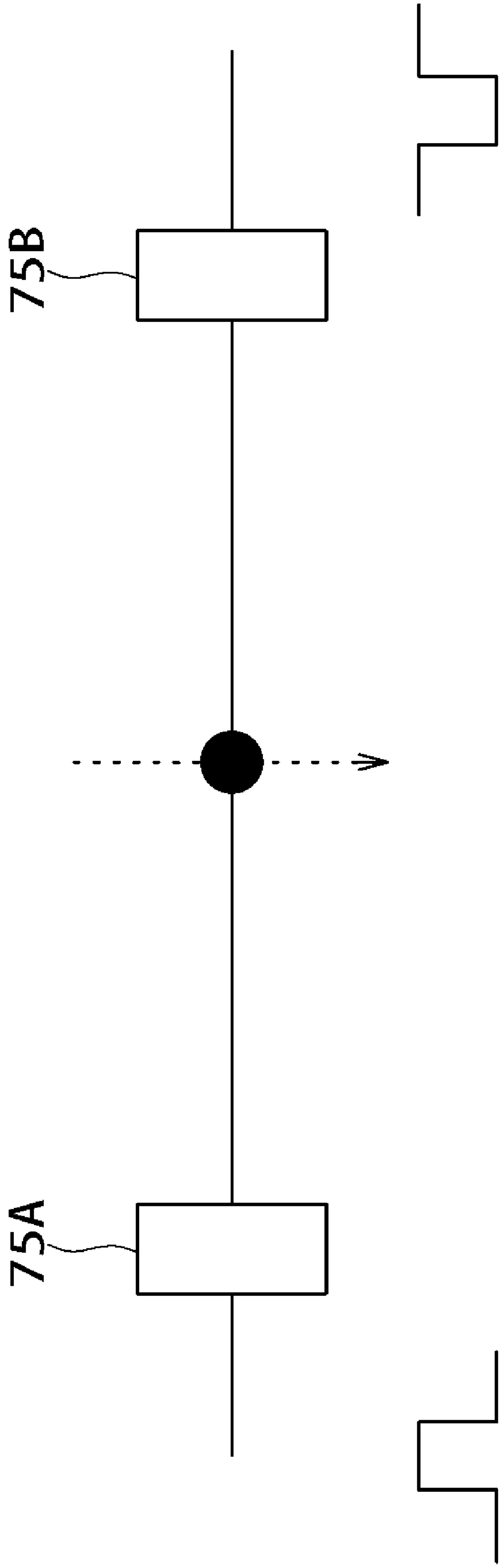
FIG. 35 is a schematic view showing a conceptual structure of an ink droplet sensor.

FIGS. 34 and 35 illustrate representative sensors. FIG. 34 shows where remaining ink sensors are located. Typically, the remaining ink sensors are mounted on the inner walls of the ink slots 72A5 through 72A8. Three remaining ink sensors are positioned separately in the depth direction of the ink cartridges 72A20, at a low ("L"), a middle ("M"), and a high ("H") level.

Each of the remaining ink sensors determines the presence or absence of ink in the applicable depth position by checking the passage of electrical current. For example, the low-level ("L") remaining ink sensor may output a signal indicating the presence of electrical current, while the middle-level ("M") remaining ink sensor may emit a signal denoting the absence of electrical current.

FIG. 35 is a conceptual view of an ink droplet sensor designed to detect ink droplets discharged by each nozzle. This ink droplet sensor is furnished for each of the nozzle groups 72A1 through 72A4. Structurally, the ink droplet sensor is composed of a semiconductor laser 75A and a photodiode 75B that receives a laser beam.

The semiconductor laser 75A and photodiode 75B are positioned opposite to each other outside areas where the nozzle groups are located. With the ink droplet sensor of this structure in operation, the output of the photodiode 75B is found to drop when an ink droplet cuts off the laser beam. Detecting an output pulse indicative of the drop in photodiode output makes it possible to measure ink droplets one by one. In practice, the effects of noise are removed by acquiring the logical AND between drive pulses for emitting the laser beam on the one hand, and the detected output pulses on the other hand.

Some ink droplet sensors may have piezoelectric elements or condenser microphones positioned on a surface opposite to the nozzles. These sensors operate on the principle of detecting those changes in electrical resistance which reflects the kinetic momentum of ink droplets arriving at the surface facing the nozzles.

The soiled state of the cleaning roller and ink absorbing sponge is detected illustratively by use of sensors that detect the presence or absence of electrical current. That is, this type of sensor checks the presence or absence of electrical current between suitably located electrodes in order to determine whether the cleaning roller or ink absorbing sponge has been soiled with a higher-than-tolerable quantity of adhesions or splashes of ink droplets.

(3) External Computer

The external computer 80 has a display unit 81, an operation unit 82, an external control unit 83, and a memory 84 as its key components, as shown in FIG. 29. The display unit 81 is used to provide a user-oriented operation screen (GUI: Graphic User Interface) that allows the end user to have various programs executed by the external computer 80. The screen is also used to display results of the program execution in addition to the display of status information, a capability specific to this invention.

Generally, the display unit 81 has a screen larger than that of the display device mounted on the printer 70. The display unit 81 is also more suitable for visually representing information. This capability enables the display unit 81 to present the end user with large quantities of information. The display unit 81 may be furnished in an enclosure separate from the external computer 80.

The operation unit 82 is made up of a keyboard, a mouse, and other input devices that may be needed. Manipulating the operation unit 82 allows the user to move a pointer and a cursor on the screen as desired. If modification of the driving conditions for the printer 70 requires the user to undergo an authentication process, the operation unit 82 is used to input a password. The operation unit 82 is also used to type values constituting the driving conditions.

The external control unit 83 carries out arithmetic operations related to diverse programs. For example, the external control unit 83 executes the analytic program for troubleshooting proposed by this invention. In carrying out the program, the external control unit 83 communicates with the printer control unit 73 through a USB cable. The communication permits the readout of status information.

If a failed function is found likely to be restored by changing the driving conditions, the external control unit 83 requests the printer control unit 73 to rewrite the conditions. The status information collected from the printer 70 is stored into the memory 84. The memory 84 is also used to accommodate the operating system as well as information specific to various programs.

(4) Example of How Defect is Repaired by Changing Driving Conditions

Figure 36:
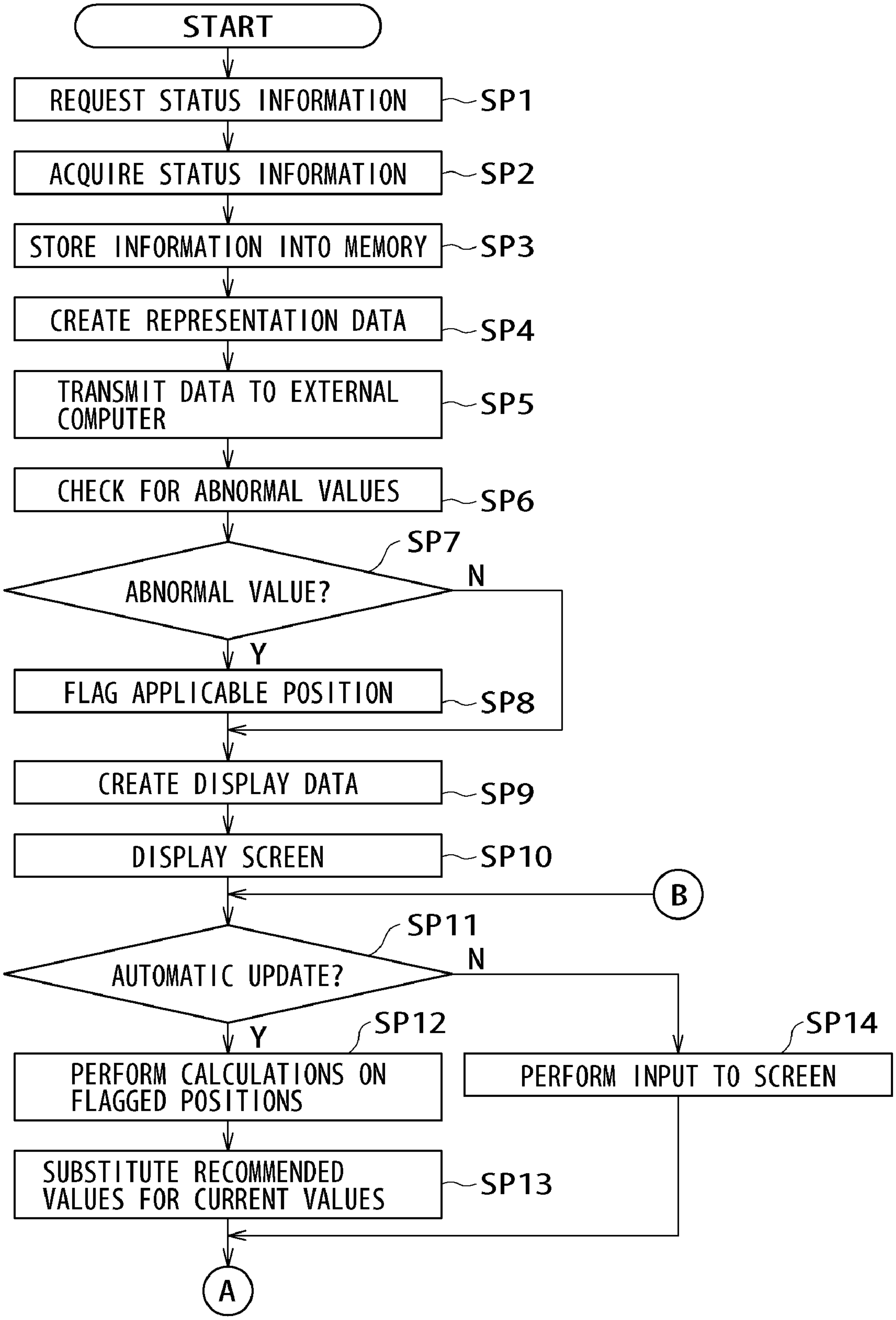
FIG. 36 is a flowchart of processes in which a function recovery program is executed.

What follows is a description of how a diagnostic program is carried out for troubleshooting when a defective printer operation is recognized. It is assumed here that the defect is revealed by printouts bearing streaks or other print irregularities. In this example, the nozzle function is restored by carrying out the processes shown in FIGS. 36 and 37.

The diagnostic operation is initiated by the end user (i.e., user of the printer 70) operating the external computer 80. Illustratively, the end user starts up his or her desktop computer to carry out the diagnostic program. In process SP1 of FIG. 36, the end user requests status information about the discharge head 72A of the printer 70 through the display unit 81 of the external computer 80.

The request is transmitted from the external control unit 83 to the printer control unit 73 over the USB cable. In turn, the printer control unit 73 gathers the status information and settings about clogged nozzles from the head control unit 72B and sensing unit 75. The status information illustratively includes presence or absence of clogging, discharge speeds, driving pulse widths, driving voltages, and accumulated discharge counts. These items of information are collected on all nozzles by the printer control unit 73 in process SP2.

In process SP3, the printer control unit 73 stores the collected status information and settings into the memory 74. When the relevant information has all been gathered, the printer control unit 73 generates presentation data in a predetermined data format out of the collected status information in process SP4. In process SP5, the printer control unit 73 sends the presentation data back to the external control unit 83.

Upon receipt of the presentation data, the external control unit 83 determines in process SP6 whether the data contains any abnormal values. This abnormal value monitoring feature is implemented as part of the software functions executed by the external control unit 83.

In processes SP6 and SP7, the external control unit 83 flags those values in the presentation data which fall short of the corresponding specifications. Illustratively, the external control unit 83 may receive measurements of the individual nozzles every time they have been taken as presentation data, average the measurements, and compare the averages with corresponding threshold values to check for abnormalities.

In process SP8, the external control unit 83 diagnoses as defective nozzles those nozzles whose discharge quantities are lower than the threshold values, and flags the defective nozzles thus diagnosed. Where accumulated discharge counts have been reported, these values are used as the basis for averaging the measurements.

Thereafter, the external control unit 83 starts up suitable software (e.g., WWW browser) to present the end user with information. In process SP9, the received presentation data is converted by the software into display data that can be visually recognized by the end user. Illustratively, the presentation data is converted into display data made up of values, graphs, and figures.

In process SP10, the display unit 81 displays on its screen the operation status (i.e., status information) of the discharge head 72A as the display data. At this point, the external control unit 83 notifies the end user of the nozzle numbers at which abnormal values have been detected, by causing the relevant numbers to blink or be displayed in reverse video.

Figure 38:
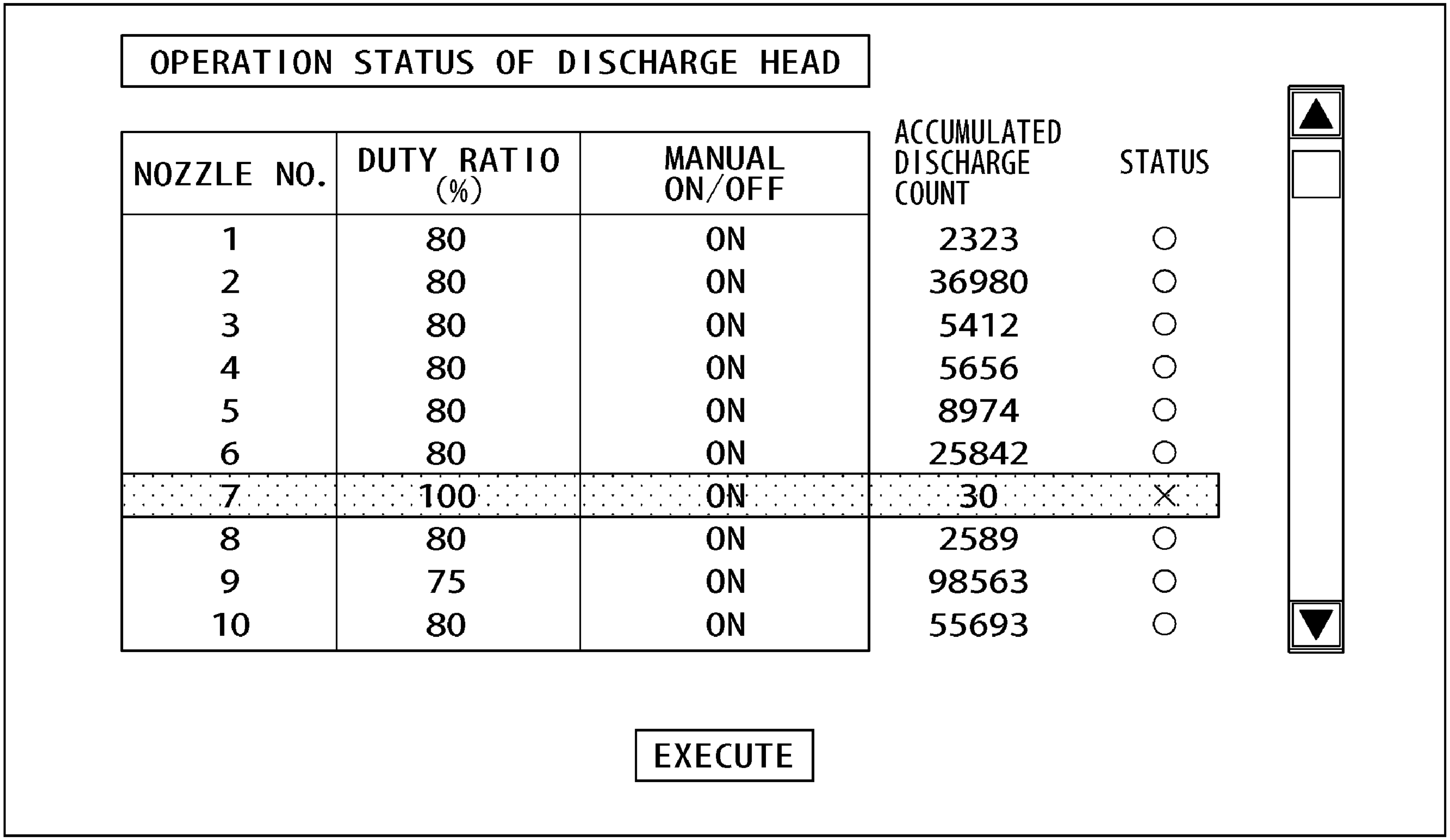
FIG. 38 is a schematic view of an operation status display screen.

FIG. 38 indicates a typical display screen. In this example, the nozzle number "7" is displayed in reverse video, clearing notifying the end user of the abnormality. The screen simultaneously displays accumulated discharge counts and nozzle status in a separate display area. The example of FIG. 38 includes a duty ratio column and a manual input ON/OFF column which are used in function recovery work, to be discussed later.

The external control unit 83 incorporated in the external computer 80 is capable of much faster arithmetic operations than the printer control unit 73 in the printer 70. This means that the external control unit 83 can be used to turn the status information received as the display data into computer graphics furnished with sound effects as desired. The general end user with little or no specialized knowledge is then presented with an easy-to-comprehend representation of what has been diagnosed of the defective printer.

After displaying the result of its diagnosis, the external control unit 83 in process SP11 checks to determine whether or not to calculate automatically the recommended values necessary for restoring the failed function. The check is carried out if selected following the display of previously stored information about execution of automatic diagnosis mode or after the display of the diagnosis result.

Where automatic diagnosis mode is found to have been selected, the external control unit 83 in processes SP12 and SP13 performs calculations to correct the faulty nozzle discharges at the flagged positions. For example, if discharge quantities are found insufficient, the external control unit 83 calculates driving conditions conducive to boosting the ability to discharge ink droplets.

In another example where ink droplets are discharged using bubbles grown by activating heaters, the external control unit 83 calculates driving conditions designed to increase the speed of bubble growth. More specifically, the external control unit 83 raises the recommended values of drive currents applied to the headers of the corresponding nozzles.

If normal print quality is found likely to be restored by deflectively discharging ink droplets, the external control unit 83 calculates recommended values constituting a print mode in which the print data destined for defective nozzles are diverted to adjacent normal nozzles.

The calculating method and the specifications for use in automatic diagnosis should preferably be kept up to date at all times. The automatic diagnosis function can be updated by rewriting the applicable program in the memory 84 of the external computer 80.

If manual input mode is found selected (e.g., where ON's are set in the manual input field of FIG. 38), then the external control unit 83 goes to process SP14 and waits for numerical values to be input through the screen.

Figure 37:
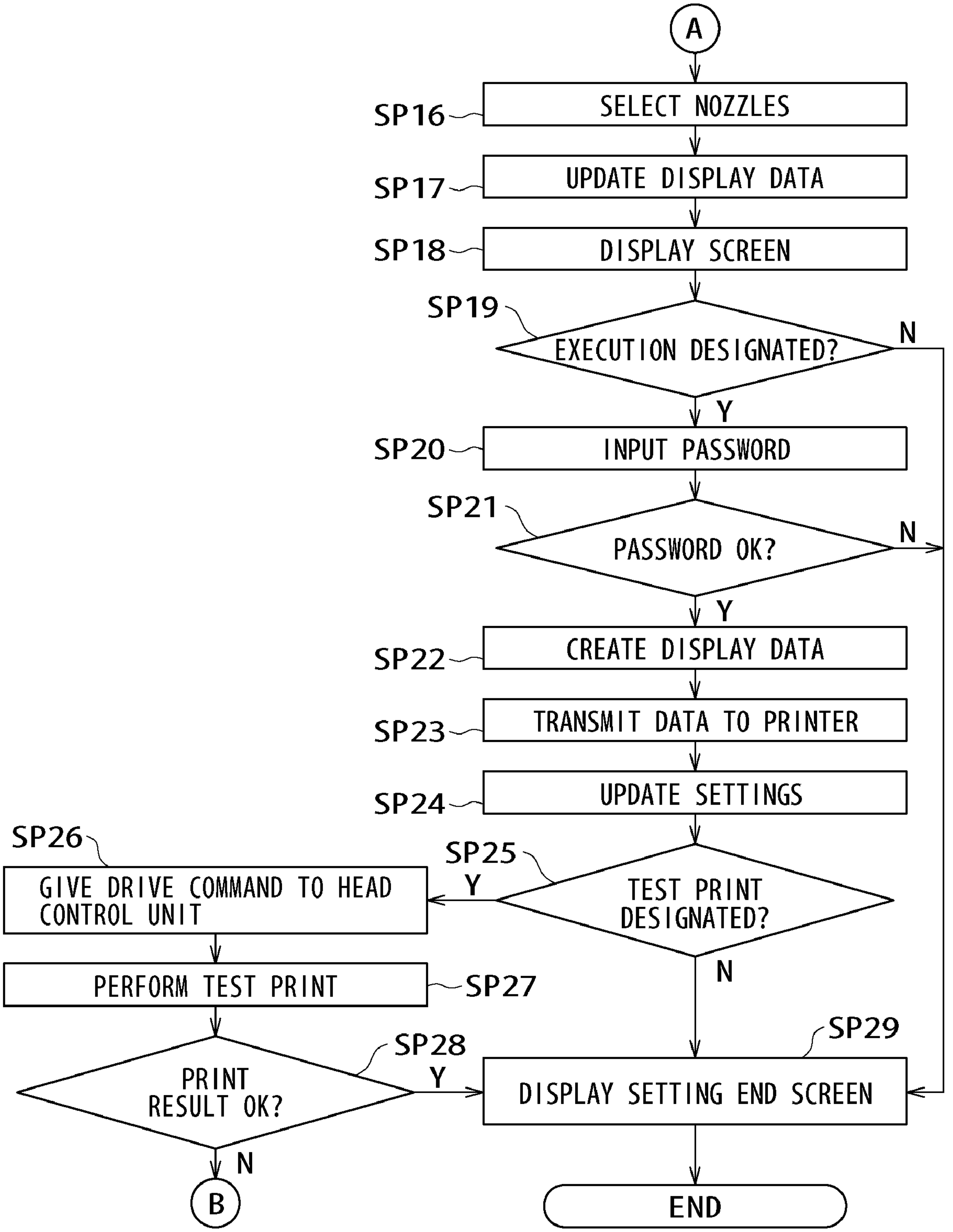
FIG. 37 is a flowchart of further processes in which the function recovery program is executed.

Thereafter, specific nozzles are selected and their driving conditions are replaced with the recommended or input values in processes SP16 and SP17 of FIG. 37. FIG. 38 shows a state in which the duty ratio for the nozzle No. 7 is changed to 100 percent.

The 100-percent duty ratio signifies that the maximum value of currents applied to the headers is raised to 100 percent. The new setting is selected to raise the current value, which in turn boosts the ability to discharge ink droplets from the initially set 80-percent level where the discharge capability was found insufficient.

Figure 39:
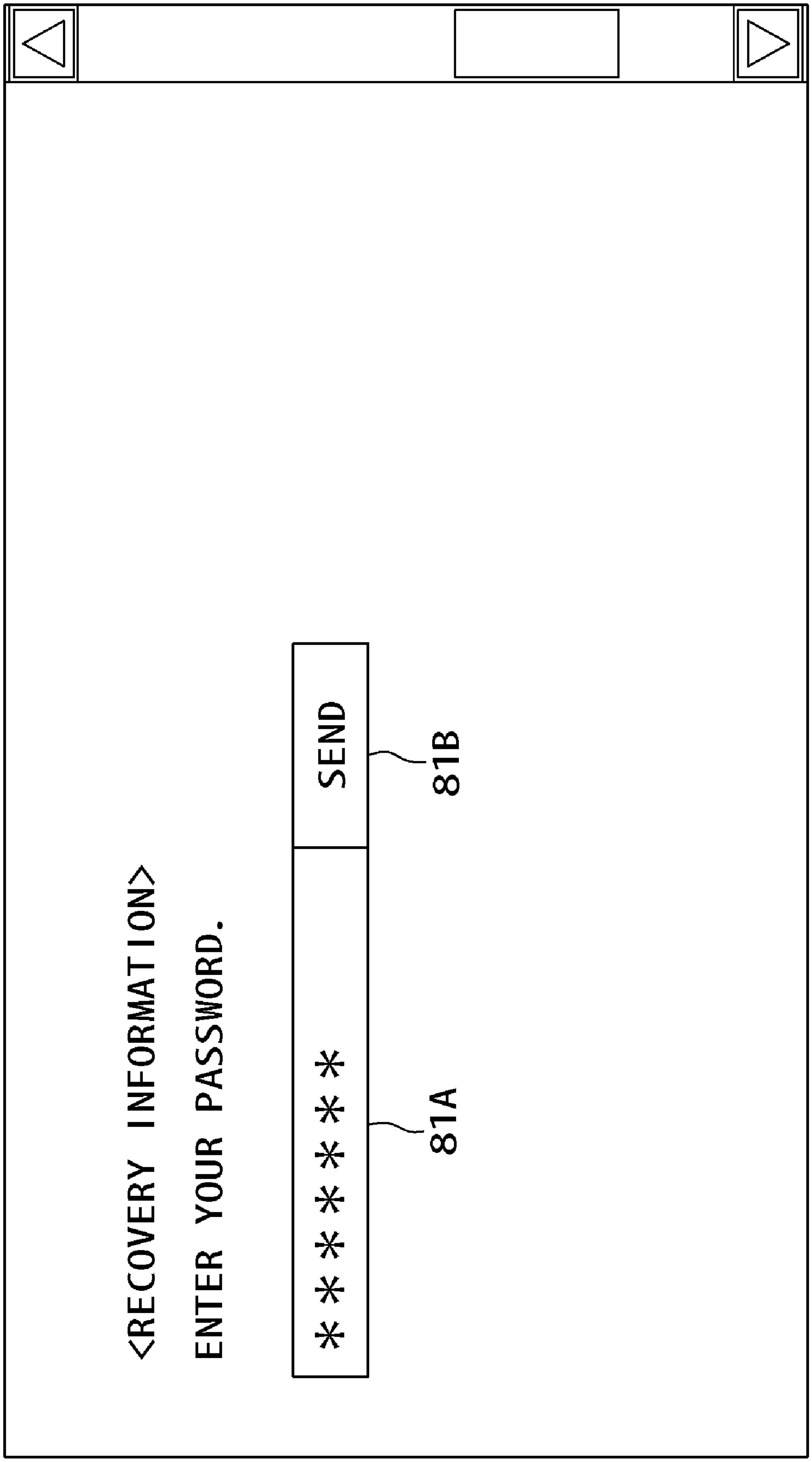
FIG. 39 is a schematic view of an authentication screen.

In process SP18, a screen appears asking the end user whether or not to actually rewrite the driving conditions for the printer 70. If the end user designates execution of the rewriting in process SP19, the external control unit 83 displays in process SP20 a screen prompting the input of an encrypted character string as illustrated in FIG. 39.

The encrypted input screen is provided to make sure that the end user with little or no specialized knowledge will not arbitrarily rewrite the driving conditions for the discharge head 72A. The encrypted input screen shows an input field 81A in which to enter the encrypted character string, and a button 81B that sends the input character string to the printer 70 when clicked on. In the input field 81A, the entered characters are not displayed as they were entered; each of them is represented simply by an asterisk (*).

Following the input, the external control unit 83 sends the encrypted character string to the printer 70. The printer control unit 73 of the printer 70 in process SP21 compares the encrypted character string received with an encrypted character string held in the memory 74, and returns the result of the comparison to the external control unit 83. If the encrypted character string entered by the user is found correct, the external control unit 83 in process SP22 converts the changed driving conditions into printer-ready presentation data.

The authentication based on the encrypted input screen is not mandatory. Illustratively, authentication may be requested only for input items as important as the changing of driving conditions. If all items are allowed to be rewritten freely, then processes P20 and P21 may be skipped.

With the presentation data thus created, the external control unit 83 sends the data to the printer 70 in process SP23. In process SP24, the printer control unit 73 of the printer 70 updates the driving conditions.

Following notification that the driving conditions have been normally rewritten, the external control unit 83 asks the end user whether or not to perform test print using the updated driving conditions in process SP25.

In process SP26, a test print command is fed from the external control unit 83 to the head control unit 72B by way of the printer control unit 73. The command drives the discharge head 72A to discharge ink droplets for test printing in process SP27. In process SP28, a screen appears on the display unit 81 indicating whether the result of the print is acceptable.

If the result of the test print is found acceptable, a setting end screen appears on the display unit 81 in process SP29, and this series of processes is brought to an end. If the test print result is found unacceptable, the external control unit 83 returns to a state in which driving conditions are to be reestablished. With this example, the external control unit 83 returns the state immediately before the check on the automatic update.

If the result of the check turns out to be negative in process SP19, SP21, or SP25, the external control unit 83 displays the setting end screen on the display unit 81 and terminates this series of processes at that point.

(5) Examples of Work

Other typical tasks to be performed are explained below. What was described above was the task in which the end user requested the status information about the discharge head. Another typical task to be carried out is one in which the end user requests all status information. The basic processing operations performed by the external control unit 83 are the same as those above up to process SP10.

FIG. 40 shows corresponding relations between typical errors diagnosed by analyzing status information on the one hand, and the probable causes of the errors on the other hand. The diagnostic program executed by the external control unit 83 references the table of FIG. 40 to notify the end user of necessary tasks to carry out. In the tabular view of FIG. 40, the fields along the horizontal axis indicate representative errors and those along the vertical axis denote their probable causes.

For example, an error indicated as "sensor-to-sensor movement distance out of tolerance" is detected when the cleaning unit is abnormally opened or closed. Two sensors are involved here: an opening sensor that checks the opened state of the cleaning unit, and a closure sensor that verifies the closed state of the unit. The error is recognized when the number of pulses (denoting the distance of movement) detected while the head unit moves from one sensor to the other is out of a tolerable range of values.

The symptom above points a mechanical defect that cannot be repaired by the end user alone. In such a case, the external control unit 83 displays a message calling for experts' intervention at the service center for function recovery, along with the error indication saying that the cleaning unit is not normally closed.

When details of the error indication are verified by personnel at the service center, the service center can take stock of the necessary parts and, if they are out of stock, can place an order for them with the relevant supplier. The service center can also inform the end user how long it will likely take to complete the repair.

Figure 41:
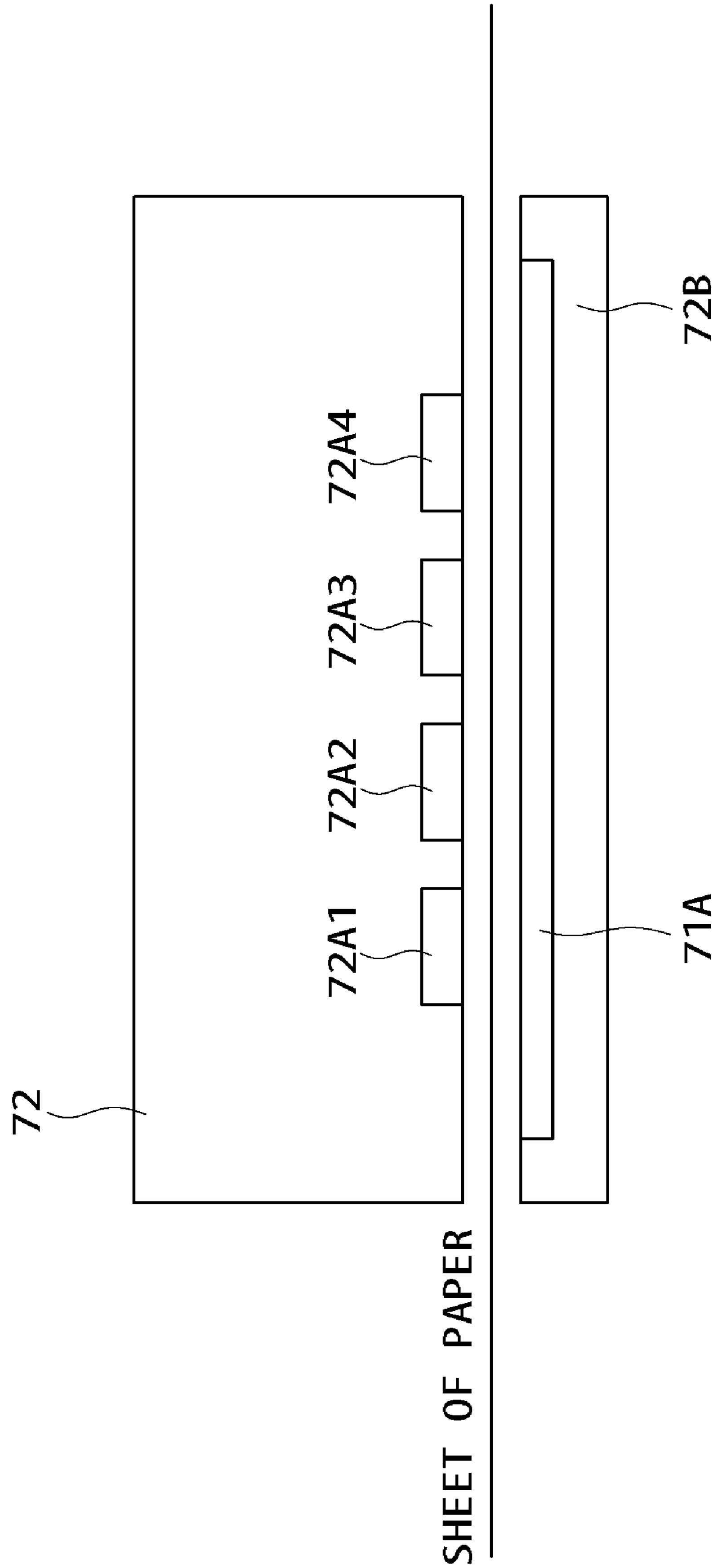
FIG. 41 is a schematic view illustrating where an ink absorbing sponge is located.

An error indicated as "frameless print counter exceeding limit" is detected when the ink absorbing sponge (also called the ink reservoir) needs to be replaced. FIG. 41 shows where the ink absorbing sponge is located.

The ink absorbing sponge 71A is positioned opposite to the surface including the nozzle groups 72A1 through 72A4. The sponge 71A absorbs the ink droplets discharged but not received by sheets of paper being fed. This ink absorbing sponge 71A is fastened to a printing table 71B.

The above symptom also suggests a defect that may not be repaired by the end user alone. In this case, too, a message appears saying that the apparatus needs to be brought to the service center for repair work. These are the cases of failure in which the defective parts are to be repaired mechanically or replaced with spare parts.

Other errors symptomatic of defects that need to be repaired at the service center include an error indicated as "sensor in the chip reacted" and an error "no communication with head control unit." The intra-chip sensor is a sensor installed inside the chip for detection of ink leakage. Illustratively, if air is introduced into the chip by leaked ink, the sensor switches from its normal conductive state to a nonconductive state.

A defective head cartridge needs to be replaced at the service center except when the cartridge is of a type that can be replaced by the end user. In this case, too, a display appears describing the probable cause or causes, along with a message saying that the failure needs to be dealt with at the service center.

Some errors can be taken care of by the end user. These irregularities include an error "print counter exceeding limit," an error "remaining ink sensor (L) off," and an error "remaining ink sensor (M) off."

The error indication "print counter exceeding limit" means it is time to replace the cleaning roller. The error indication "remaining ink sensor (L) off" signifies that no ink is left. The indication "remaining ink sensor (M) off" means that only a small amount of ink is left.

If the two errors "remaining ink sensor (L) off" and "remaining ink sensor (M) off" are detected simultaneously, that means no ink cartridge is mounted. In any case, these errors are indicated when the ink cartridge, roller, or other parts that may be replaced by the end user are found amiss.

In any of the user-repairable cases, the end user can purchase relevant replacement parts from their suppliers and substitute them for their failed counterparts; there is no need to bring the defective apparatus to the service center. User-initiated repair work is less time-consuming and costs significantly less than professional intervention.

(6) Effects of the Embodiment

As described, the printer system embodying the invention utilizes the external computer 80 superior in function to the printer 70 in carrying out data processing tasks such as calculations, indications, operations, and storage manipulations necessary for diagnosing and repairing the printer 70.

That means the internal status of the printer 70 can be presented in an appreciably more sophisticated format than if the printer status information is indicated on the display device attached to the printer 70. In other words, the end user as the primary worker to deal with a failed printer function can be presented with much more detailed and specific items of information to work on than before.

The embodiments of the invention described above allow an external entity to calculate and adjust printer driving conditions based on human decisions in a more sophisticated manner than the printer 70 itself, before sending the driving conditions thus prepared back to the printer 70. This makes it possible to boost the effectiveness of the recovery work made on the failed function.

The printer system embodying the invention can thus examine and diagnose printer defects in rapid and detailed fashion without recourse to specialized analytic tools. As a result, the system permits early recovery from the faulty printer function.

As many apparently different embodiments of this invention may be made without departing from the spirit and scope thereof, it is to be understood that the invention is not limited to the specific embodiments thereof except as defined in the appended claims.

What is claimed is:

1. A droplet discharging system comprising:

a droplet discharging apparatus; and an information processing apparatus in communication with the droplet discharge apparatus by means of a communication channel, wherein, said droplet discharging apparatus includes (a) a detection unit for detecting changes in status of a monitored object, (b) a storage unit for storing either detected values from said detection unit or a use history of said monitored object as status information, and (c) a communication unit for communicating with said information processing apparatus located externally so as to transmit said status information to said information processing apparatus; and said information processing apparatus includes (a) an analysis unit for analyzing said status information acquired from said droplet discharging apparatus through communication, and (b) a presentation unit for presenting an end user with a probable cause of a detected defect in said monitored object in either textual or visual form, said probable cause having been isolated through analysis by said analysis unit.

2. A droplet discharging system comprising:

a droplet discharging apparatus; and an information processing apparatus in communication with the droplet discharge apparatus by means of a communication channel, wherein, said droplet discharging apparatus includes (a) a detection unit for detecting changes in status of a monitored object, (b) a storage unit for storing either detected values from said detection unit or a use history of said monitored object as status information, and (c) a communication unit for communicating with said information processing apparatus located externally so as to transmit said status information to said information processing apparatus; and said information processing apparatus includes (a) an analysis unit for analyzing said status information acquired from said droplet discharging apparatus through communication, and (b) a presentation unit for presenting an end user in either textual or visual form with contents of work to be done to recover from a probable cause of a detected defect in said monitored object, said probable cause having been isolated through analysis by said analysis unit.

3. A droplet discharging apparatus comprising:

a detection unit for detecting changes in status of a monitored object;

a storage unit for storing either detected values from said detection unit or a use history of said monitored object as status information;

a communication unit for communicating with an information processing apparatus located externally so as to transmit said status information to said information processing apparatus, and an authentication unit which, given a request to rewrite a driving condition held in a storage unit regarding a discharge head, allows only a communicating party having been authenticated for access to said storage unit to rewrite said driving condition therein for said discharge head.

* * * * *